US010623264B2

(12) United States Patent
Kompella et al.

(10) Patent No.: US 10,623,264 B2
(45) Date of Patent: Apr. 14, 2020

(54) POLICY ASSURANCE FOR SERVICE CHAINING

(71) Applicant: Cisco Technology, Inc., San Jose, CA (US)

(72) Inventors: Ramana Rao Kompella, Cupertino, CA (US); Kartik Mohanram, Pittsburgh, PA (US); Advait Dixit, Sunnyvale, CA (US); Sundar Iyer, Palo Alto, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 406 days.

(21) Appl. No.: 15/693,310

(22) Filed: Aug. 31, 2017

(65) Prior Publication Data

US 2018/0309632 A1    Oct. 25, 2018

Related U.S. Application Data

(60) Provisional application No. 62/487,924, filed on Apr. 20, 2017.

(51) Int. Cl.
*H04L 12/24* (2006.01)

(52) U.S. Cl.
CPC ...... *H04L 41/0893* (2013.01); *H04L 41/0853* (2013.01); *H04L 41/0866* (2013.01);
(Continued)

(58) Field of Classification Search
CPC . H04L 41/08; H04L 41/0803; H04L 41/0806; H04L 41/0813; H04L 41/085;
(Continued)

(56) References Cited

U.S. PATENT DOCUMENTS 5,204,829 A    4/1993  Lyu et al.
6,763,380 B1   7/2004  Mayton et al.
(Continued)

FOREIGN PATENT DOCUMENTS

CN    105471830    4/2016
CN    105721193    6/2016
(Continued)

OTHER PUBLICATIONS

M. Shin, Y. Choi, H. H. Kwak, S. Pack, M. Kang and J. Choi, "Verification for NFV-enabled network services," 2015 International Conference on Information and Communication Technology Convergence (ICTC), Jeju, Oct. 28-30, 2015, pp. 810-815. (Year: 2015).*

(Continued)

*Primary Examiner* — Vivek Srivastava
*Assistant Examiner* — William C McBeth
(74) *Attorney, Agent, or Firm* — Polsinelli PC

(57) ABSTRACT

In some examples, a system obtains a network logical model and, for each node in a network, a node-level logical, concrete, and hardware model. The system identifies a service function chain, and determines a respective set of service function chain rules. For each node, the system determines whether the respective set of service function chain rules is correctly captured in the node-level logical model and/or concrete model to yield a node containment check result. Based on a comparison of policy actions in the concrete model, hardware model, and at least one of the node-level logical model or network logical model, the system determines whether the respective set of service function chain rules is correctly rendered on each node to yield a node rendering check result. Based on the node containment check result and node rendering check result,
(Continued)

Figure 1A:
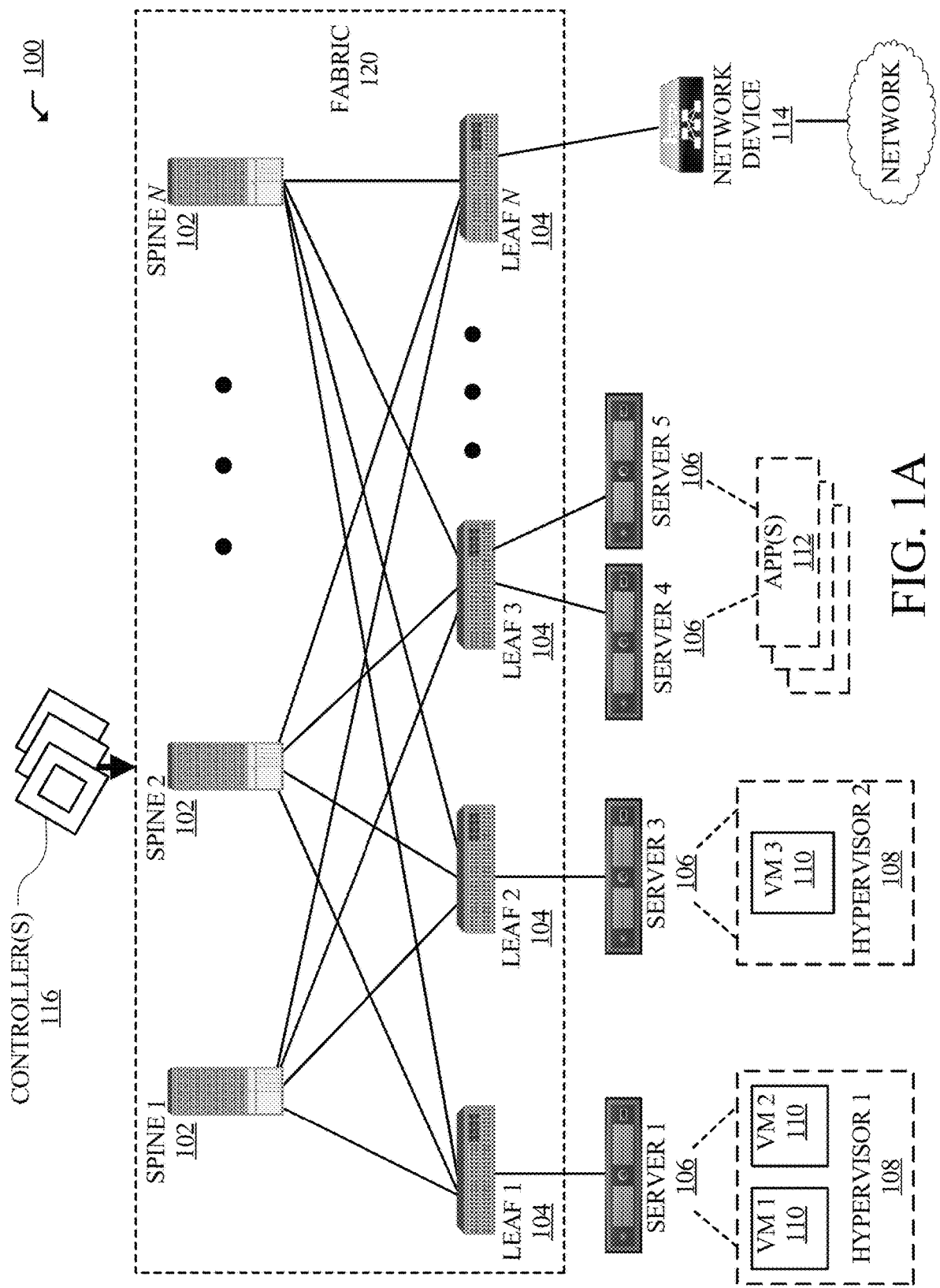

the system determines whether the service function chain is correctly configured.

20 Claims, 21 Drawing Sheets

(52) U.S. Cl.
CPC ............ *H04L 41/145* (2013.01); *H04L 41/50* (2013.01); *H04L 41/0806* (2013.01); *H04L 41/0813* (2013.01); *H04L 41/147* (2013.01)

(58) Field of Classification Search
CPC ............. H04L 41/0853; H04L 41/0866; H04L 41/0869; H04L 41/0893; H04L 41/12; H04L 41/14; H04L 41/145; H04L 41/147; H04L 41/50; H04L 41/5041; H04L 41/5045; H04L 41/5051; H04L 41/5054
See application file for complete search history.

(56) References Cited

U.S. PATENT DOCUMENTS

| | | | |
|---|---|---|---|
| 7,003,562 B2 | 2/2006 | Mayer | |
| 7,089,369 B2 | 8/2006 | Emberling | |
| 7,127,686 B2 | 10/2006 | Dreschler et al. | |
| 7,360,064 B1 | 4/2008 | Steiss et al. | |
| 7,453,886 B1 | 11/2008 | Allan | |
| 7,505,463 B2 | 3/2009 | Schuba et al. | |
| 7,548,967 B2 | 6/2009 | Amyot et al. | |
| 7,552,201 B2 | 6/2009 | Areddu et al. | |
| 7,609,647 B2 * | 10/2009 | Turk ................ H04L 41/0869 |
| | | | 370/252 |
| 7,619,989 B2 | 11/2009 | Guingo et al. | |
| 7,698,561 B2 | 4/2010 | Nagendra et al. | |
| 7,743,274 B2 | 6/2010 | Langford et al. | |
| 7,765,093 B2 | 7/2010 | Li et al. | |
| 8,010,952 B2 | 8/2011 | Datla et al. | |
| 8,073,935 B2 | 12/2011 | Viswanath | |
| 8,103,480 B2 | 1/2012 | Korn et al. | |
| 8,190,719 B2 | 5/2012 | Furukawa | |
| 8,209,738 B2 | 6/2012 | Nicol et al. | |
| 8,261,339 B2 | 9/2012 | Aldridge et al. | |
| 8,312,261 B2 | 11/2012 | Rao et al. | |
| 8,375,117 B2 | 2/2013 | Venable, Sr. | |
| 8,441,941 B2 | 5/2013 | McDade et al. | |
| 8,479,267 B2 | 7/2013 | Donley et al. | |
| 8,484,693 B2 | 7/2013 | Cox et al. | |
| 8,494,977 B1 | 7/2013 | Yehuda et al. | |
| 8,554,883 B2 | 10/2013 | Sankaran | |
| 8,589,934 B2 | 11/2013 | Makljenovic et al. | |
| 8,621,284 B2 | 12/2013 | Kato | |
| 8,627,328 B2 | 1/2014 | Mousseau et al. | |
| 8,693,344 B1 | 4/2014 | Adams et al. | |
| 8,761,036 B2 | 6/2014 | Fulton et al. | |
| 8,782,182 B2 | 7/2014 | Chaturvedi et al. | |
| 8,824,482 B2 | 9/2014 | Kajekar et al. | |
| 8,910,143 B2 | 12/2014 | Cohen et al. | |
| 8,914,843 B2 | 12/2014 | Bryan et al. | |
| 8,924,798 B2 | 12/2014 | Jerde et al. | |
| 9,019,840 B2 | 4/2015 | Salam et al. | |
| 9,038,151 B1 | 5/2015 | Chua et al. | |
| 9,055,000 B1 | 6/2015 | Ghosh et al. | |
| 9,106,555 B2 | 8/2015 | Agarwal et al. | |
| 9,137,096 B1 | 9/2015 | Yehuda et al. | |
| 9,225,601 B2 | 12/2015 | Khurshid et al. | |
| 9,246,818 B2 | 1/2016 | Deshpande et al. | |
| 9,264,922 B2 | 2/2016 | Gillot et al. | |
| 9,276,877 B1 | 3/2016 | Chua et al. | |
| 9,319,300 B2 | 4/2016 | Huynh Van et al. | |
| 9,344,348 B2 | 5/2016 | Ivanov et al. | |
| 9,369,434 B2 | 6/2016 | Kim et al. | |
| 9,389,993 B1 | 7/2016 | Okmyanskiy et al. | |
| 9,405,553 B2 | 8/2016 | Branson et al. | |
| 9,444,842 B2 | 9/2016 | Porras et al. | |
| 9,497,207 B2 | 11/2016 | Dhawan et al. | |
| 9,497,215 B2 | 11/2016 | Vasseur et al. | |
| 9,544,224 B2 | 1/2017 | Chu et al. | |
| 9,548,965 B2 | 1/2017 | Wang et al. | |
| 9,553,845 B1 | 1/2017 | Talmor et al. | |
| 9,571,502 B2 | 2/2017 | Basso et al. | |
| 9,571,523 B2 | 2/2017 | Porras et al. | |
| 9,594,640 B1 | 3/2017 | Chheda | |
| 9,596,141 B2 | 3/2017 | McDowall | |
| 9,641,249 B2 | 5/2017 | Kaneriya et al. | |
| 9,654,300 B2 | 5/2017 | Pani | |
| 9,654,361 B2 | 5/2017 | Vasseur et al. | |
| 9,654,409 B2 | 5/2017 | Yadav et al. | |
| 9,660,886 B1 | 5/2017 | Ye et al. | |
| 9,667,645 B1 | 5/2017 | Belani et al. | |
| 9,680,875 B2 | 6/2017 | Knjazihhin et al. | |
| 9,686,180 B2 | 6/2017 | Chu et al. | |
| 9,690,644 B2 | 6/2017 | Anderson et al. | |
| 9,781,004 B2 | 10/2017 | Danait et al. | |
| 2002/0143855 A1 | 10/2002 | Traversat et al. | |
| 2003/0229693 A1 | 12/2003 | Mahlik et al. | |
| 2004/0073647 A1 | 4/2004 | Gentile et al. | |
| 2004/0168100 A1 | 8/2004 | Thottan et al. | |
| 2005/0108389 A1 | 5/2005 | Kempin et al. | |
| 2007/0124437 A1 | 5/2007 | Chervets | |
| 2007/0214244 A1 | 9/2007 | Hitokoto et al. | |
| 2008/0031147 A1 | 2/2008 | Fieremans et al. | |
| 2008/0117827 A1 | 5/2008 | Matsumoto et al. | |
| 2008/0133731 A1 | 6/2008 | Bradley et al. | |
| 2008/0172716 A1 | 7/2008 | Talpade et al. | |
| 2009/0240758 A1 | 9/2009 | Pasko et al. | |
| 2009/0249284 A1 | 10/2009 | Antosz et al. | |
| 2010/0191612 A1 | 7/2010 | Raleigh | |
| 2010/0195537 A1 * | 8/2010 | Pelletier .............. H04L 41/0604 |
| | | | 370/255 |
| 2010/0198909 A1 | 8/2010 | Kosbab et al. | |
| 2011/0093612 A1 | 4/2011 | Murakami | |
| 2011/0295983 A1 | 12/2011 | Medved et al. | |
| 2012/0054163 A1 | 3/2012 | Liu et al. | |
| 2012/0198073 A1 | 8/2012 | Srikanth et al. | |
| 2012/0297061 A1 | 11/2012 | Pedigo et al. | |
| 2013/0097660 A1 | 4/2013 | Das et al. | |
| 2014/0019597 A1 | 1/2014 | Nath et al. | |
| 2014/0222996 A1 | 8/2014 | Vasseur et al. | |
| 2014/0304831 A1 | 10/2014 | Hidlreth et al. | |
| 2014/0307556 A1 | 10/2014 | Zhang | |
| 2014/0321277 A1 | 10/2014 | Lynn, Jr. et al. | |
| 2014/0379915 A1 | 12/2014 | Yang et al. | |
| 2015/0019756 A1 | 1/2015 | Masuda | |
| 2015/0124826 A1 | 5/2015 | Edsall et al. | |
| 2015/0244617 A1 | 8/2015 | Nakil et al. | |
| 2015/0271104 A1 | 9/2015 | Chikkamath et al. | |
| 2015/0365314 A1 | 12/2015 | Hiscock et al. | |
| 2016/0020993 A1 | 1/2016 | Wu et al. | |
| 2016/0026631 A1 | 1/2016 | Salam et al. | |
| 2016/0036636 A1 | 2/2016 | Erickson et al. | |
| 2016/0050117 A1 | 2/2016 | Voellmy et al. | |
| 2016/0050131 A1 * | 2/2016 | Zhang ................ H04L 41/0686 |
| | | | 370/244 |
| 2016/0080350 A1 | 3/2016 | Chaturvedi et al. | |
| 2016/0099883 A1 | 4/2016 | Voit et al. | |
| 2016/0149751 A1 | 5/2016 | Pani et al. | |
| 2016/0164748 A1 | 6/2016 | Kim | |
| 2016/0241436 A1 | 8/2016 | Fourie et al. | |
| 2016/0267384 A1 | 9/2016 | Salam et al. | |
| 2016/0352566 A1 | 12/2016 | Mekkattuparamban et al. | |
| 2016/0380892 A1 | 12/2016 | Mahadevan et al. | |
| 2017/0026292 A1 | 1/2017 | Smith et al. | |
| 2017/0048126 A1 | 2/2017 | Handige Shankar et al. | |
| 2017/0063599 A1 | 3/2017 | Wu et al. | |
| 2017/0093630 A1 | 3/2017 | Foulkes | |
| 2017/0093664 A1 | 3/2017 | Lynam et al. | |
| 2017/0093750 A1 | 3/2017 | McBride et al. | |
| 2017/0093918 A1 | 3/2017 | Banerjee et al. | |
| 2017/0111259 A1 | 4/2017 | Wen et al. | |
| 2017/0118167 A1 | 4/2017 | Subramanya et al. | |
| 2017/0126740 A1 | 5/2017 | Bejarano Ardila et al. | |
| 2017/0126792 A1 | 5/2017 | Halpern et al. | |
| 2017/0134233 A1 | 5/2017 | Dong et al. | |

(56) References Cited

U.S. PATENT DOCUMENTS

| | | | |
|---|---|---|---|
| 2017/0163442 A1 | 6/2017 | Shen et al. | |
| 2017/0187577 A1 | 6/2017 | Nevrekar et al. | |
| 2017/0195187 A1 | 7/2017 | Bennett et al. | |
| 2017/0206129 A1 | 7/2017 | Yankilevich et al. | |
| 2017/0279668 A1* | 9/2017 | Shevenell | H04L 41/12 |
| 2017/0295021 A1* | 10/2017 | Aranda Gutierrez | H04L 47/31 |
| 2017/0346752 A1* | 11/2017 | Krishnamurthy | H04L 45/306 |
| 2017/0353355 A1 | 12/2017 | Danait et al. | |
| 2018/0069749 A1* | 3/2018 | Singhal | H04L 41/0681 |
| 2018/0077037 A1* | 3/2018 | Zhang | H04L 41/0866 |

FOREIGN PATENT DOCUMENTS

| | | | | |
|---|---|---|---|---|
| CN | 105721297 | | 6/2016 | |
| CN | 106130766 | | 11/2016 | |
| CN | 106603264 | | 4/2017 | |
| CN | 103701926 | | 6/2017 | |
| WO | WO 2015/014177 | | 2/2015 | |
| WO | WO 2015/065353 | | 5/2015 | |
| WO | 2015187337 | A1 | 12/2015 | |
| WO | WO 2016/011888 | | 1/2016 | |
| WO | WO 2016/039730 | | 3/2016 | |
| WO | WO 2016/072996 | | 5/2016 | |
| WO | WO 2016/085516 | | 6/2016 | |
| WO | WO 2016/093861 | | 6/2016 | |
| WO | WO 2016/119436 | | 8/2016 | |
| WO | WO 2016/130108 | | 8/2016 | |
| WO | WO 2016/161127 | | 10/2016 | |
| WO | WO 2017/011607 | | 1/2017 | |
| WO | WO 2017/031922 | | 3/2017 | |
| WO | WO 2017/039606 | | 3/2017 | |
| WO | WO2017/086990 | A1 * | 5/2017 | H04L 41/0681 |
| WO | WO 2017/105452 | | 6/2017 | |

OTHER PUBLICATIONS

B. Tschaen, Y. Zhang, T. Benson, S. Banerjee, J. Lee and J. Kang, "SFC-Checker: Checking the correct forwarding behavior of Service Function chaining," 2016 IEEE Conference on Network Function Virtualization and Software Defined Networks (NFV-SDN), Palo Alto, CA, Nov. 7-10, 2016, pp. 134-140. (Year: 2016).*

L. Durante, L. Seno, F. Valenza and A. Valenzano, "A model for the analysis of security policies in service function chains," 2017 IEEE Conference on Network Softwarization (NetSoft), Bologna, Jul. 3-7, 2017, pp. 1-6. (Year: 2017).*

M. Flittner, J. M. Scheuermann and R. Bauer, "ChainGuard: Controller-independent verification of service function chaining in cloud computing," 2017 IEEE Conference on Network Function Virtualization and Software Defined Networks (NFV-SDN), Berlin, Nov. 6-8, 2017, pp. 1-7. (Year: 2017).*

X. Zhang, Qi Li, Jianping Wu and Jiahai Yang, "Generic and agile service function chain verification on cloud," 2017 IEEE/ACM 25th International Symposium on Quality of Service (IWQoS), Vilanova i la Geltru, Jun. 14-16, 2017, pp. 1-10. (Year: 2017).*

Author Unknown, "Aids to Pro-active Management of Distributed Resources through Dynamic Fault-Localization and Availability Prognosis," FaultLocalization-TR01-CADlab, May 2006, pp. 1-9.

Author Unknown, "Requirements for applying formal methods to software-defined networking," Telecommunication Standardization Sector of ITU, Series Y: Global Information Infrastructure, Internet Protocol Aspects and Next-Generation Networks, Apr. 8, 2015, pp. 1-20.

Cisco, "Verify Contracts and Rules in the ACI Fabric," Cisco, Updated Aug. 19, 2016, Document ID: 119023, pp. 1-20.

De Silva et al., "Network-wide Security Analysis," Semantic Scholar, Oct. 25, 2011, pp. 1-11.

Feldmann, Anja, et al., "IP Network Configuration for Intradomain Traffic Engineering," Semantic Scholar, accessed on Jul. 20, 2017, pp. 1-27.

Han, Yoonseon, et al., "An Intent-based Network Virtualization Platform for SDN," 2016 I FIP, pp. 1-6.

Han, Wonkyu, et al., "LPM: Layered Policy Management for Software-Defined Networks," Mar. 8, 2016, pp. 1-8.

Kazemian, Peyman, et al., "Real Time Network Policy Checking using Header Space Analysis," USENIX Association, 10th USENIX Symposium on Networked Systems Design and Implementation (NSDI '13) pp. 99-111.

Khatkar, Pankaj Kumar, "Firewall Rule Set Analysis and Visualization, A Thesis Presented in Partial Fulfillment of the Requirements for the Degree Master of Science," Arizona State University, Dec. 2014, pp. 1-58.

Le, Franck, et al., "Minerals: Using Data Mining to Detect Router Misconfigurations," CyLab, Carnegie Mellon University, CMU-CyLab-06-008, May 23, 2006, pp. 1-14.

Liang, Chieh-Jan Mike, et al., "SIFT: Building an Internet of Safe Things," Microsoft, IPSN' 15, Apr. 14-16, 2015, Seattle, WA, ACM 978, pp. 1-12.

Liu, Jason, et al., "A Real-Time Network Simulation Infrastructure Based on Open VPN," Journal of Systems and Software, Aug. 4, 2008, pp. 1-45.

Lopes, Nuno P., et al., "Automatically verifying reachability and well-formedness in P4 Networks," Microsoft, accessed on Jul. 18, 2017, pp. 1-13.

Mai, Haohui, et al., "Debugging the Data Plane with Anteater," SIGCOMM11, Aug. 15-19, 2011, pp. 1-12.

Miller, Nancy, et al., "Collecting Network Status Information for Network-Aware Applications," INFOCOM 2000, pp. 1-10.

Miranda, Joao Sales Henriques, "Fault Isolation in Software Defined Networks," www.gsd.inescid.pt, pp. 1-10.

Moon, Daekyeong, et al., "Bridging the Software/Hardware Forwarding Divide," Berkeley.edu, Dec. 18, 2010, pp. 1-15.

Shin, Seugwon, et al., "FRESCO: Modular Composable Security Services for Software-Defined Networks," To appear in the ISOC Network and Distributed System Security Symposium, Feb. 2013, pp. 1-16.

Shukla, Apoorv, et al., "Towards meticulous data plane monitoring," kaust.edu.sa, access on Aug. 1, 2017, pp. 1-2.

Tang, Yongning, et al., "Automatic belief network modeling via policy inference for SDN fault localization," Journal of Internet Services and Applications, 2016, pp. 1-13.

Tomar, Kuldeep, et al., "Enhancing Network Security and Performance Using Optimized ACLs," International Journal in Foundations of Computer Science & Technology (IJFCST), vol. 4, No. 6, Nov. 2014, pp. 25-35.

Tongaonkar, Alok, et al., "Inferring Higher Level Policies from Firewall Rules," Proceedings of the 21st Large Installation System Administration Conference (LISA '07), Nov. 11-16, 2007, pp. 1-14.

Zhou, Shijie, et al., "High-Performance Packet Classification on GPU," 2014 IEEE, pp. 1-6.

Fayaz et al., "Efficient Network Reachability Analysis using a Succinct Control lane Representation," 2016, ratul.org, pp. 1-16.

Akella, Aditya, et al., "A Highly Available Software Defined Fabric," HotNets-XIII, Oct. 27-28, 2014, Los Angeles, CA, USA, Copyright 2014, ACM, pp. 1-7.

Alsheikh, Mohammad Abu, et al., "Machine Learning in Wireless Sensor Networks: Algorithms, Strategies, and Application," Mar. 19, 2015, pp. 1-23.

Cisco Systems, Inc., "Cisco Application Centric Infrastructure 9ACI Endpoint Groups (EPG) Usange and Design," White Paper, May 2014, pp. 1-14.

Dhawan, Mohan, et al., "SPHINX: Detecting Security Attacks in Software-Defined Networks," NDSS 2015, Feb. 8-11, 2015, San Diego, CA, USA, Copyright 2015 Internet Society, pp. 1-15.

Lindem, A., et al., "Network Device Yang Organizational Model draft-rtgyangdt-rtgwg-device-model-01," Network Working Group, Internet-draft, Sep. 21, 2015, pp. 1-33.

Panda, Aurojit, et al., "SCL: Simplifying Distributed SDN Control Planes," people.eecs.berkeley.edu, Mar. 2017, pp. 1-17.

Yu et al., "A Flexible Framework for Wireless-Based Intelligent Sensor with Reconfigurability, Dynamic adding, and Web interface," Conference Paper, Jul. 24, 2006, IEEE 2006, pp. 1-7.

(56) References Cited

OTHER PUBLICATIONS

International Search Report and Written Opinion from the International Searching Authority, dated Jul. 4, 2018, 16 pages, for the corresponding International Application PCT/US2018/026229.

* cited by examiner

INPUT AND OUTPUT OF POLICY ANALYZER

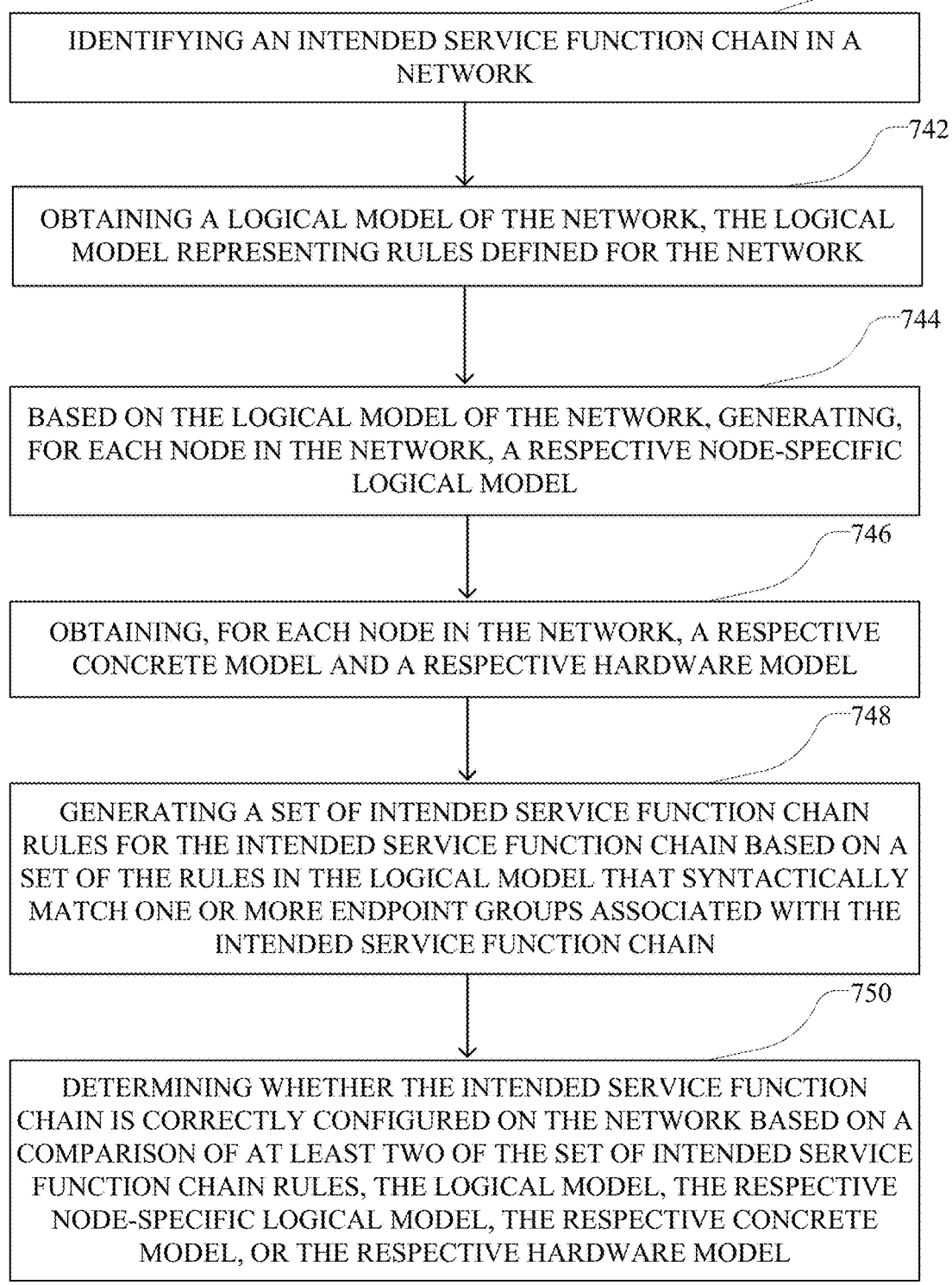

POLICY ASSURANCE FOR SERVICE CHAINING

CROSS-REFERENCE TO RELATED APPLICATIONS

This application claims the benefit of, and priority to, U.S. Provisional Patent Application No. 62/487,924, filed on Apr. 20, 2017, entitled "POLICY ASSURANCE FOR SERVICE CHAINING", the contents of which are hereby expressly incorporated by reference in its entirety.

TECHNICAL FIELD

The present technology pertains to network configuration and troubleshooting, and more specifically to policy assurance for network service chain functions.

BACKGROUND

Deploying a Layer 4 (L4) through Layer 7 (L7) network service (e.g., a firewall, load balancer, etc.) typically requires the network operator to configure the network such that network traffic is guaranteed to pass through a specific network service appliance. Such is the case irrespective of whether the service function appliance is a physical device or virtual service. This configuration process is onerous and error-prone. Due to the distributed nature of the network configuration, an individual network device cannot verify or guarantee that traffic is not bypassing the specific network service appliance. Moreover, manually verifying the network configuration can be extremely difficult. Even when test packets are used to manually verify the network configuration, this verification mechanism does not scale with the size of the network. In addition, manual verification is typically only done reactively after a problem has occurred. This can lead to security and performance vulnerabilities, as well as extended periods of unintended network behavior.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIGS. 1A and 1B illustrate example network environments;

FIG. 1C illustrates a schematic diagram of an example network service function chain;

FIG. 2A illustrates an example object model for a network;

FIG. 2B illustrates an example object model for a tenant object in the example object model from FIG. 2A;

FIG. 2C illustrates an example association of various objects in the example object model from FIG. 2A;

FIG. 2D illustrates a schematic diagram of example models for implementing the example object model from FIG. 2A;

FIG. 2E illustrates a diagram of an example service graph deployment;

FIG. 3A illustrates an example assurance appliance system;

FIG. 3B illustrates an example system diagram for network assurance;

FIG. 4A illustrates an example diagram for constructing a network-wide logical model of a network;

FIG. 4B illustrates an example diagram for constructing device-specific logical models based on a logical model of a network;

FIG. 5A illustrates a schematic diagram of an example policy analyzer;

FIG. 5B illustrates an equivalency diagram for different network models;

FIG. 5C illustrates an example architecture for identifying conflict rules;

FIG. 6A illustrates a first example conflict Reduced Ordered Binary Decision Diagram (ROBDD);

FIG. 6B illustrates a second example conflict ROBDD;

FIG. 6C illustrates the example conflict ROBDD of FIG. 6B with an added rule;

FIG. 7A illustrates an example method for network assurance;

FIGS. 7B and 7C illustrate example methods for assurance of network service chain configurations;

FIG. 8 illustrates an example network device; and

FIG. 9 illustrates an example computing device.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

OVERVIEW

Software-defined networks (SDNs), such as application-centric infrastructure (ACI) networks, can be managed and configured from one or more centralized network elements, such as application policy infrastructure controllers (APICs) in an ACI network or network managers in other SDN networks. A network operator can define various configurations, objects, rules, etc., for the SDN network, which can be implemented by the one or more centralized network elements. The configuration information provided by the network operator can reflect the network operator's intent for the SDN network, meaning, how the network operator intends for the SDN network and its components to operate. Such user intents can be programmatically encapsulated in logical models stored at the centralized network elements. The logical models can represent the user intents and reflect the configuration of the SDN network. For example, the logical models can represent the object and policy universe (e.g., endpoints, tenants, endpoint groups, networks or contexts, application profiles, services, domains, policies, etc.) as defined for the particular SDN network by the user intents and/or centralized network elements.

In many cases, various nodes and/or controllers in a network may contain respective information or representations of the network and network state. For example, different controllers may store different logical models of the network and each node in the fabric of the network may contain its own configuration model for the network. The approaches set forth herein provide a proactive mechanism for service function chain configuration and verification. The technologies herein can verify and confirm service function chain configurations and is capable of detecting a wide range of possible configuration errors.

For example, in the context of software-defined networking (SDN), such as application-centric infrastructure (ACI) networking, there are various types of errors that often occur. In one example, the operator may supply an erroneous configuration to the centralized controller. This results in errors and misconfiguration problems. In another example, the controller may incorrectly render the network configuration onto a network device. This can be caused by various issues, such as software and/or hardware bugs, resource shortages on the network device, hardware failures, and other problems. The approaches herein can detect these and other errors and verify proactively the service chain configuration and consistency between the SDN controller and the network devices. A GUI (graphical user interface) can display inconsistencies identified due to operator configuration errors, incorrect rendering of policies by devices in the network, as well as other configuration problems, and provide visual tools to address such errors and inconsistencies.

Disclosed herein are systems, methods, and computer-readable media for policy assurance for service chaining. In some examples, a system or method obtains a plurality of models associated with a network. The plurality of models include a network-wide logical model representing rules defined for the network, a respective node-level logical model for each node in the network, a respective concrete model for each node in the network, and a respective hardware model for each node in the network.

The respective node-level logical model can include at least a portion of the rules defined in the network-wide logical model. The portion of the rules can include those of the rules defined for the network-wide logical model which correspond to the node. Thus, the respective node-level logical model can project the network-wide logical model onto the node. The respective concrete model can include software rendered rules on a software environment of the node, such as an operating system. The respective hardware model can include hardware rendered rules on a hardware of the node, such as TCAM rules.

Based on at least one of the plurality of models, the system can identify an intended service function chain in the network. The system can also determine a respective set of intended service function chain rules for the intended service function chain based on respective rules in at least one of the plurality of models. The respective rules can correspond to endpoint groups associated with elements in the intended service function chain.

For each node, the system can determine whether the respective set of intended service function chain rules is correctly captured by the rules in the respective node-level logical model and/or the respective concrete model, to yield a respective node-level containment check result for the node. Based on a comparison of respective policy actions in the respective concrete model, the respective hardware model, and the respective node-level logical model and/or the network-wide logical model, the system can determine whether the respective set of intended service function chain rules associated with the network-wide logical model are correctly rendered on each node to yield a node-level rendering check result. Based on the respective node-level containment check result and the node-level rendering check result, the system can determine whether the intended service function chain is correctly configured on the network.

EXAMPLE EMBODIMENTS

Figure 1B:
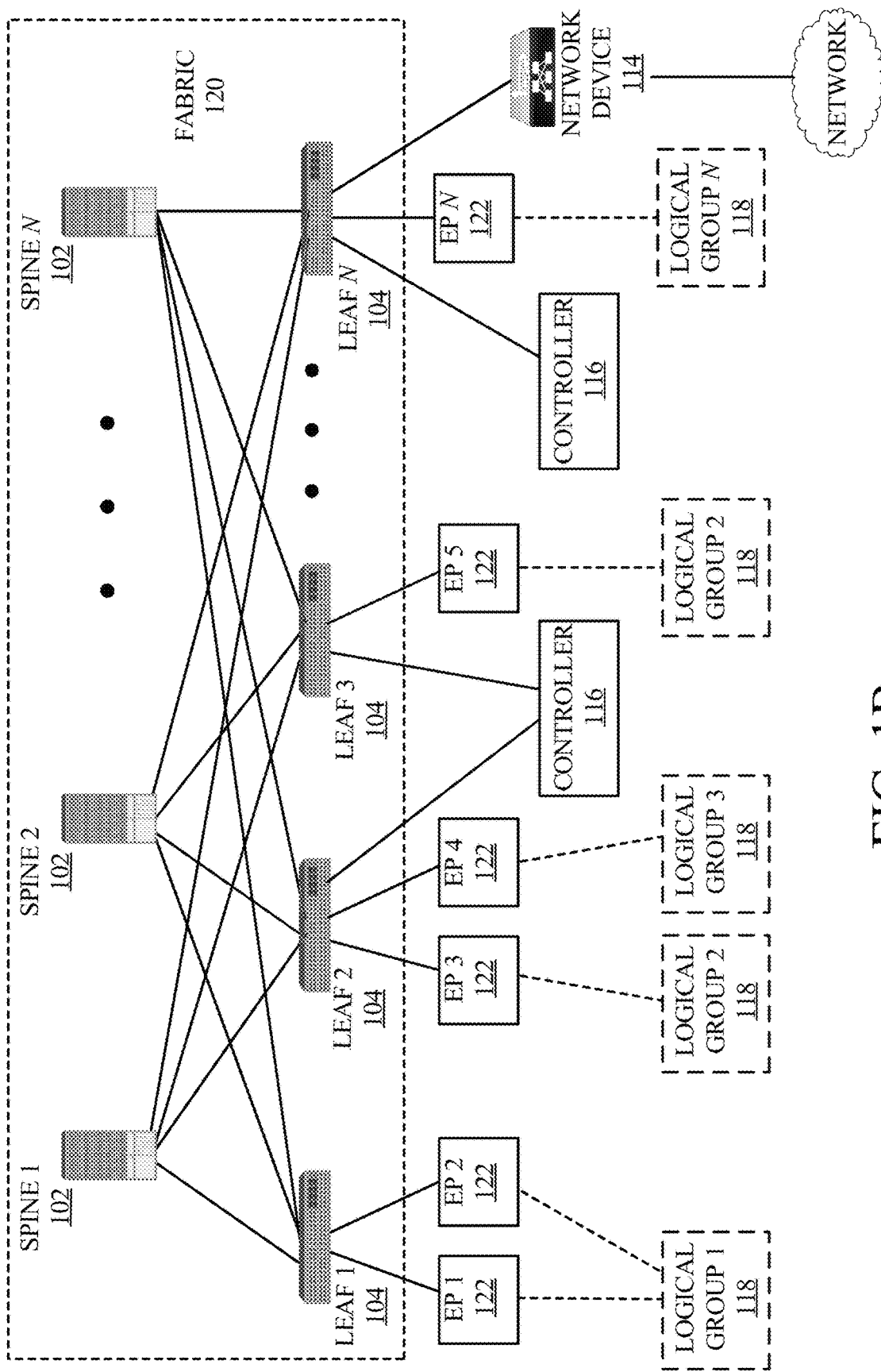

The disclosed technology addresses the need in the art for accurate and efficient policy assurance for service chaining. The present technology involves system, methods, and computer-readable media for policy assurance of service chaining configurations for network service chains. The present technology will be described in the following disclosure as follows. The discussion begins with an introductory discussion of network assurance and a description of example computing environments, as illustrated in FIGS. 1A and 1B.

Figure 8:
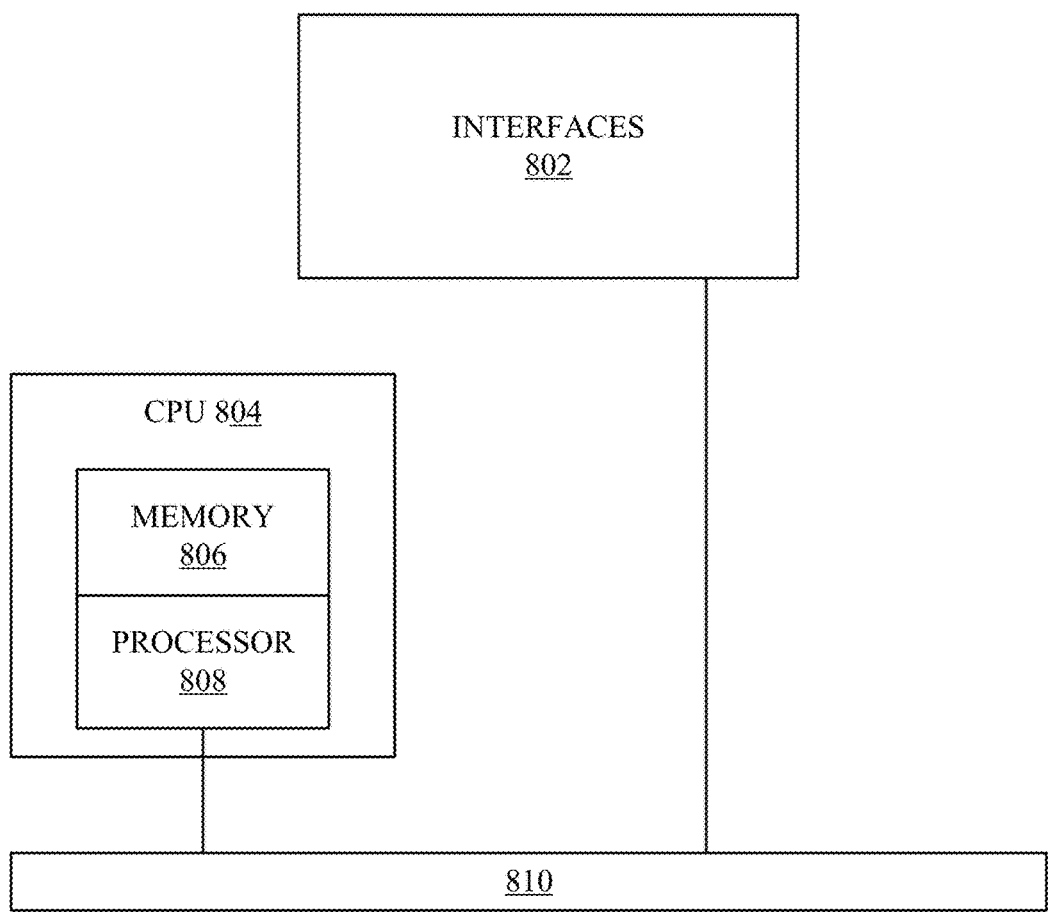
Figure 9:
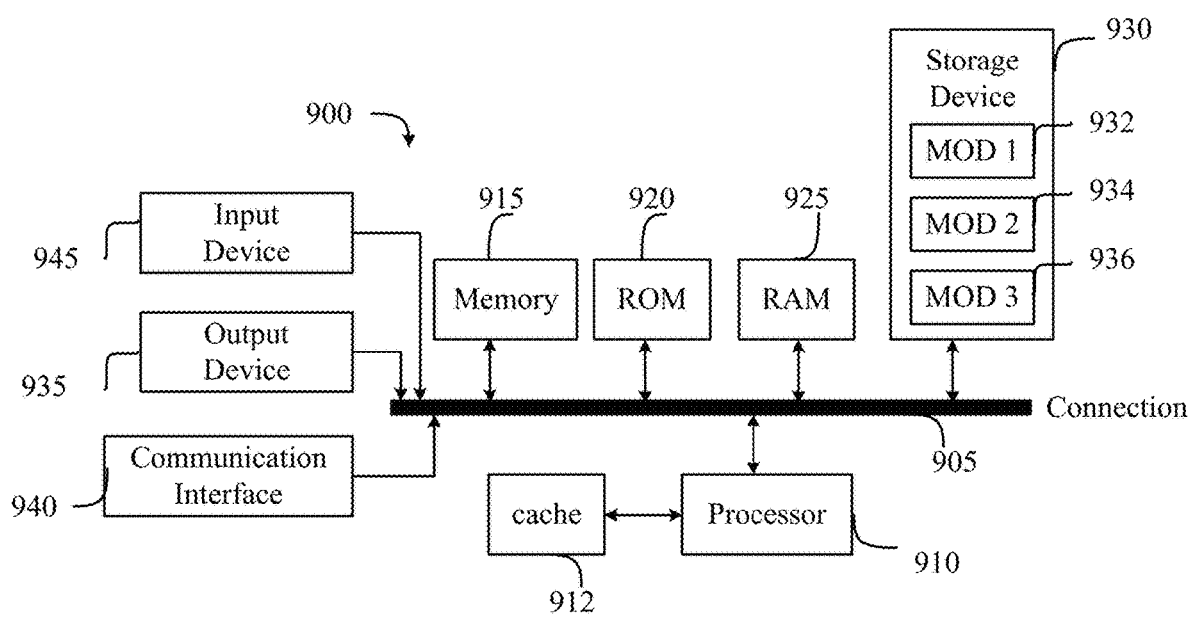

A discussion of network models for network assurance, as shown in FIGS. 2A through 2D, and network modeling and assurance systems, as shown in FIGS. 3A-C through 7A-C will then follow. The discussion concludes with a description of example network and computing devices, as illustrated in FIGS. 8 and 9, including example hardware components suitable for hosting software applications and performing computing operations.

The disclosure now turns to an introductory discussion of network assurance concepts, including policy assurance for service chaining.

Network assurance is the guarantee or determination that the network is behaving as intended by the network operator and has been configured properly (e.g., the network is doing what it is intended to do). Intent can encompass various network operations, such as bridging, routing, security, service chaining, endpoints, compliance, QoS (Quality of Service), audits, etc. Intent can be embodied in one or more policies, settings, configurations, etc., defined for the network and individual network elements (e.g., switches, routers, applications, resources, etc.). In some cases, the configurations, policies, etc., defined by a network operator may not be accurately reflected in the actual behavior of the network. For example, a network operator specifies a configuration A for one or more types of traffic but later finds out that the network is actually applying configuration B to that traffic or otherwise processing that traffic in a manner that is inconsistent with configuration A. This can be a result of many different causes, such as hardware errors, software bugs, varying priorities, configuration conflicts, misconfiguration of one or more settings, improper rule rendering by devices, unexpected errors or events, software upgrades, configuration changes, failures, etc. As another example, a network operator defines configuration C for the network, but one or more configurations in the network cause the network to behave in a manner that is inconsistent with the intent reflected by the network operator's implementation of configuration C.

The approaches herein can provide network assurance by modeling various aspects of the network and/or performing consistency checks as well as other network assurance checks. The network assurance approaches herein can be implemented in various types of networks, including a private network, such as a local area network (LAN); an enterprise network; a standalone or traditional network, such as a data center network; a network including a physical or underlay layer and a logical or overlay layer, such as a VXLAN or software-defined network (SDN) (e.g., Application Centric Infrastructure (ACI) or VMware NSX networks); etc.

Network models can be constructed for a network and implemented for network assurance. A network model can provide a representation of one or more aspects of a network, including, without limitation the network's policies, configurations, requirements, security, routing, topology, applications, hardware, filters, contracts, access control lists, infrastructure, etc. For example, a network model can provide a mathematical representation of configurations in the network. As will be further explained below, different types of models can be generated for a network.

Such models can be implemented to ensure that the behavior of the network will be consistent (or is consistent) with the intended behavior reflected through specific configurations (e.g., policies, settings, definitions, etc.) implemented by the network operator. Unlike traditional network monitoring, which involves sending and analyzing data packets and observing network behavior, network assurance can be performed through modeling without necessarily ingesting packet data or monitoring traffic or network behavior. This can result in foresight, insight, and hindsight: problems can be prevented before they occur, identified when they occur, and fixed immediately after they occur.

Thus, network assurance can involve modeling properties of the network to deterministically predict the behavior of the network. The network can be determined to be healthy if the model(s) indicate proper behavior (e.g., no inconsistencies, conflicts, errors, etc.). The network can be determined to be functional, but not fully healthy, if the modeling indicates proper behavior but some inconsistencies. The network can be determined to be non-functional and not healthy if the modeling indicates improper behavior and errors. If inconsistencies or errors are detected by the modeling, a detailed analysis of the corresponding model(s) can allow one or more underlying or root problems to be identified with great accuracy.

The modeling can consume numerous types of smart events which model a large amount of behavioral aspects of the network. Smart events can impact various aspects of the network, such as underlay services, overlay services, tenant connectivity, tenant security, tenant end point (EP) mobility, tenant policy, tenant routing, resources, etc.

In some cases, models can be implemented to verify service function chain configurations. An example service function chain configuration check is described below. For explanation purposes, the example check is described in the context of an ACI network.

In an ACI network, the network operator's intended service function chain, as well as intended service function chain behavior, can be represented in various forms, such as a logical network service graph, a specification with vertices (EPGs) and edges (network services), explicit rules corresponding to the service function chain, etc. This network service function chain intent can be considered the ground truth for determining whether a service function chain is configured as intended, as it reflects the true intent of the network operator. The routing and policy configuration of the network can thus be verified vis-à-vis this service function chain intent.

Verification of service function chain configurations can be performed in several stages. First, a network-wide logical model of the network can be transformed into node-level or node-specific logical models, including one for each node (e.g., switch) in the network. The software configuration in a node can be represented in a "concrete model", and the hardware configuration (e.g., TCAM configuration) can be represented in a "hardware model". The software and hardware configurations on a node can be collected or polled from each node. A set of intended network service chain rules can be constructed using rules in the logical model that syntactically match the EPGs in the elements of the intended service function chain.

Routing configurations for the service function chain can be verified in the logical and concrete models for each node separately. In a correctly configured service function chain, the rules of the intended service function chain are logically contained in the global logical policy. This can be verified in a containment check, which can be performed for each node. In some examples, to perform a containment check, a set of Boolean functions is generated for the intended service function chain rules and the logical policy rules. Each Boolean function corresponds to one action in the logical policy and returns "true" for a packet header if the corresponding ruleset performs that action for that packet.

Boolean functions can be represented by a specific structure. For example, Boolean functions can be represented by reduced ordered binary decision diagrams (ROBDDs). For explanation purposes, ROBDDs will be used in the following examples. However, it should be noted that other representations are also possible and contemplated herein.

ROBDDs can also be used to check if the logical model has been correctly rendered onto each node. If either the node-level containment checks or the rendering checks fail, the ROBDDs can be used to identify which EPG pairs contracts caused the failure. Application of ROBDDs is explained further below.

Check results can be aggregated along various dimensions. For example, the node-level containment check results can be aggregated to a single network-wide service function chain containment result. Moreover, the EPG pair-wise containment check results can be aggregated across nodes to a network-wide EPG pair containment result. The results of all the checks performed along with the aggregated results can be timestamped and written to a database or storage.

Having described various aspects of network assurance, the disclosure now turns to a discussion of example network environments.

FIG. 1A illustrates a diagram of an example Network Environment 100, such as a data center. The Network Environment 100 can include a Fabric 120 which can represent the physical layer or infrastructure (e.g., underlay) of the Network Environment 100. Fabric 120 can include Spines 102 (e.g., spine routers or switches) and Leafs 104 (e.g., leaf routers or switches) which can be interconnected for routing or switching traffic in the Fabric 120. Spines 102 can interconnect Leafs 104 in the Fabric 120, and Leafs 104 can connect the Fabric 120 to an overlay or logical portion of the Network Environment 100, which can include application services, servers, virtual machines, containers, endpoints, etc. Thus, network connectivity in the Fabric 120 can flow from Spines 102 to Leafs 104, and vice versa. The interconnections between Leafs 104 and Spines 102 can be redundant (e.g., multiple interconnections) to avoid a failure in routing. In some embodiments, Leafs 104 and Spines 102 can be fully connected, such that any given Leaf is connected to each of the Spines 102, and any given Spine is connected to each of the Leafs 104. Leafs 104 can be, for example, top-of-rack ("ToR") switches, aggregation switches, gateways, ingress and/or egress switches, provider edge devices, and/or any other type of routing or switching device.

Leafs 104 can be responsible for routing and/or bridging tenant or customer packets and applying network policies or rules. Network policies and rules can be driven by one or more Controllers 116, and/or implemented or enforced by one or more devices, such as Leafs 104. Leafs 104 can connect other elements to the Fabric 120. For example, Leafs 104 can connect Servers 106, Hypervisors 108, Virtual Machines (VMs) 110, Applications 112, Network Device 114, etc., with Fabric 120. Such elements can reside in one or more logical or virtual layers or networks, such as an overlay network. In some cases, Leafs 104 can encapsulate and decapsulate packets to and from such elements (e.g., Servers 106) in order to enable communications throughout Network Environment 100 and Fabric 120. Leafs 104 can also provide any other devices, services, tenants, or workloads with access to Fabric 120. In some cases, Servers 106 connected to Leafs 104 can similarly encapsulate and decapsulate packets to and from Leafs 104. For example, Servers 106 can include one or more virtual switches or routers or tunnel endpoints for tunneling packets between an overlay or logical layer hosted by, or connected to, Servers 106 and an underlay layer represented by Fabric 120 and accessed via Leafs 104.

Applications 112 can include software applications, services, containers, appliances, functions, service chains, etc. For example, Applications 112 can include a firewall, a database, a CDN server, an IDS/IPS, a deep packet inspection service, a message router, a virtual switch, etc. An application from Applications 112 can be distributed, chained, or hosted by multiple endpoints (e.g., Servers 106, VMs 110, etc.), or may run or execute entirely from a single endpoint.

VMs 110 can be virtual machines hosted by Hypervisors 108 or virtual machine managers running on Servers 106. VMs 110 can include workloads running on a guest operating system on a respective server. Hypervisors 108 can provide a layer of software, firmware, and/or hardware that creates, manages, and/or runs the VMs 110. Hypervisors 108 can allow VMs 110 to share hardware resources on Servers 106, and the hardware resources on Servers 106 to appear as multiple, separate hardware platforms. Moreover, Hypervisors 108 on Servers 106 can host one or more VMs 110.

In some cases, VMs 110 and/or Hypervisors 108 can be migrated to other Servers 106. Servers 106 can similarly be migrated to other locations in Network Environment 100. For example, a server connected to a specific leaf can be changed to connect to a different or additional leaf. Such configuration or deployment changes can involve modifications to settings, configurations and policies that are applied to the resources being migrated as well as other network components.

In some cases, one or more Servers 106, Hypervisors 108, and/or VMs 110 can represent or reside in a tenant or customer space. Tenant space can include workloads, services, applications, devices, networks, and/or resources that are associated with one or more clients or subscribers. Accordingly, traffic in Network Environment 100 can be routed based on specific tenant policies, spaces, agreements, configurations, etc. Moreover, addressing can vary between one or more tenants. In some configurations, tenant spaces can be divided into logical segments and/or networks and separated from logical segments and/or networks associated with other tenants. Addressing, policy, security and configuration information between tenants can be managed by Controllers 116, Servers 106, Leafs 104, etc.

Configurations in Network Environment 100 can be implemented at a logical level, a hardware level (e.g., physical), and/or both. For example, configurations can be implemented at a logical and/or hardware level based on endpoint or resource attributes, such as endpoint types and/or application groups or profiles, through a software-defined network (SDN) framework (e.g., Application-Centric Infrastructure (ACI) or VMWARE NSX). To illustrate, one or more administrators can define configurations at a logical level (e.g., application or software level) through Controllers 116, which can implement or propagate such configurations through Network Environment 100. In some examples, Controllers 116 can be Application Policy Infrastructure Controllers (APICs) in an ACI framework. In other examples, Controllers 116 can be one or more management components for associated with other SDN solutions, such as NSX Managers.

Such configurations can define rules, policies, priorities, protocols, attributes, objects, etc., for routing and/or classifying traffic in Network Environment 100. For example, such configurations can define attributes and objects for classifying and processing traffic based on Endpoint Groups (EPGs), Security Groups (SGs), VM types, bridge domains (BDs), virtual routing and forwarding instances (VRFs), tenants, priorities, firewall rules, etc. Other example network objects and configurations are further described below. Traffic policies and rules can be enforced based on tags, attributes, or other characteristics of the traffic, such as protocols associated with the traffic, EPGs associated with the traffic, SGs associated with the traffic, network address information associated with the traffic, etc. Such policies and rules can be enforced by one or more elements in Network Environment 100, such as Leafs 104, Servers 106, Hypervisors 108, Controllers 116, etc. As previously explained, Network Environment 100 can be configured according to one or more particular software-defined network (SDN) solutions, such as CISCO ACI or VMWARE NSX. These example SDN solutions are briefly described below.

ACI can provide an application-centric or policy-based solution through scalable distributed enforcement. ACI supports integration of physical and virtual environments under a declarative configuration model for networks, servers, services, security, requirements, etc. For example, the ACI framework implements EPGs, which can include a collection of endpoints or applications that share common configuration requirements, such as security, QoS, services, etc. Endpoints can be virtual/logical or physical devices, such as VMs, containers, hosts, or physical servers that are connected to Network Environment 100. Endpoints can have one or more attributes such as a VM name, guest OS name, a security tag, application profile, etc. Application configurations can be applied between EPGs, instead of endpoints directly, in the form of contracts. Leafs 104 can classify incoming traffic into different EPGs. The classification can be based on, for example, a network segment identifier such as a VLAN ID, VXLAN Network Identifier (VNID), NVGRE Virtual Subnet Identifier (VSID), MAC address, IP address, etc.

In some cases, classification in the ACI infrastructure can be implemented by Application Virtual Switches (AVS), which can run on a host, such as a server or switch. For example, an AVS can classify traffic based on specified attributes, and tag packets of different attribute EPGs with different identifiers, such as network segment identifiers (e.g., VLAN ID). Finally, Leafs 104 can tie packets with their attribute EPGs based on their identifiers and enforce policies, which can be implemented and/or managed by one or more Controllers 116. Leaf 104 can classify to which EPG the traffic from a host belongs and enforce policies accordingly.

Another example SDN solution is based on VMWARE NSX. With VMWARE NSX, hosts can run a distributed firewall (DFW) which can classify and process traffic. Consider a case where three types of VMs, namely, application, database and web VMs, are put into a single layer-2 network segment. Traffic protection can be provided within the network segment based on the VM type. For example, HTTP traffic can be allowed among web VMs, and disallowed between a web VM and an application or database VM. To classify traffic and implement policies, VMWARE NSX can implement security groups, which can be used to group the specific VMs (e.g., web VMs, application VMs, database VMs). DFW rules can be configured to implement policies for the specific security groups. To illustrate, in the context of the previous example, DFW rules can be configured to block HTTP traffic between web, application, and database security groups.

Returning now to FIG. 1A, Network Environment 100 can deploy different hosts via Leafs 104, Servers 106, Hypervisors 108, VMs 110, Applications 112, and Controllers 116, such as VMWARE ESXi hosts, WINDOWS HYPER-V hosts, bare metal physical hosts, etc. Network Environment 100 may interoperate with a variety of Hypervisors 108, Servers 106 (e.g., physical and/or virtual servers), SDN orchestration platforms, etc. Network Environment 100 may implement a declarative model to allow its integration with application design and holistic network policy.

Controllers 116 can provide centralized access to fabric information, application configuration, resource configuration, application-level configuration modeling for a software-defined network (SDN) infrastructure, integration with management systems or servers, etc. Controllers 116 can form a control plane that interfaces with an application plane via northbound APIs and a data plane via southbound APIs.

As previously noted, Controllers 116 can define and manage application-level model(s) for configurations in Network Environment 100. In some cases, application or device configurations can also be managed and/or defined by other components in the network. For example, a hypervisor or virtual appliance, such as a VM or container, can run a server or management tool to manage software and services in Network Environment 100, including configurations and settings for virtual appliances.

As illustrated above, Network Environment 100 can include one or more different types of SDN solutions, hosts, etc. For the sake of clarity and explanation purposes, various examples in the disclosure will be described with reference to an ACI framework, and Controllers 116 may be interchangeably referenced as controllers, APICs, or APIC controllers. However, it should be noted that the technologies and concepts herein are not limited to ACI solutions and may be implemented in other architectures and scenarios, including other SDN solutions as well as other types of networks which may not deploy an SDN solution.

Further, as referenced herein, the term "hosts" can refer to Servers 106 (e.g., physical or logical), Hypervisors 108, VMs 110, containers (e.g., Applications 112), etc., and can run or include any type of server or application solution. Non-limiting examples of "hosts" can include virtual switches or routers, such as distributed virtual switches (DVS), application virtual switches (AVS), vector packet processing (VPP) switches; VCENTER and NSX MANAGERS; bare metal physical hosts; HYPER-V hosts; VMs; DOCKER Containers; etc.

FIG. 1B illustrates another example of Network Environment 100. In this example, Network Environment 100 includes Endpoints 122 connected to Leafs 104 in Fabric 120. Endpoints 122 can be physical and/or logical or virtual entities, such as servers, clients, VMs, hypervisors, software containers, applications, resources, network devices, workloads, etc. For example, an Endpoint 122 can be an object that represents a physical device (e.g., server, client, switch, etc.), an application (e.g., web application, database application, etc.), a logical or virtual resource (e.g., a virtual switch, a virtual service appliance, a virtualized network function (VNF), a VM, a service chain, etc.), a container running a software resource (e.g., an application, an appliance, a VNF, a service chain, etc.), storage, a workload or workload engine, etc. Endpoints 122 can have an address (e.g., an identity), a location (e.g., host, network segment, virtual routing and forwarding (VRF) instance, domain, etc.), one or more attributes (e.g., name, type, version, patch level, OS name, OS type, etc.), a tag (e.g., security tag), a profile, etc.

Endpoints 122 can be associated with respective Logical Groups 118. Logical Groups 118 can be logical entities containing endpoints (physical and/or logical or virtual) grouped together according to one or more attributes, such as endpoint type (e.g., VM type, workload type, application type, etc.), one or more requirements (e.g., policy requirements, security requirements, QoS requirements, customer requirements, resource requirements, etc.), a resource name (e.g., VM name, application name, etc.), a profile, platform or operating system (OS) characteristics (e.g., OS type or name including guest and/or host OS, etc.), an associated network or tenant, one or more policies, a tag, etc. For example, a logical group can be an object representing a collection of endpoints grouped together. To illustrate, Logical Group 1 can contain client endpoints, Logical Group 2 can contain web server endpoints, Logical Group 3 can contain application server endpoints, Logical Group N can contain database server endpoints, etc. In some examples, Logical Groups 118 are EPGs in an ACI environment and/or other logical groups (e.g., SGs) in another SDN environment.

Traffic to and/or from Endpoints 122 can be classified, processed, managed, etc., based Logical Groups 118. For example, Logical Groups 118 can be used to classify traffic to or from Endpoints 122, apply policies to traffic to or from Endpoints 122, define relationships between Endpoints 122, define roles of Endpoints 122 (e.g., whether an endpoint consumes or provides a service, etc.), apply rules to traffic to or from Endpoints 122, apply filters or access control lists (ACLs) to traffic to or from Endpoints 122, define communication paths for traffic to or from Endpoints 122, enforce requirements associated with Endpoints 122, implement security and other configurations associated with Endpoints 122, etc.

In an ACI environment, Logical Groups 118 can be EPGs used to define contracts in the ACI. Contracts can include rules specifying what and how communications between EPGs take place. For example, a contract can define what provides a service, what consumes a service, and what policy objects are related to that consumption relationship. A contract can include a policy that defines the communication path and all related elements of a communication or relationship between endpoints or EPGs. For example, a Web EPG can provide a service that a Client EPG consumes, and that consumption can be subject to a filter (ACL) and a service graph that includes one or more services, such as firewall inspection services and server load balancing.

Figure 1C:
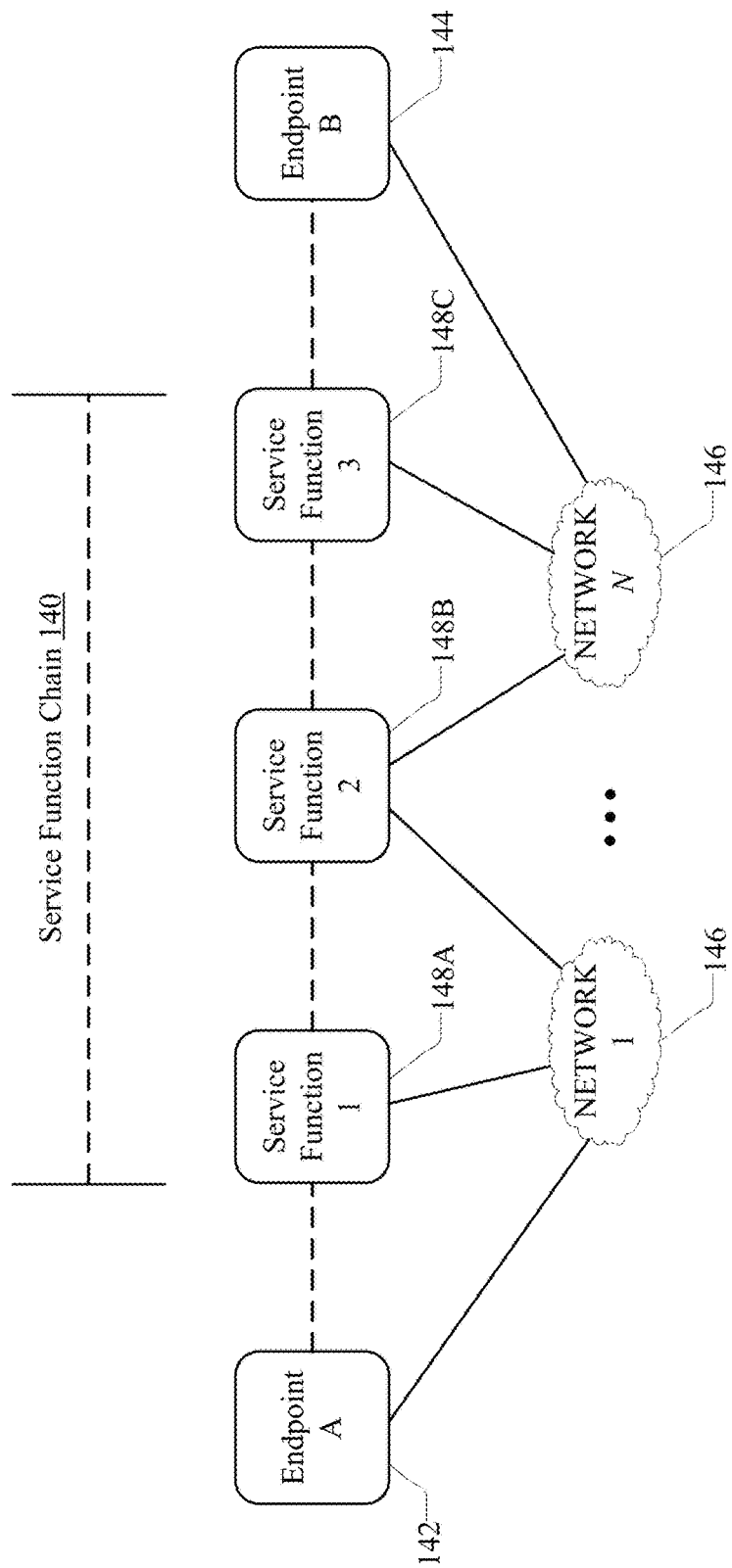

FIG. 1C illustrates a schematic diagram of an example network service function chain 140. Network or service functions, such as routing, network address translation, intrusion detection, firewall functionality, content delivery, etc., can be decoupled from hardware platforms and implemented in software. For example, Network functions virtualization (NFV) can implement network devices as virtualized functions in software. The network or service functions can be implemented via, for example, VMs, software containers, applications, runtime functions, etc. A given flow of a given application can be steered through multiple networks or service functions that makeup a service function chain, to implement the desired functionality.

In this example, Service Function Chain 140 can include Service Functions 148A-C which together implement the desired functionality for the Service Function Chain 140. Service Functions 148A-C can run within one or more VMs, software containers, runtime environments, servers, etc. Moreover, Service Functions 148A-C reside on one or more networks. In some cases, Service Functions 148A-C can reside on the same network and/or host (e.g., VM, software container, server, etc.) or different networks and/or hosts. For example, Service Functions 148A-C can reside on different VMs or containers and communicate via one or more networks 146, which can include one or more physical and/or logical networks. To illustrate, the networks 146 can include different datacenters in Network Environment 100.

When Endpoint 142 and Endpoint 144 communicate for a given application, the packets for the given application can be steered through Service Functions 148A-C in the Service Function Chain 140, to implement the desired functionality for that application. For example, assume Service Function 148A is a network monitoring function, Service Function 148B is a load-balancing function, and Service Function 148C is a firewall function. Here, packets from Endpoint 142 to Endpoint 144 can pass through the network monitoring function provided by Service Function 148A, the load-balancing function of Service Function 148B, and the Firewall of Service Function 148C. As another example, assume Service Function Chain 140 provides a virtualized functionality of a mobile base station for access to a mobile network. In this example, Service Functions 148A-C can provide the various functions to implement the functionality of the mobile base station. Traffic between Endpoints 142, 144 can pass through the Service Functions 148A-C in the Service Function Chain 140 to implement the desired functionality for the mobile base station.

In order to provide end-to-end service for the given application associated with the Service Function Chain 140, the traffic should be steered appropriately through each of the Service Functions 148A-C in the Service Function Chain 140. This may require specific routing configurations, security configurations, priorities, application policies, etc. Such configurations can be defined by one or more controllers (e.g., Controllers 116), nodes (e.g., Leafs 104), service or orchestration systems, applications, etc. In some cases, an information model can describe the Service Functions 148A-C in the Service Function Chain 140, the pertinent physical or infrastructure entities, the nodes, the links, the requirements of each service function (e.g., capacity, performance, SLA, etc.), etc.

Figure 2A:
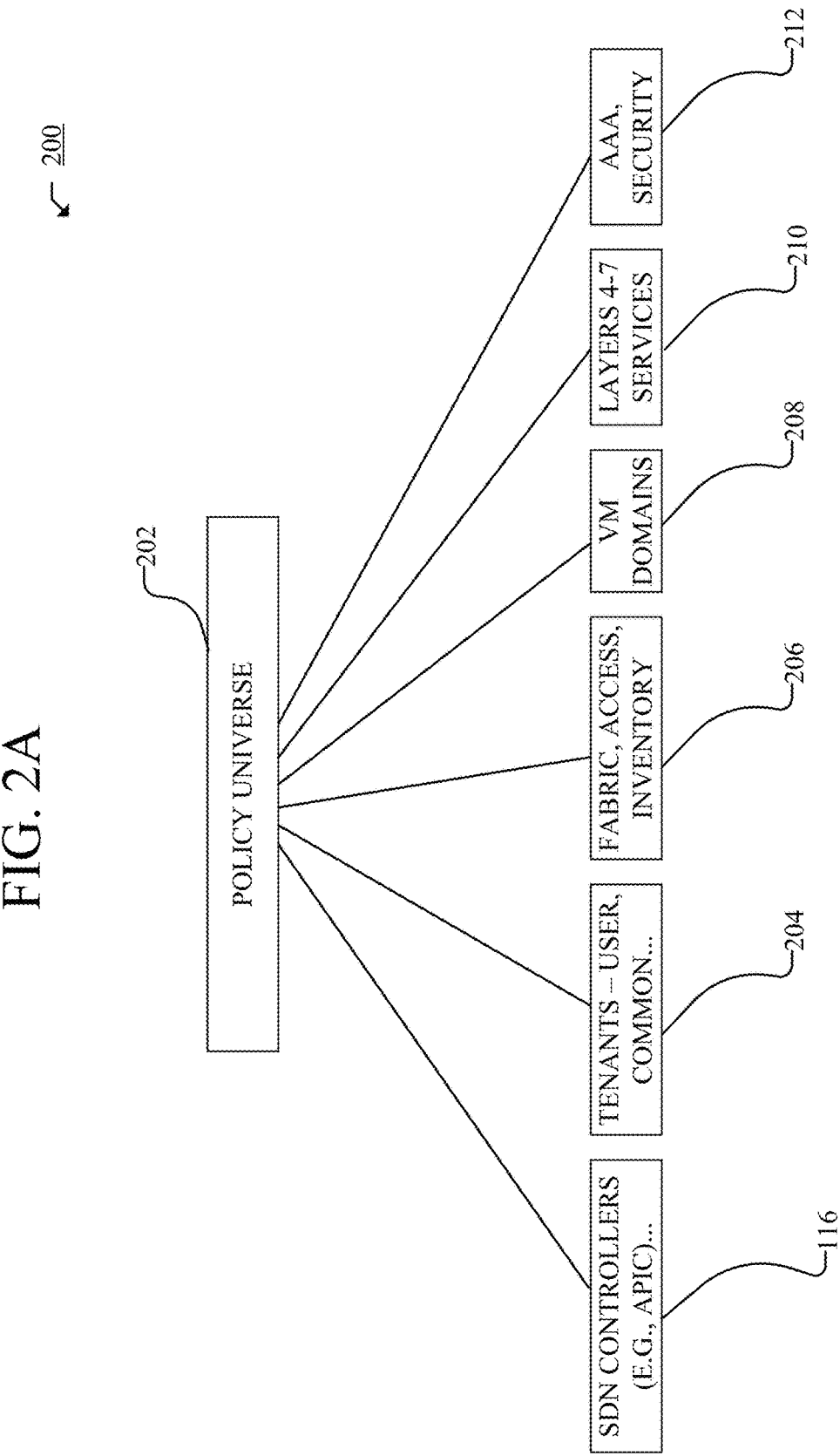

FIG. 2A illustrates a diagram of an example schema of an SDN network, such as Network Environment 100. The schema can define objects, properties, and relationships associated with the SDN network. In this example, the schema is a Management Information Model 200 as further described below. However, in other configurations and implementations, the schema can be a different model or specification associated with a different type of network.

The following discussion of Management Information Model 200 references various terms which shall also be used throughout the disclosure. Accordingly, for clarity, the disclosure shall first provide below a list of terminology, which will be followed by a more detailed discussion of Management Information Model 200.

As used herein, an "Alias" can refer to a changeable name for a given object. Even if the name of an object, once created, cannot be changed, the Alias can be a field that can be changed. The term "Aliasing" can refer to a rule (e.g., contracts, policies, configurations, etc.) that overlaps one or more other rules. For example, Contract 1 defined in a logical model of a network can be said to be aliasing Contract 2 defined in the logical model of the network if Contract 1 completely overlaps Contract 2. In this example, by aliasing Contract 2, Contract 1 renders Contract 2 redundant or inoperable. For example, if Contract 1 has a higher priority than Contract 2, such aliasing can render Contract 2 redundant based on Contract 1's overlapping and higher priority characteristics.

As used herein, the term "APIC" can refer to one or more controllers (e.g., Controllers 116) in an ACI framework. The APIC can provide a unified point of automation and management, policy programming, application deployment, health monitoring for an ACI multitenant fabric. The APIC can be implemented as a single controller, a distributed controller, or a replicated, synchronized, and/or clustered controller.

As used herein, the term "BDD" can refer to a binary decision tree. A binary decision tree can be a data structure representing functions, such as Boolean functions.

As used herein, the term "BD" can refer to a bridge domain. A bridge domain can be a set of logical ports that share the same flooding or broadcast characteristics. Like a virtual LAN (VLAN), bridge domains can span multiple devices. A bridge domain can be a L2 (Layer 2) construct.

As used herein, a "Consumer" can refer to an endpoint, resource, and/or EPG that consumes a service.

As used herein, a "Context" can refer to an L3 (Layer 3) address domain that allows multiple instances of a routing table to exist and work simultaneously. This increases functionality by allowing network paths to be segmented without using multiple devices. Non-limiting examples of a context or L3 address domain can include a Virtual Routing and Forwarding (VRF) instance, a private network, and so forth.

As used herein, the term "Contract" can refer to rules or configurations that specify what and how communications in a network are conducted (e.g., allowed, denied, filtered, processed, etc.). In an ACI network, contracts can specify how communications between endpoints and/or EPGs take place. In some examples, a contract can provide rules and configurations akin to an Access Control List (ACL).

As used herein, the term "Distinguished Name" (DN) can refer to a unique name that describes an object, such as an MO, and locates its place in Management Information Model 200. In some cases, the DN can be (or equate to) a Fully Qualified Domain Name (FQDN).

As used herein, the term "Endpoint Group" (EPG) can refer to a logical entity or object associated with a collection or group of endoints as previously described with reference to FIG. 1B.

As used herein, the term "Filter" can refer to a parameter or configuration for allowing communications. For example, in a whitelist model where all communications are blocked by default, a communication must be given explicit permission to prevent such communication from being blocked. A filter can define permission(s) for one or more communications or packets. A filter can thus function similar to an ACL or Firewall rule. In some examples, a filter can be implemented in a packet (e.g., TCP/IP) header field, such as L3 protocol type, L4 (Layer 4) ports, and so on, which is used to allow inbound or outbound communications between endpoints or EPGs, for example.

As used herein, the term "L2 Out" can refer to a bridged connection. A bridged connection can connect two or more segments of the same network so that they can communicate. In an ACI framework, an L2 out can be a bridged (Layer 2) connection between an ACI fabric (e.g., Fabric 120) and an outside Layer 2 network, such as a switch.

As used herein, the term "L3 Out" can refer to a routed connection. A routed Layer 3 connection uses a set of protocols that determine the path that data follows in order to travel across networks from its source to its destination. Routed connections can perform forwarding (e.g., IP forwarding) according to a protocol selected, such as BGP (border gateway protocol), OSPF (Open Shortest Path First), EIGRP (Enhanced Interior Gateway Routing Protocol), etc.

As used herein, the term "Managed Object" (MO) can refer to an abstract representation of objects that are managed in a network (e.g., Network Environment 100). The objects can be concrete objects (e.g., a switch, server, adapter, etc.), or logical objects (e.g., an application profile, an EPG, a fault, etc.). The MOs can be network resources or elements that are managed in the network. For example, in an ACI environment, an MO can include an abstraction of an ACI fabric (e.g., Fabric 120) resource.

As used herein, the term "Management Information Tree" (MIT) can refer to a hierarchical management information tree containing the MOs of a system. For example, in ACI, the MIT contains the MOs of the ACI fabric (e.g., Fabric 120). The MIT can also be referred to as a Management Information Model (MIM), such as Management Information Model 200.

As used herein, the term "Policy" can refer to one or more specifications for controlling some aspect of system or network behavior. For example, a policy can include a named entity that contains specifications for controlling some aspect of system behavior. To illustrate, a Layer 3 Outside Network Policy can contain the BGP protocol to enable BGP routing functions when connecting Fabric 120 to an outside Layer 3 network.

As used herein, the term "Profile" can refer to the configuration details associated with a policy. For example, a profile can include a named entity that contains the configuration details for implementing one or more instances of a policy. To illustrate, a switch node profile for a routing policy can contain the switch-specific configuration details to implement the BGP routing protocol.

As used herein, the term "Provider" refers to an object or entity providing a service. For example, a provider can be an EPG that provides a service.

As used herein, the term "Subject" refers to one or more parameters in a contract for defining communications. For example, in ACI, subjects in a contract can specify what information can be communicated and how. Subjects can function similar to ACLs.

As used herein, the term "Tenant" refers to a unit of isolation in a network. For example, a tenant can be a secure and exclusive virtual computing environment. In ACI, a tenant can be a unit of isolation from a policy perspective, but does not necessarily represent a private network. Indeed, ACI tenants can contain multiple private networks (e.g., VRFs). Tenants can represent a customer in a service provider setting, an organization or domain in an enterprise setting, or just a grouping of policies.

As used herein, the term "VRF" refers to a virtual routing and forwarding instance. The VRF can define a Layer 3 address domain that allows multiple instances of a routing table to exist and work simultaneously. This increases functionality by allowing network paths to be segmented without using multiple devices. Also known as a context or private network.

Having described various terms used herein, the disclosure now returns to a discussion of Management Information Model (MIM) 200 in FIG. 2A. As previously noted, MIM 200 can be a hierarchical management information tree or MIT. Moreover, MIM 200 can be managed and processed by Controllers 116, such as APICs in an ACI. Controllers 116 can enable the control of managed resources by presenting their manageable characteristics as object properties that can be inherited according to the location of the object within the hierarchical structure of the model.

The hierarchical structure of MIM 200 starts with Policy Universe 202 at the top (Root) and contains parent and child nodes 116, 204, 206, 208, 210, 212. Nodes 116, 202, 204, 206, 208, 210, 212 in the tree represent the managed objects (MOs) or groups of objects. Each object in the fabric (e.g., Fabric 120) has a unique distinguished name (DN) that describes the object and locates its place in the tree. The Nodes 116, 202, 204, 206, 208, 210, 212 can include the various MOs, as described below, which contain policies that govern the operation of the system.

Controllers 116

Controllers 116 (e.g., APIC controllers) can provide management, policy programming, application deployment, and health monitoring for Fabric 120.

Node 204

Node 204 includes a tenant container for policies that enable an administrator to exercise domain-based access control. Non-limiting examples of tenants can include:

User tenants defined by the administrator according to the needs of users. They contain policies that govern the operation of resources such as applications, databases, web servers, network-attached storage, virtual machines, and so on.

The common tenant is provided by the system but can be configured by the administrator. It contains policies that govern the operation of resources accessible to all tenants, such as firewalls, load balancers, Layer 4 to Layer 7 services, intrusion detection appliances, and so on.

The infrastructure tenant is provided by the system but can be configured by the administrator. It contains policies that govern the operation of infrastructure resources such as the fabric overlay (e.g., VXLAN). It also enables a fabric provider to selectively deploy resources to one or more user tenants. Infrastructure tenant polices can be configurable by the administrator.

The management tenant is provided by the system but can be configured by the administrator. It contains policies that govern the operation of fabric management functions used for in-band and out-of-band configuration of fabric nodes. The management tenant contains a private out-of-bound address space for the Controller/Fabric internal communications that is outside the fabric data path that provides access through the management port of the switches. The management tenant enables discovery and automation of communications with virtual machine controllers.

Node 206

Node 206 can contain access policies that govern the operation of switch access ports that provide connectivity to resources such as storage, compute, Layer 2 and Layer 3 (bridged and routed) connectivity, virtual machine hypervisors, Layer 4 to Layer 7 devices, and so on. If a tenant requires interface configurations other than those provided in the default link, Cisco Discovery Protocol (CDP), Link Layer Discovery Protocol (LLDP), Link Aggregation Control Protocol (LACP), or Spanning Tree Protocol (STP), an administrator can configure access policies to enable such configurations on the access ports of Leafs 104.

Node 206 can contain fabric policies that govern the operation of the switch fabric ports, including such functions as Network Time Protocol (NTP) server synchronization, Intermediate System-to-Intermediate System Protocol (IS-IS), Border Gateway Protocol (BGP) route reflectors, Domain Name System (DNS) and so on. The fabric MO contains objects such as power supplies, fans, chassis, and so on.

Node 208

Node 208 can contain VM domains that group VM controllers with similar networking policy requirements. VM controllers can share virtual space (e.g., VLAN or VXLAN space) and application EPGs. Controllers 116 communicate with the VM controller to publish network configurations such as port groups that are then applied to the virtual workloads.

Node 210

Node 210 can contain Layer 4 to Layer 7 service integration life cycle automation framework that enables the system to dynamically respond when a service comes online or goes offline. Policies can provide service device package and inventory management functions.

Controllers 116 can provide automated service insertion and also act as a central point of policy control. Policies can manage the network fabric and services appliances. Controllers 116 can configure the network so traffic flows through the services. Controllers 116 can also configure a service according to the application's requirements.

Node 210 can include a Layer 4 to Layer 7 Policy Model. The Layer 4 to Layer 7 Policy Model can include managed objects for L4-L7 service device type policies, such as services supported by the package and device scripts.

Node 210 can include a Services manageable object (MO), a Device Script MO, and a Function profile Group Container MO. The Services MO can contain metadata for the functions provided by a device such as SSL offloading and load balancing. The Services MO can contain connector names, encapsulation type (e.g., VLAN, VxLAN, etc.), interface labels, etc.

The Device Script MO can represent a device script handler that contains meta information about the related attributes of the script handler, including, for example, its name, package name, version, etc.

The Function Profile Group Container MO can include objects that contain the functions available to the service device type. Function profiles can contain the configurable parameters supported by the device, which can be organized into folders, for example.

Node 212

Node 212 can contain access, authentication, and accounting (AAA) policies that govern user privileges, roles, and security domains of Fabric 120.

The hierarchical policy model can fit well with an API, such as a REST API interface. When invoked, the API can read from or write to objects in the MIT. URLs can map directly into distinguished names that identify objects in the MIT. Data in the MIT can be described as a self-contained structured tree text document encoded in XML or JSON, for example.

Figure 2B:
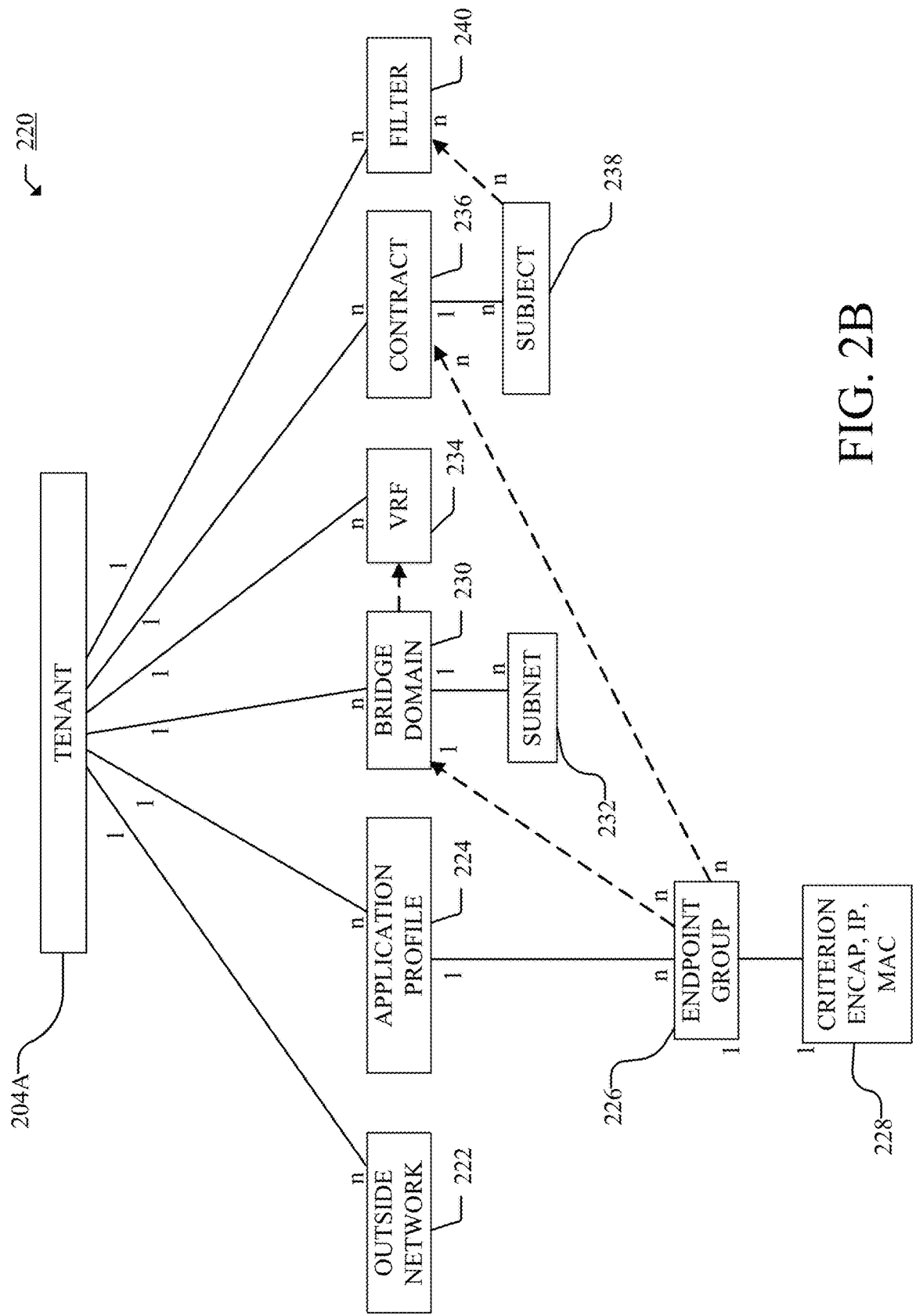

FIG. 2B illustrates an example object model 220 for a tenant portion of MIM 200. As previously noted, a tenant is a logical container for application policies that enable an administrator to exercise domain-based access control. A tenant thus represents a unit of isolation from a policy perspective, but it does not necessarily represent a private network. Tenants can represent a customer in a service provider setting, an organization or domain in an enterprise setting, or just a convenient grouping of policies. Moreover, tenants can be isolated from one another or can share resources.

Tenant portion 204A of MIM 200 can include various entities, and the entities in Tenant Portion 204A can inherit policies from parent entities. Non-limiting examples of entities in Tenant Portion 204A can include Filters 240, Contracts 236, Outside Networks 222, Bridge Domains 230, VRF Instances 234, and Application Profiles 224.

Bridge Domains 230 can include Subnets 232. Contracts 236 can include Subjects 238. Application Profiles 224 can contain one or more EPGs 226. Some applications can contain multiple components. For example, an e-commerce application could require a web server, a database server, data located in a storage area network, and access to outside resources that enable financial transactions. Application Profile 224 contains as many (or as few) EPGs as necessary that are logically related to providing the capabilities of an application.

EPG 226 can be organized in various ways, such as based on the application they provide, the function they provide (such as infrastructure), where they are in the structure of the data center (such as DMZ), or whatever organizing principle that a fabric or tenant administrator chooses to use.

EPGs in the fabric can contain various types of EPGs, such as application EPGs, Layer 2 external outside network instance EPGs, Layer 3 external outside network instance EPGs, management EPGs for out-of-band or in-band access, etc. EPGs 226 can also contain Attributes 228, such as encapsulation-based EPGs, IP-based EPGs, or MAC-based EPGs.

As previously mentioned, EPGs can contain endpoints (e.g., EPs 122) that have common characteristics or attributes, such as common policy requirements (e.g., security, virtual machine mobility (VMM), QoS, or Layer 4 to Layer 7 services). Rather than configure and manage endpoints individually, they can be placed in an EPG and managed as a group.

Policies apply to EPGs, including the endpoints they contain. An EPG can be statically configured by an administrator in Controllers 116, or dynamically configured by an automated system such as VCENTER or OPENSTACK.

To activate tenant policies in Tenant Portion 204A, fabric access policies should be configured and associated with tenant policies. Access policies enable an administrator to configure other network configurations, such as port channels and virtual port channels, protocols such as LLDP, CDP, or LACP, and features such as monitoring or diagnostics.

Figure 2C:
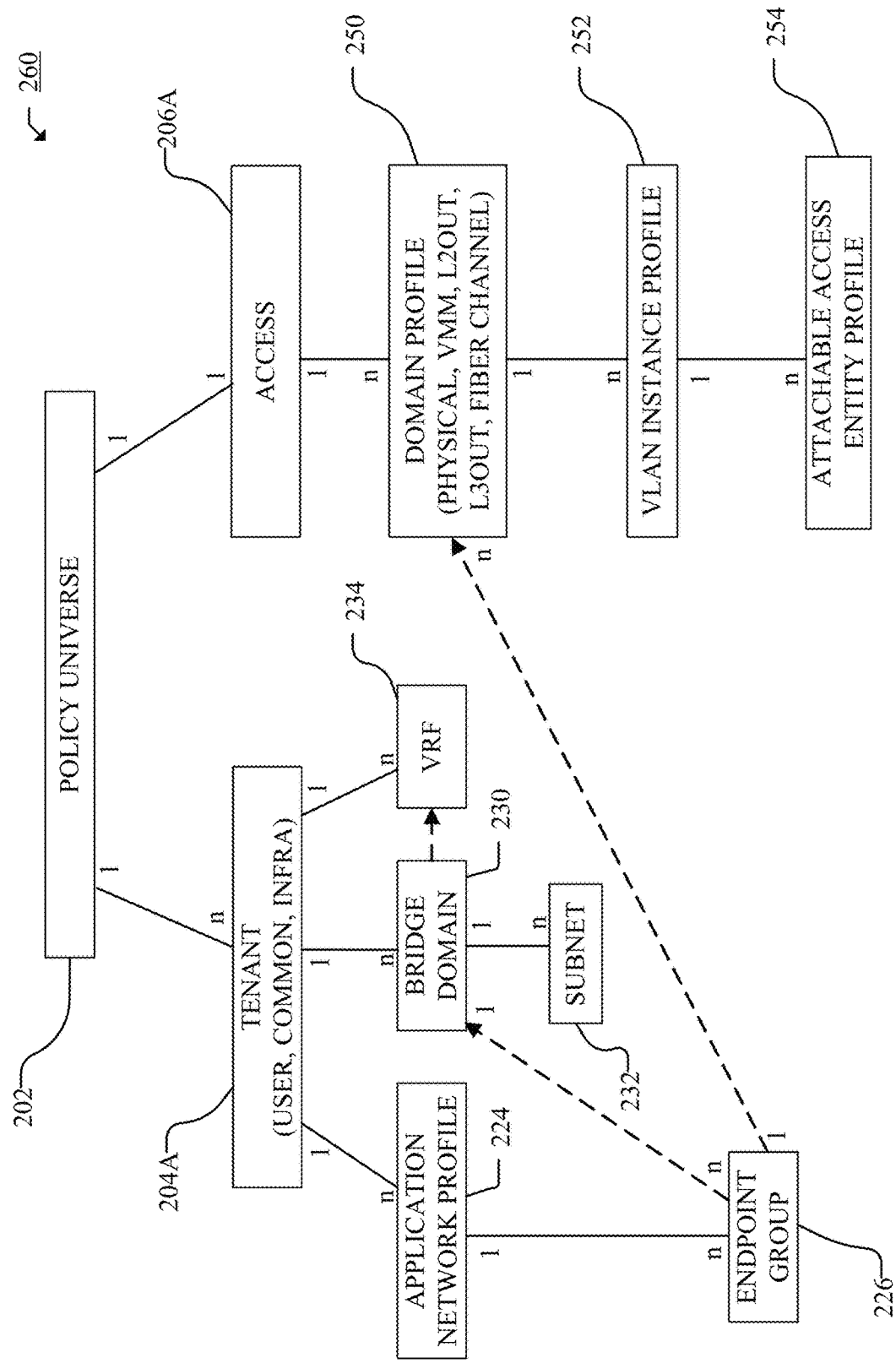

FIG. 2C illustrates an example Association 260 of tenant entities and access entities in MIM 200. Policy Universe 202 contains Tenant Portion 204A and Access Portion 206A. Thus, Tenant Portion 204A and Access Portion 206A are associated through Policy Universe 202.

Access Portion 206A can contain fabric and infrastructure access policies. Typically, in a policy model, EPGs are coupled with VLANs. For traffic to flow, an EPG is deployed on a leaf port with a VLAN in a physical, VMM, L2 out, L3 out, or Fiber Channel domain, for example.

Access Portion 206A thus contains Domain Profile 236 which can define a physical, VMM, L2 out, L3 out, or Fiber Channel domain, for example, to be associated to the EPGs. Domain Profile 236 contains VLAN Instance Profile 238 (e.g., VLAN pool) and Attacheable Access Entity Profile (AEP) 240, which are associated directly with application EPGs. The AEP 240 deploys the associated application EPGs to the ports to which it is attached, and automates the task of assigning VLANs. While a large data center can have thousands of active VMs provisioned on hundreds of VLANs, Fabric 120 can automatically assign VLAN IDs from VLAN pools. This saves time compared with trunking down VLANs in a traditional data center.

Figure 2D:
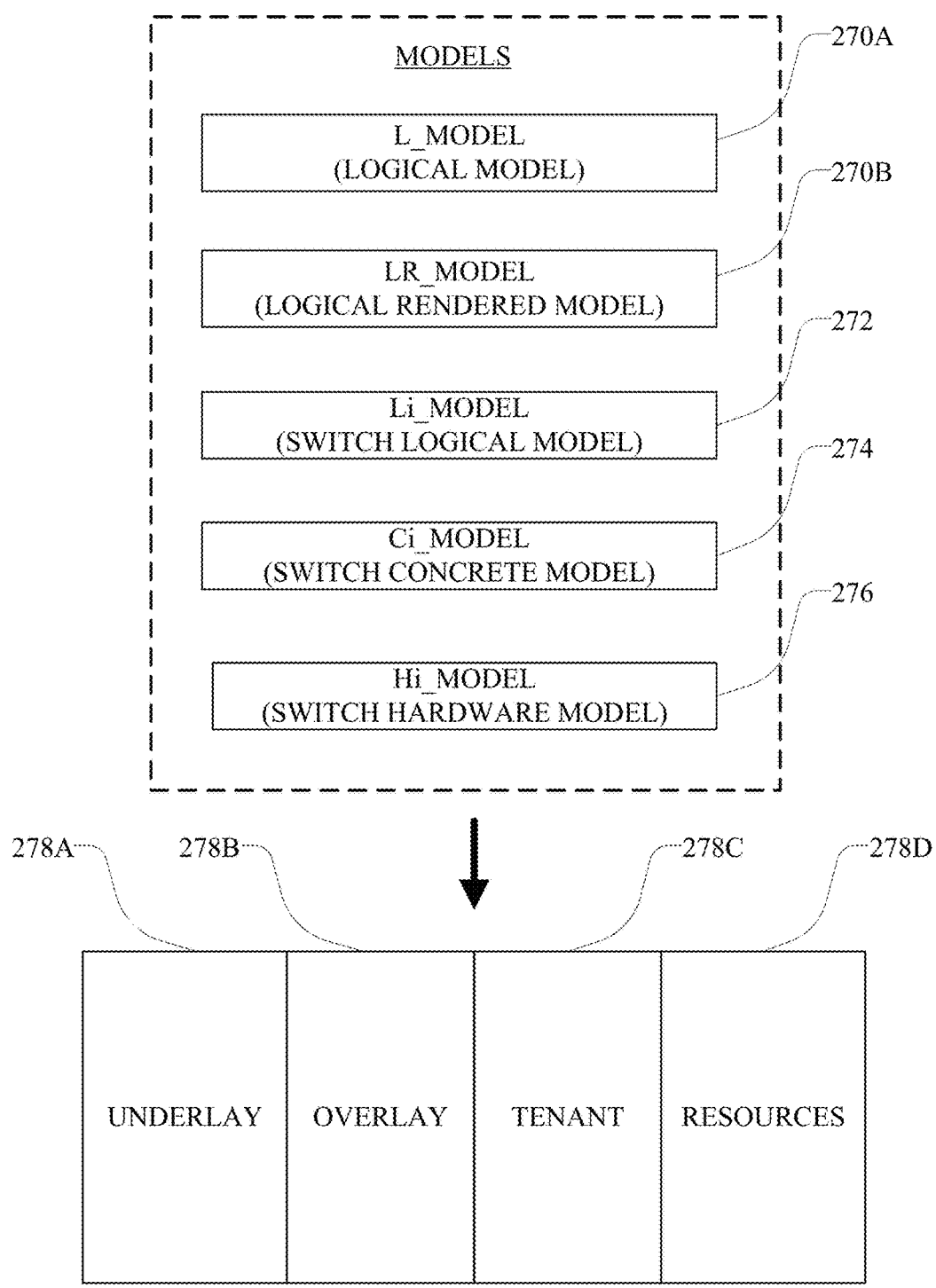

FIG. 2D illustrates a schematic diagram of example models for a network, such as Network Environment 100. The models can be generated based on specific configurations and/or network state parameters associated with various objects, policies, properties, and elements defined in MIM 200. The models can be implemented for network analysis and assurance, and may provide a depiction of the network at various stages of implementation and levels of the network.

As illustrated, the models can include L_Model 270A (Logical Model), LR_Model 270B (Logical Rendered Model or Logical Runtime Model), Li_Model 272 (Logical Model for i), Ci_Model 274 (Concrete model for i), and/or Hi_Model 276 (Hardware model or TCAM Model for i).

L_Model 270A is the logical representation of various elements in MIM 200 as configured in a network (e.g., Network Environment 100), such as objects, object properties, object relationships, and other elements in MIM 200 as configured in a network. L_Model 270A can be generated by Controllers 116 based on configurations entered in Controllers 116 for the network, and thus represents the logical configuration of the network at Controllers 116. This is the declaration of the "end-state" expression that is desired when the elements of the network entities (e.g., applications, tenants, etc.) are connected and Fabric 120 is provisioned by Controllers 116. Because L_Model 270A represents the configurations entered in Controllers 116, including the objects and relationships in MIM 200, it can also reflect the "intent" of the administrator: how the administrator wants the network and network elements to behave.

L_Model 270A can be a fabric or network-wide logical model. For example, L_Model 270A can account configurations and objects from each of Controllers 116. As previously explained, Network Environment 100 can include multiple Controllers 116. In some cases, two or more Controllers 116 may include different configurations or logical models for the network. In such cases, L_Model 270A can obtain any of the configurations or logical models from Controllers 116 and generate a fabric or network wide logical model based on the configurations and logical models from all Controllers 116. L_Model 270A can thus incorporate configurations or logical models between Controllers 116 to provide a comprehensive logical model. L_Model 270A can also address or account for any dependencies, redundancies, conflicts, etc., that may result from the configurations or logical models at the different Controllers 116.

LR_Model 270B is the abstract model expression that Controllers 116 (e.g., APICs in ACI) resolve from L_Model 270A. LR_Model 270B can provide the configuration components that would be delivered to the physical infrastructure (e.g., Fabric 120) to execute one or more policies. For example, LR_Model 270B can be delivered to Leafs 104 in Fabric 120 to configure Leafs 104 for communication with attached Endpoints 122. LR_Model 270B can also incorporate state information to capture a runtime state of the network (e.g., Fabric 120).

In some cases, LR_Model 270B can provide a representation of L_Model 270A that is normalized according to a specific format or expression that can be propagated to, and/or understood by, the physical infrastructure of Fabric 120 (e.g., Leafs 104, Spines 102, etc.). For example, LR_Model 270B can associate the elements in L_Model 270A with specific identifiers or tags that can be interpreted and/or compiled by the switches in Fabric 120, such as hardware plane identifiers used as classifiers.

Li_Model 272 is a switch-level or switch-specific model obtained from L_Model 270A and/or LR_Model 270B. Li_Model 272 can project L_Model 270A and/or LR_Model 270B on a specific switch or device i, and thus can convey how L_Model 270A and/or LR_Model 270B should appear or be implemented at the specific switch or device i.

For example, Li_Model 272 can project L_Model 270A and/or LR_Model 270B pertaining to a specific switch i to capture a switch-level representation of L_Model 270A and/or LR_Model 270B at switch i. To illustrate, Li_Model 272 $L_1$ can represent L_Model 270A and/or LR_Model 270B projected to, or implemented at, Leaf 1 (104). Thus, Li_Model 272 can be generated from L_Model 270A and/or LR_Model 270B for individual devices (e.g., Leafs 104, Spines 102, etc.) on Fabric 120.

In some cases, Li_Model 272 can be represented using JSON (JavaScript Object Notation). For example, Li_Model 272 can include JSON objects, such as Rules, Filters, Entries, and Scopes.

Ci_Model 274 is the actual in-state configuration at the individual fabric member i (e.g., switch i). In other words, Ci_Model 274 is a switch-level or switch-specific model that is based on Li_Model 272. For example, Controllers 116 can deliver Li_Model 272 to Leaf 1 (104). Leaf 1 (104) can take Li_Model 272, which can be specific to Leaf 1 (104), and render the policies in Li_Model 272 into a concrete model, Ci_Model 274, that runs on Leaf 1 (104). Leaf 1 (104) can render Li_Model 272 via the OS on Leaf 1 (104), for example. Thus, Ci_Model 274 can be analogous to compiled software, as it is the form of Li_Model 272 that the switch OS at Leaf 1 (104) can execute.

In some cases, Li_Model 272 and Ci_Model 274 can have a same or similar format. For example, Li_Model 272 and Ci_Model 274 can be based on JSON objects. Having the same or similar format can facilitate objects in Li_Model 272 and Ci_Model 274 to be compared for equivalence or congruence. Such equivalence or congruence checks can be used for network analysis and assurance, as further described herein.

Hi_Model 276 is also a switch-level or switch-specific model for switch i, but is based on Ci_Model 274 for switch i. Hi_Model 276 is the actual configuration (e.g., rules) stored or rendered on the hardware or memory (e.g., TCAM memory) at the individual fabric member i (e.g., switch i). For example, Hi_Model 276 can represent the configurations (e.g., rules) which Leaf 1 (104) stores or renders on the hardware (e.g., TCAM memory) of Leaf 1 (104) based on Ci_Model 274 at Leaf 1 (104). The switch OS at Leaf 1 (104) can render or execute Ci_Model 274, and Leaf 1 (104) can store or render the configurations from Ci_Model 274 in storage, such as the memory or TCAM at Leaf 1 (104). The configurations from Hi_Model 276 stored or rendered by Leaf 1 (104) represent the configurations that will be implemented by Leaf 1 (104) when processing traffic.

While Models 272, 274, 276 are shown as device-specific models, similar models can be generated or aggregated for a collection of fabric members (e.g., Leafs 104 and/or Spines 102) in Fabric 120. When combined, device-specific models, such as Model 272, Model 274, and/or Model 276, can provide a representation of Fabric 120 that extends beyond a particular device. For example, in some cases, Li_Model 272, Ci_Model 274, and/or Hi_Model 276 associated with some or all individual fabric members (e.g., Leafs 104 and Spines 102) can be combined or aggregated to generate one or more aggregated models based on the individual fabric members.

As referenced herein, the terms H Model, T Model, and TCAM Model can be used interchangeably to refer to a hardware model, such as Hi_Model 276. For example, Ti Model, Hi Model and TCAMi Model may be used interchangeably to refer to Hi_Model 276.

Models 270A, 270B, 272, 274, 276 can provide representations of various aspects of the network or various configuration stages for MIM 200. For example, one or more of Models 270A, 270B, 272, 274, 276 can be used to generate Underlay Model 278A representing one or more aspects of Fabric 120 (e.g., underlay topology, routing, etc.), Overlay Model 278B representing one or more aspects of the overlay or logical segment(s) of Network Environment 100 (e.g., COOP, MPBGP, tenants, VRFs, VLANs, VXLANs, virtual applications, VMs, hypervisors, virtual switching, etc.), Tenant Model 278C representing one or more aspects of Tenant portion 204A in MIM 200 (e.g., security, forwarding, service chaining, QoS, VRFs, BDs, Contracts, Filters, EPGs, subnets, etc.), Resources Model 278D representing one or more resources in Network Environment 100 (e.g., storage, computing, VMs, port channels, physical elements, etc.), etc.

In general, L_Model 270A can be the high-level expression of what exists in the LR_Model 270B, which should be present on the concrete devices as Ci_Model 274 and Hi_Model 276 expression. If there is any gap between the models, there may be inconsistent configurations or problems.

Figure 2E:
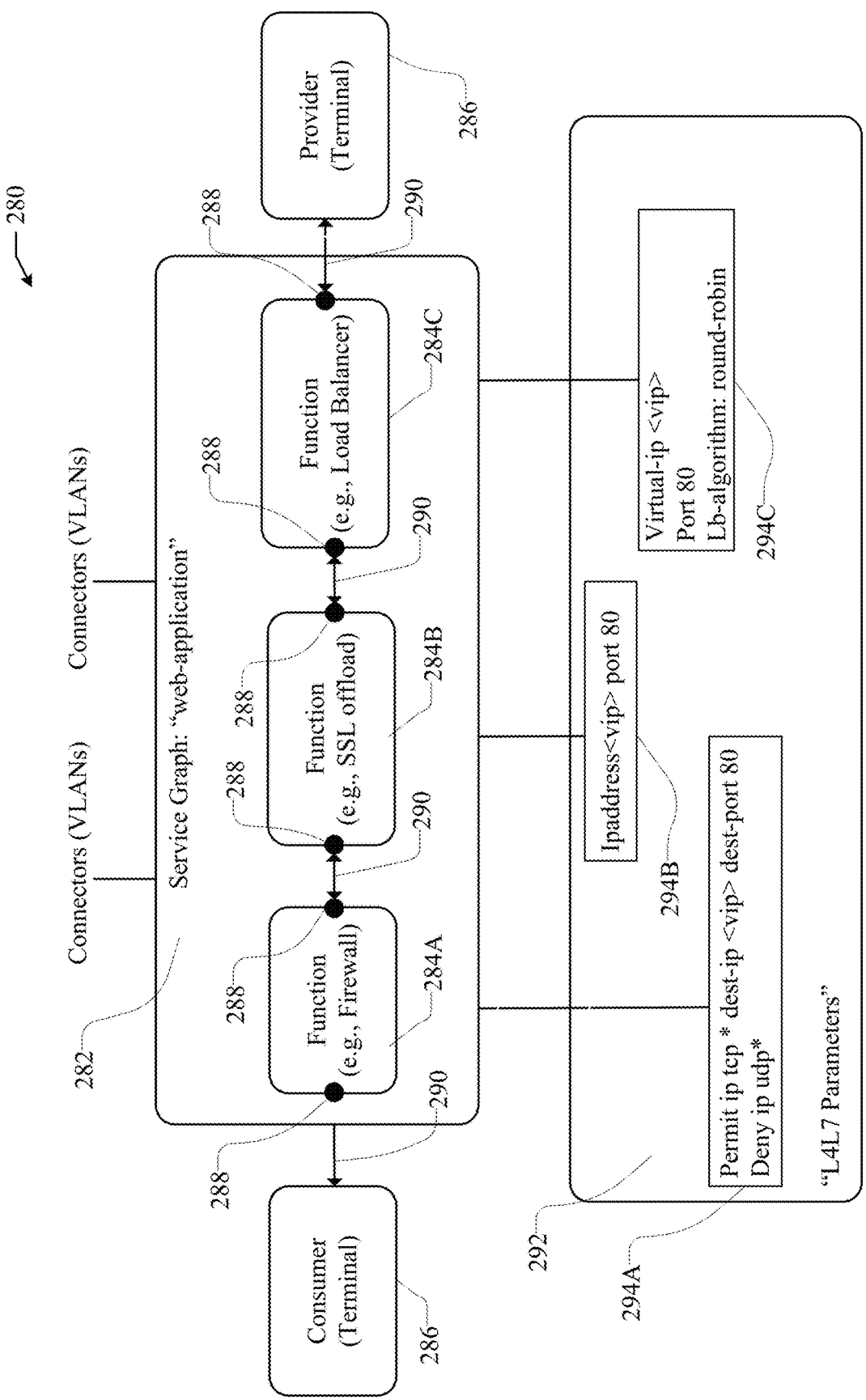

FIG. 2E illustrates a diagram of an example Service Graph Deployment 280. Services required by an application can be treated as a service graph that is instantiated on Fabric 120 from Controllers 116. Users can define the service for an application, and service graphs can identify the set of network or service functions, such as Service Functions 148A-C, that are needed by the application.

A service graph represents the network using a function node, a terminal node, a connector, and a connection. A function node represents a function that is applied to the traffic, such as a transform (SSL termination, VPN gateway), filter (firewalls), or terminal (intrusion detection systems). A function node within a service graph may require one or more parameters, which can be an EPG, an application profile, or a tenant VRF.

Function nodes include connectors. A connector enables input and output from a node, and connects the function node to the service graph. The connectors of a function node represent the network requirement of a service function. A connector can be associated with the appropriate bridge domain and connections based on the graph's connector's subset. Each connector can be associated with a VLAN or Virtual Extensible LAN (VXLAN). Each side of a connector can be treated as an EPG.

A terminal node enables input and output from the service graph. A terminal node connects a service graph with the contracts. A service graph can be inserted for the traffic between two application EPGs by connecting the terminal node to a contract. Once connected, traffic between the consumer EPG and provider EPG of the contract is redirected to the service graph.

A connection determines how traffic is forwarded through the network.

After a graph is configured in Controllers 116, Controllers 116 can configure the services according to the service function requirements in the service graph. Controllers 116 can also configure the network according to the needs of the service function that is specified in the service graph, which does not require any change in the service device.

A service graph can be represented as two or more tiers of an application with the appropriate service function inserted between. A service appliance (device) can perform a service function within the graph. One or more service appliances may be required to render the services required by a graph. One or more service functions can be performed by a single-service device.

Service graphs and service functions can have the following characteristics:

Traffic sent or received by an EPG can be filtered based on a policy, and a subset of the traffic can be redirected to different edges in the graph.

Service graph edges are directional.

Taps (hardware-based packet copy service) can be attached to different points in the service graph.

Logical functions can be rendered on the appropriate (physical or virtual) device, based on the policy.

The service graph supports splits and joins of edges, and it does not restrict the administrator to linear service chains.

Traffic can be reclassified again in the network after a service appliance emits it.

Logical service functions can be scaled up or down or deployed, for example, in a cluster mode or 1:1 active-standby high-availability mode, depending on the requirements.

A service graph can allow a network operator to install a service, such as a firewall, once and deploy it multiple times in different logical topologies. Each time the graph is deployed, the network controllers (e.g., Controllers 116) can change the configuration on the firewall to enable the forwarding in the new logical topology. A service graph deployment can involve various configurations, such as BDs and VRFs.

In FIG. 2E, Service Graph Deployment 280 illustrates a Service Graph 282 associated with a web application labeled "web-application". Service Graph Deployment 280 includes Function Nodes 284A-C, Terminal Nodes 286, Connectors 288, and Connections 290.

Function Node 284A represents a firewall function. Function Node 284B represents an SSL offload function. Function Node 286C represents a load balancer function.

Function Nodes 284A-C can include L4 -L7 Parameters 292, which can include Parameters 294A-C. Parameters 294A, 294B, and 294C correspond to Function Nodes 284A, 284B, and 284C, respectively.

Connectors 288 represent the network requirements of Function Nodes 284A-C. Network connectivity, such as VLAN and VNID tag, is assigned to Connectors 288. Connections 290 determine how traffic is forwarded through the Service Graph Deployment 280.

Terminal Nodes 286 represent the consumer and provider EPGs for Function Nodes 284A-C in Service Graph 282.

Figure 3A:
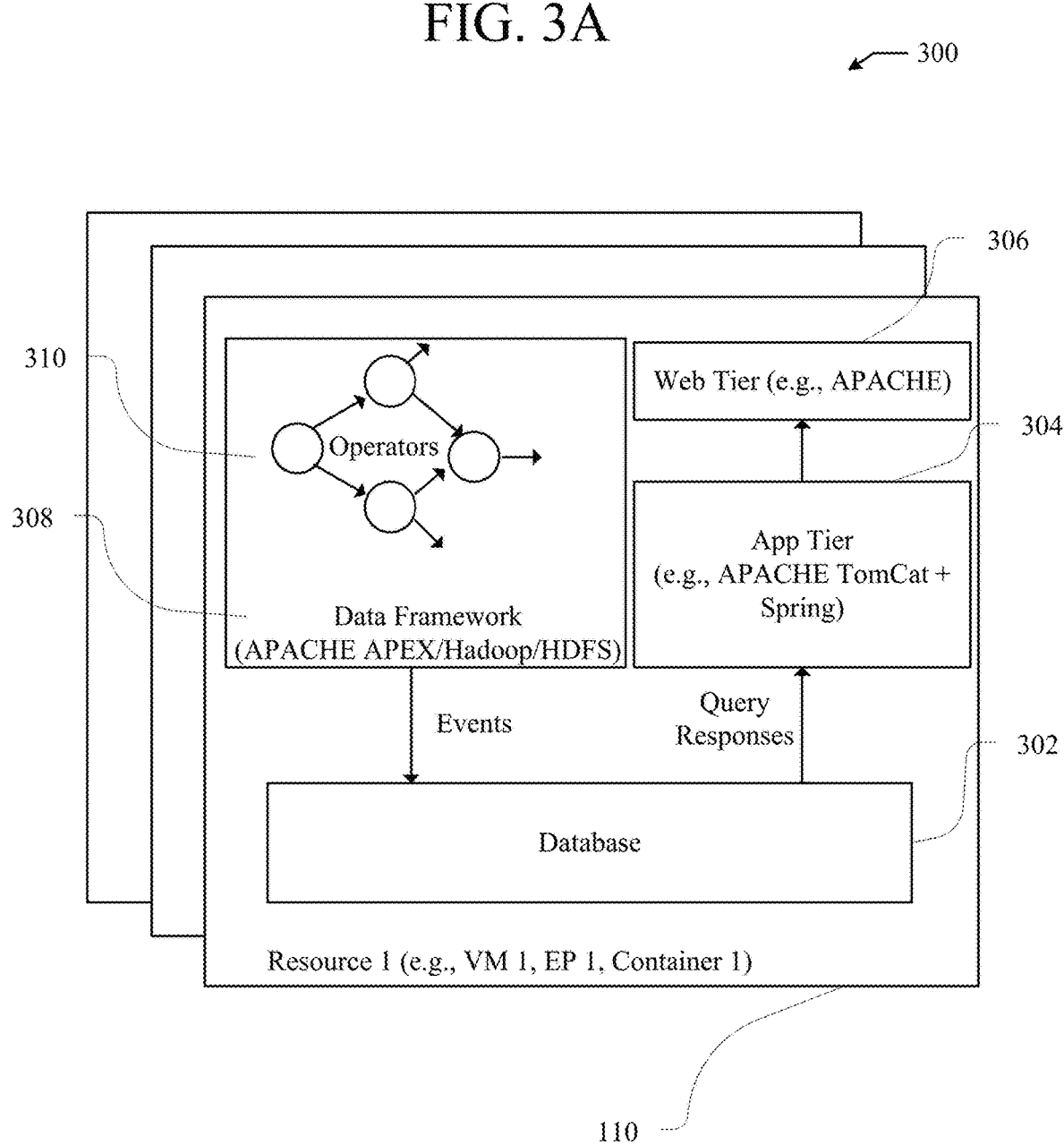

FIG. 3A illustrates a diagram of an example Assurance Appliance System 300 for network assurance. In this example, Assurance Appliance System 300 can include k Resources 110 (e.g., VMs) operating in cluster mode. Resources 110 can refer to VMs, software containers, bare metal devices, Endpoints 122, or any other physical or logical systems or components. It should be noted that, while FIG. 3A illustrates a cluster mode configuration, other configurations are also contemplated herein, such as a single mode configuration (e.g., single VM, container, or server) or a service chain for example.

Assurance Appliance System 300 can run on one or more Servers 106, Resources 110, Hypervisors 108, EPs 122, Leafs 104, Controllers 116, or any other system or resource. For example, Assurance Appliance System 300 can be a logical service or application running on one or more Resources 110 in Network Environment 100.

The Assurance Appliance System 300 can include Data Framework 308 (e.g., APACHE APEX, HADOOP, HDFS, ZOOKEEPER, etc.). In some cases, assurance checks can be written as, or provided by, individual operators that reside in Data Framework 308. This enables a natively horizontal scale-out architecture that can scale to arbitrary number of switches in Fabric 120 (e.g., ACI fabric).

Assurance Appliance System 300 can poll Fabric 120 at a configurable periodicity (e.g., an epoch). In some examples, the analysis workflow can be setup as a DAG (Directed Acyclic Graph) of Operators 310, where data flows from one operator to another and eventually results are generated and persisted to Database 302 for each interval (e.g., each epoch).

The north-tier implements API Server (e.g., APACHE TOMCAT, SPRING framework, etc.) 304 and Web Server 306. A graphical user interface (GUI) interacts via the APIs exposed to the customer. These APIs can also be used by the customer to collect data from Assurance Appliance System 300 for further integration into other tools.

Operators 310 in Data Framework 308 can together support assurance operations. Below are non-limiting examples of assurance operations that can be performed by Assurance Appliance System 300 via Operators 310.

Security Policy Adherence

Assurance Appliance System 300 can check to make sure the configurations or specification from L_Model 270A, which may reflect the user's intent for the network, including for example the security policies and customer-configured contracts, are correctly implemented and/or rendered in Li_Model 272, Ci_Model 274, and Hi_Model 276, and thus properly implemented and rendered by the fabric members (e.g., Leafs 104), and report any errors, contract violations, or irregularities found.

Static Policy Analysis

Assurance Appliance System 300 can check for issues in the specification of the user's intent or intents (e.g., identify contradictory or conflicting policies in L_Model 270A). Assurance Appliance System 300 can identify lint events based on the intent specification of a network. The lint and policy analysis can include semantic and/or syntactic checks of the intent specification(s) of a network.

TCAM Utilization

TCAM is a scarce resource in the fabric (e.g., Fabric 120). However, Assurance Appliance System 300 can analyze the TCAM utilization by the network data (e.g., Longest Prefix Match (LPM) tables, routing tables, VLAN tables, BGP updates, etc.), Contracts, Logical Groups 118 (e.g., EPGs), Tenants, Spines 102, Leafs 104, and other dimensions in Network Environment 100 and/or objects in MIM 200, to provide a network operator or user visibility into the utilization of this scarce resource. This can greatly help for planning and other optimization purposes.

Endpoint Checks

Assurance Appliance System 300 can validate that the fabric (e.g. fabric 120) has no inconsistencies in the Endpoint information registered (e.g., two leafs announcing the same endpoint, duplicate subnets, etc.), among other such checks.

Tenant Routing Checks

Assurance Appliance System 300 can validate that BDs, VRFs, subnets (both internal and external), VLANs, contracts, filters, applications, EPGs, etc., are correctly programmed.

Infrastructure Routing

Assurance Appliance System 300 can validate that infrastructure routing (e.g., IS-IS protocol) has no convergence issues leading to black holes, loops, flaps, and other problems.

MP-BGP Route Reflection Checks

The network fabric (e.g., Fabric 120) can interface with other external networks and provide connectivity to them via one or more protocols, such as Border Gateway Protocol (BGP), Open Shortest Path First (OSPF), etc. The learned routes are advertised within the network fabric via, for example, MP-BGP. These checks can ensure that a route reflection service via, for example, MP-BGP (e.g., from Border Leaf) does not have health issues.

Logical Lint and Real-Time Change Analysis

Assurance Appliance System 300 can validate rules in the specification of the network (e.g., L_Model 270A) are complete and do not have inconsistencies or other problems. MOs in the MIM 200 can be checked by Assurance Appliance System 300 through syntactic and semantic checks performed on L_Model 270A and/or the associated configurations of the MOs in MIM 200. Assurance Appliance System 300 can also verify that unnecessary, stale, unused or redundant configurations, such as contracts, are removed.

Figure 3B:
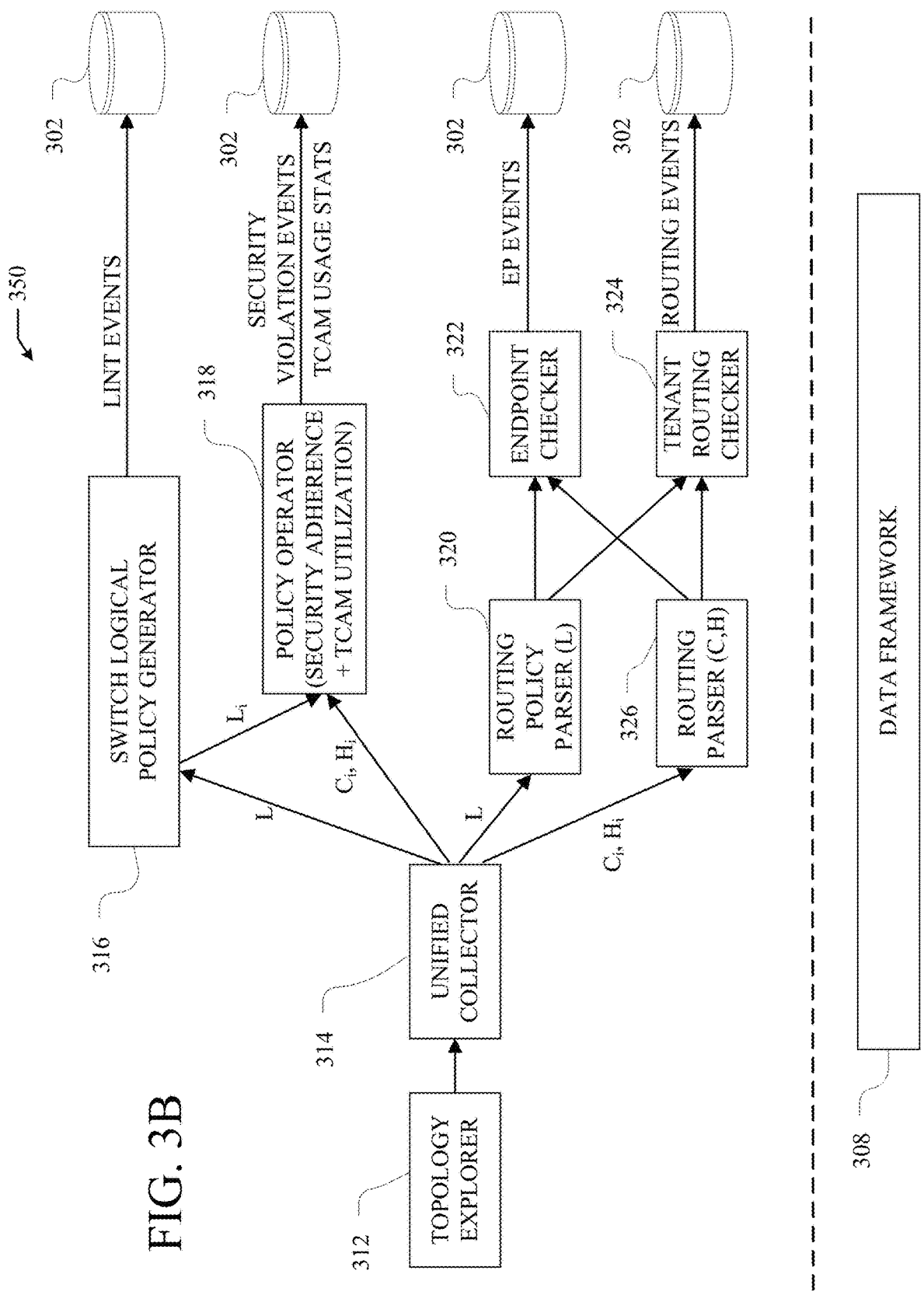

FIG. 3B illustrates an architectural diagram of an example system 350 for network assurance, such as Assurance Appliance System 300. In some cases, system 350 can correspond to the DAG of Operators 310 previously discussed with respect to FIG. 3A In this example, Topology Explorer 312 communicates with Controllers 116 (e.g., APIC controllers) in order to discover or otherwise construct a comprehensive topological view of Fabric 120 (e.g., Spines 102, Leafs 104, Controllers 116, Endpoints 122, and any other components as well as their interconnections). While various architectural components are represented in a singular, boxed fashion, it is understood that a given architectural component, such as Topology Explorer 312, can correspond to one or more individual Operators 310 and may include one or more nodes or endpoints, such as one or more servers, VMs, containers, applications, service functions (e.g., functions in a service chain or virtualized network function), etc.

Topology Explorer 312 is configured to discover nodes in Fabric 120, such as Controllers 116, Leafs 104, Spines 102, etc. Topology Explorer 312 can additionally detect a majority election performed amongst Controllers 116, and determine whether a quorum exists amongst Controllers 116. If no quorum or majority exists, Topology Explorer 312 can trigger an event and alert a user that a configuration or other error exists amongst Controllers 116 that is preventing a quorum or majority from being reached. Topology Explorer 312 can detect Leafs 104 and Spines 102 that are part of Fabric 120 and publish their corresponding out-of-band management network addresses (e.g., IP addresses) to downstream services. This can be part of the topological view that is published to the downstream services at the conclusion of Topology Explorer's 312 discovery epoch (e.g., 5 minutes, or some other specified interval).

In some examples, Topology Explorer 312 can receive as input a list of Controllers 116 (e.g., APIC controllers) that are associated with the network/fabric (e.g., Fabric 120). Topology Explorer 312 can also receive corresponding credentials to login to each controller. Topology Explorer 312 can retrieve information from each controller using, for example, REST calls. Topology Explorer 312 can obtain from each controller a list of nodes (e.g., Leafs 104 and Spines 102), and their associated properties, that the controller is aware of. Topology Explorer 312 can obtain node information from Controllers 116 including, without limitation, an IP address, a node identifier, a node name, a node domain, a node URI, a node_dm, a node role, a node version, etc.

Topology Explorer 312 can also determine if Controllers 116 are in quorum, or are sufficiently communicatively coupled amongst themselves. For example, if there are n controllers, a quorum condition might be met when (n/2+1) controllers are aware of each other and/or are communicatively coupled. Topology Explorer 312 can make the determination of a quorum (or identify any failed nodes or controllers) by parsing the data returned from the controllers, and identifying communicative couplings between their constituent nodes. Topology Explorer 312 can identify the type of each node in the network, e.g. spine, leaf, APIC, etc., and include this information in the topology information generated (e.g., topology map or model).

If no quorum is present, Topology Explorer 312 can trigger an event and alert a user that reconfiguration or suitable attention is required. If a quorum is present, Topology Explorer 312 can compile the network topology information into a JSON object and pass it downstream to other operators or services, such as Unified Collector 314.

Unified Collector 314 can receive the topological view or model from Topology Explorer 312 and use the topology information to collect information for network assurance from Fabric 120. Unified Collector 314 can poll nodes (e.g., Controllers 116, Leafs 104, Spines 102, etc.) in Fabric 120 to collect information from the nodes.

Unified Collector 314 can include one or more collectors (e.g., collector devices, operators, applications, VMs, etc.) configured to collect information from Topology Explorer 312 and/or nodes in Fabric 120. For example, Unified Collector 314 can include a cluster of collectors, and each of the collectors can be assigned to a subset of nodes within the topological model and/or Fabric 120 in order to collect information from their assigned subset of nodes. For performance, Unified Collector 314 can run in a parallel, multi-threaded fashion.

Unified Collector 314 can perform load balancing across individual collectors in order to streamline the efficiency of the overall collection process. Load balancing can be optimized by managing the distribution of subsets of nodes to collectors, for example by randomly hashing nodes to collectors.

In some cases, Assurance Appliance System 300 can run multiple instances of Unified Collector 314. This can also allow Assurance Appliance System 300 to distribute the task of collecting data for each node in the topology (e.g., Fabric 120 including Spines 102, Leafs 104, Controllers 116, etc.) via sharding and/or load balancing, and map collection tasks and/or nodes to a particular instance of Unified Collector 314 with data collection across nodes being performed in parallel by various instances of Unified Collector 314. Within a given node, commands and data collection can be executed serially. Assurance Appliance System 300 can control the number of threads used by each instance of Unified Collector 314 to poll data from Fabric 120.

Unified Collector 314 can collect models (e.g., L_Model 270A and/or LR_Model 270B) from Controllers 116, switch software configurations and models (e.g., Ci_Model 274) from nodes (e.g., Leafs 104 and/or Spines 102) in Fabric 120, hardware configurations and models (e.g., Hi_Model 276) from nodes (e.g., Leafs 104 and/or Spines 102) in Fabric 120, etc. Unified Collector 314 can collect Ci_Model 274 and Hi_Model 276 from individual nodes or fabric members, such as Leafs 104 and Spines 102, and L_Model 270A and/or LR_Model 270B from one or more controllers (e.g., Controllers 116) in Network Environment 100.

Unified Collector 314 can poll the devices that Topology Explorer 312 discovers in order to collect data from Fabric 120 (e.g., from the constituent members of the fabric). Unified Collector 314 can collect the data using interfaces exposed by Controllers 116 and/or switch software (e.g., switch OS), including, for example, a Representation State Transfer (REST) Interface and a Secure Shell (SSH) Interface.

In some cases, Unified Collector 314 collects L_Model 270A, LR_Model 270B, and/or Ci_Model 274 via a REST API, and the hardware information (e.g., configurations, tables, fabric card information, rules, routes, etc.) via SSH using utilities provided by the switch software, such as virtual shell (VSH or VSHELL) for accessing the switch command-line interface (CLI) or VSH_LC shell for accessing runtime state of the line card.

Unified Collector 314 can poll other information from Controllers 116, including, without limitation: topology information, tenant forwarding/routing information, tenant security policies, contracts, interface policies, physical domain or VMM domain information, OOB (out-of-band) management IP's of nodes in the fabric, etc.

Unified Collector 314 can also poll information from nodes (e.g., Leafs 104 and Spines 102) in Fabric 120, including without limitation: Ci_Models 274 for VLANs, BDs, and security policies; Link Layer Discovery Protocol (LLDP) connectivity information of nodes (e.g., Leafs 104 and/or Spines 102); endpoint information from EPM/COOP; fabric card information from Spines 102; routing information base (RIB) tables from nodes in Fabric 120; forwarding information base (FIB) tables from nodes in Fabric 120; security group hardware tables (e.g., TCAM tables) from nodes in Fabric 120; etc.

In some cases, Unified Collector 314 can obtain runtime state from the network and incorporate runtime state information into L_Model 270A and/or LR_Model 270B. Unified Collector 314 can also obtain multiple logical models from Controllers 116 and generate a comprehensive or network-wide logical model (e.g., L_Model 270A and/or LR_Model 270B) based on the logical models. Unified Collector 314 can compare logical models from Controllers 116, resolve dependencies, remove redundancies, etc., and generate a single L_Model 270A and/or LR_Model 270B for the entire network or fabric.

Unified Collector 314 can collect the entire network state across Controllers 116 and fabric nodes or members (e.g., Leafs 104 and/or Spines 102). For example, Unified Collector 314 can use a REST interface and an SSH interface to collect the network state. This information collected by Unified Collector 314 can include data relating to the link layer, VLANs, BDs, VRFs, security policies, etc. The state information can be represented in LR_Model 270B, as previously mentioned. Unified Collector 314 can then publish the collected information and models to any downstream operators that are interested in or require such information. Unified Collector 314 can publish information as it is received, such that data is streamed to the downstream operators.

Data collected by Unified Collector 314 can be compressed and sent to downstream services. In some examples, Unified Collector 314 can collect data in an online fashion or real-time fashion, and send the data downstream, as it is collected, for further analysis. In some examples, Unified Collector 314 can collect data in an offline fashion, and compile the data for later analysis or transmission.

Assurance Appliance System 300 can contact Controllers 116, Spines 102, Leafs 104, and other nodes to collect various types of data. In some scenarios, Assurance Appliance System 300 may experience a failure (e.g., connectivity problem, hardware or software error, etc.) that prevents it from being able to collect data for a period of time. Assurance Appliance System 300 can handle such failures seamlessly, and generate events based on such failures.

Switch Logical Policy Generator 316 can receive L_Model 270A and/or LR_Model 270B from Unified Collector 314 and calculate Li_Model 272 for each network device i (e.g., switch i) in Fabric 120. For example, Switch Logical Policy Generator 316 can receive L_Model 270A and/or LR_Model 270B and generate Li_Model 272 by projecting a logical model for each individual node i (e.g., Spines 102 and/or Leafs 104) in Fabric 120. Switch Logical Policy Generator 316 can generate Li_Model 272 for each switch in Fabric 120, thus creating a switch logical model based on L_Model 270A and/or LR_Model 270B for each switch.

Each Li_Model 272 can represent L_Model 270A and/or LR_Model 270B as projected or applied at the respective network device i (e.g., switch i) in Fabric 120. In some cases, Li_Model 272 can be normalized or formatted in a manner that is compatible with the respective network device. For example, Li_Model 272 can be formatted in a manner that can be read or executed by the respective network device. To illustrate, Li_Model 272 can included specific identifiers (e.g., hardware plane identifiers used by Controllers 116 as classifiers, etc.) or tags (e.g., policy group tags) that can be interpreted by the respective network device. In some cases, Li_Model 272 can include JSON objects. For example, Li_Model 272 can include JSON objects to represent rules, filters, entries, scopes, etc.

The format used for Li_Model 272 can be the same as, or consistent with, the format of Ci_Model 274. For example, both Li_Model 272 and Ci_Model 274 may be based on JSON objects. Similar or matching formats can enable Li_Model 272 and Ci_Model 274 to be compared for equivalence or congruence. Such equivalency checks can aid in network analysis and assurance as further explained herein.

Switch Logical Configuration Generator 316 can also perform change analysis and generate lint events or records for problems discovered in L_Model 270A and/or LR_Model 270B. The lint events or records can be used to generate alerts for a user or network operator.

Policy Operator 318 can receive Ci_Model 274 and Hi_Model 276 for each switch from Unified Collector 314, and Li_Model 272 for each switch from Switch Logical Policy Generator 316, and perform assurance checks and analysis (e.g., security adherence checks, TCAM utilization analysis, etc.) based on Ci_Model 274, Hi_Model 276, and Li_Model 272. Policy Operator 318 can perform assurance checks on a switch-by-switch basis by comparing one or more of the models.

Returning to Unified Collector 314, Unified Collector 314 can also send L_Model 270A and/or LR_Model 270B to Routing Policy Parser 320, and Ci_Model 274 and Hi_Model 276 to Routing Parser 326.

Routing Policy Parser 320 can receive L_Model 270A and/or LR_Model 270B and parse the model(s) for information that may be relevant to downstream operators, such as Endpoint Checker 322 and Tenant Routing Checker 324. Similarly, Routing Parser 326 can receive Ci_Model 274 and Hi_Model 276 and parse each model for information for downstream operators, Endpoint Checker 322 and Tenant Routing Checker 324.

After Ci_Model 274, Hi_Model 276, L_Model 270A and/or LR_Model 270B are parsed, Routing Policy Parser 320 and/or Routing Parser 326 can send cleaned-up protocol buffers (Proto Buffs) to the downstream operators, Endpoint Checker 322 and Tenant Routing Checker 324. Endpoint Checker 322 can then generate events related to Endpoint violations, such as duplicate IPs, APIPA, etc., and Tenant Routing Checker 324 can generate events related to the deployment of BDs, VRFs, subnets, routing table prefixes, etc.

Figure 4A:
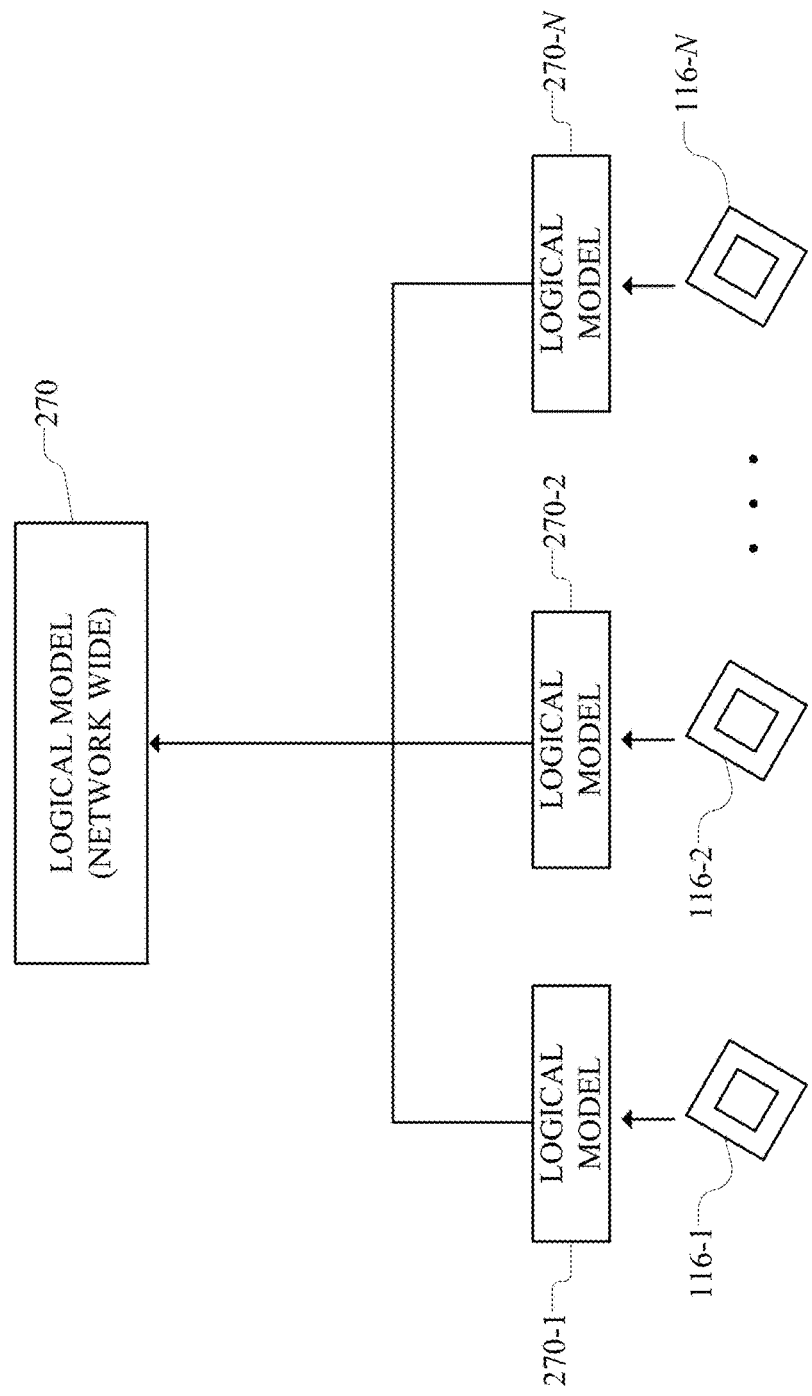

FIG. 4A illustrates an example diagram 400 for constructing a Network-Wide Logical Model 270 of a network (e.g., Network Environment 100) based on Logical Models 270-1 obtained from various controllers (e.g., Controllers 116-1 through 116-N) on the network. Logical Models 270-1 through 270-N can include a respective version of L_Model 270A and/or LR_Model 270B, as shown in FIG. 2D, stored at the respective Controllers 116. Each of the Logical Models 270-1 through 270-N can include objects and configurations of the network stored at the respective Controllers 116. The objects and configurations can include data and configurations provided by the network operator via the Controllers 116. The Controllers 116 can store such objects and configurations to be pushed to the nodes in Fabric 120, such as Leafs 104.

In some cases, the Logical Models 270-1 through 270-N can be obtained from the plurality of controllers by polling the controllers for respective logical models and/or stored configurations. For example, Assurance Appliance System 300 can poll Controllers 116 and extract the logical models and/or configurations from the Controllers 116. Assurance Appliance System 300 can collect the logical models and/or configurations from Controllers 116 via one or more engines or operators, such as Unified Collector 314 for example. Assurance Appliance System 300 can also collect other data, such as runtime state and/or configurations, from nodes (e.g., Leafs 104) in the network, and incorporate some or all of the information into the Network-Wide Logical Model 270. For example, Assurance Appliance System 300 can collect runtime or state data from the nodes, via for example Topology Explorer 312, and incorporate the runtime or state data into the Network-Wide Logical Model 270.

Network-Wide Logical Model 270 can provide a network-wide representation of the network based on the Logical Models 270-1 through 270-N from the Controllers 116. Thus, Network-Wide Logical Model 270 can reflect the intent specification for the network. In other words, Network-Wide Logical Model 270 can reflect the configuration of the network intended by the network operator through the configurations and data specified by the network operator via the Controllers 116.

Network-Wide Logical Model 270 can be generated by combining the Logical Models 270-1 through 270-N. For example, Network-Wide Logical Model 270 can be constructed by comparing the Logical Models 270-1 through 270-N and merging configurations and data from the various logical models into a single logical model. Network-Wide Logical Model 270 can include the data and/or configurations that are consistently (e.g., matching) including in at least a threshold number of the Logical Models 270-1 through 270-N. For example, the threshold number can be based on whether the logical models with the matching data and/or configurations originated from a number of controllers that is sufficient to establish a quorum, as previously described. In some cases, data and/or configurations only found in logical models originating from a number of controllers that is less than the number necessary for a quorum may be excluded from Network-Wide Logical Model 270. In other cases, such data and/or configurations can be included even if a quorum is not satisfied. For example, such data and/or configurations can be included but verified through subsequent polling of controllers and comparison of logical models. If, after a number of iterations of polling the controllers and comparing the logical models obtained, such data and/or configurations are still not included in the logical models from a quorum of controllers, such data and/or configurations may be discarded, flagged, tested, etc.

In some cases, Network-Wide Logical Model 270 can be periodically updated or verified by polling controllers and analyzing the logical models obtained from the controllers. For example, the controllers can be polled at specific time intervals or scheduled periods. In some cases, the update and/or verification of Network-Wide Logical Model 270 can be triggered by an event, such as a software update, a configuration modification, a network change, etc. For example, the update and/or verification of Network-Wide Logical Model 270 can be triggered when a configuration is modified, added, or removed at one or more controllers. Such event can trigger the polling of controllers for logical models. In some cases, the logical models can be obtained on a push basis such that the controllers can push their logical models and/or configurations periodically and/or based on a triggering event, such as a configuration update.

Figure 4B:
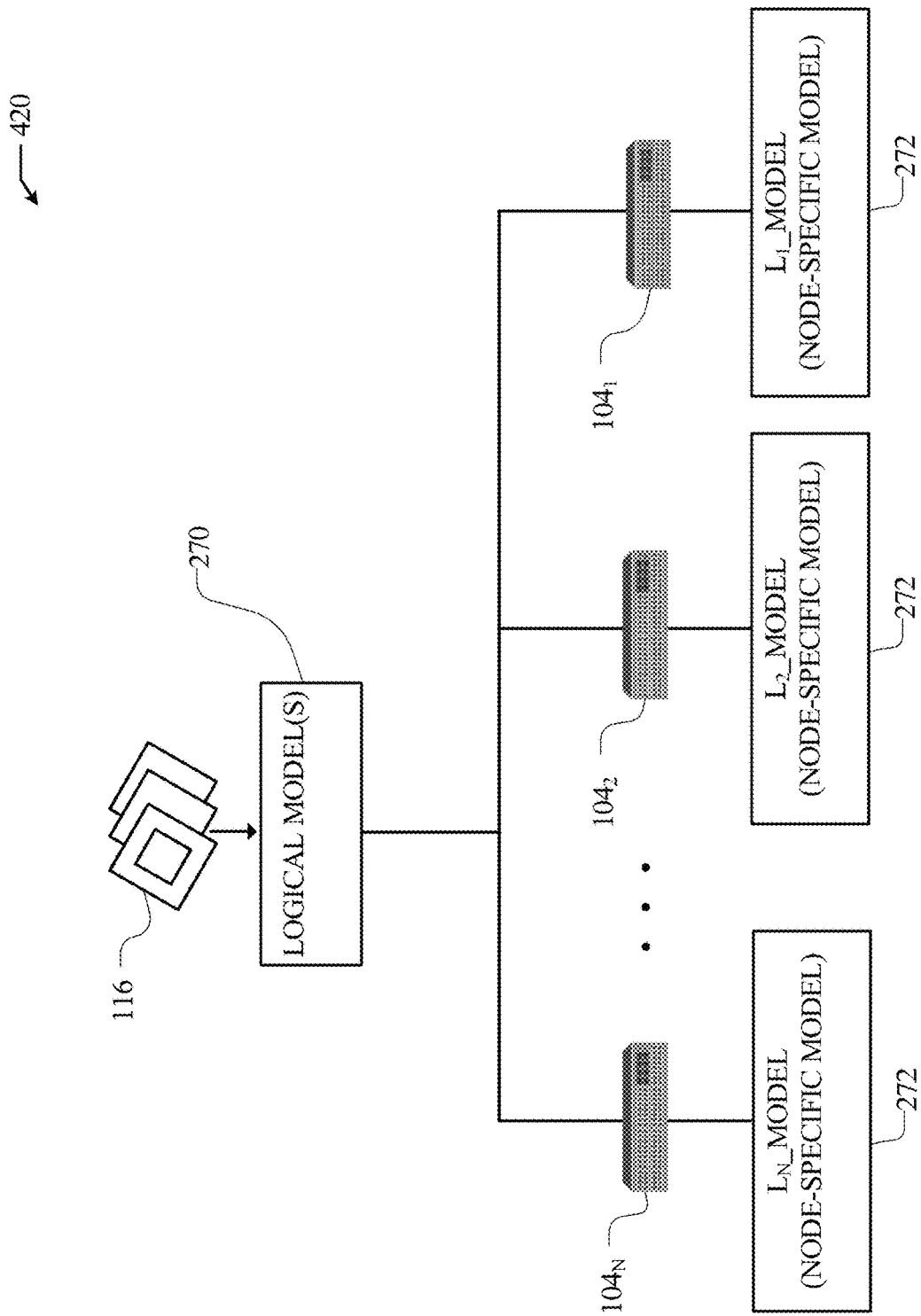

FIG. 4B illustrates an example diagram 420 for constructing node-specific logical models (e.g., Li_Models 272) based on a Logical Model 270 of a network (e.g., Network Environment 100). Logical Model 270 can refer to Network-Wide Logical Model 270 as shown in FIG. 4A. Thus, as previously explained, Logical Model 270 can be a network-wide version of L_Model 270A and/or LR_Model 270B based on the logical models L_Model 270A and/or LR_Model 270B at the various controllers (e.g., Controllers 116) in the network. Moreover, Logical Model 270 can provide a network-wide representation of the network.

Logical Model 270 can include objects and configurations of the network to be pushed, via for example Controllers 116, to the nodes in Fabric 120, such as Leafs 104. Accordingly, Logical Model 270 can be used to construct a Node-Specific Logical Model (e.g., Li_Model 272) for each of the nodes in Fabric 120 (e.g., Leafs 104). To this end, Logical Model 270 can be adapted for each of the nodes (e.g., Leafs 104) in order to generate a respective logical model for each node, which represents, and/or corresponds to, the portion(s) and/or information from Logical Model 270 that is pertinent to the node, and/or the portion(s) and/or information from Logical Model 270 that should be, and/or is, pushed, stored, and/or rendered at the node.

Each of the Node-Specific Logical Models, Li_Model 272, can contain those objects, properties, configurations, data, etc., from Logical Model 270 that pertain to the specific node, including any portion(s) from Logical Model 270 projected or rendered on the specific node when the network-wide intent specified by Logical Model 270 is propagated or projected to the individual node. In other words, to carry out the intent specified in Logical Model 270, the individual nodes (e.g., Leafs 104) can implement respective portions of Logical Model 270 such that together, the individual nodes can carry out the intent specified in Logical Model 270.

The Node-Specific Logical Models, Li_Model 272, would thus contain the data and/or configurations, including rules and properties, to be rendered by the software at the respective nodes. In other words, the Node-Specific Logical Models, Li_Model 272, includes the data for configuring the specific nodes. The rendered configurations and data at the nodes can then be subsequently pushed to the node hardware (e.g., TCAM), to generate the rendered configurations on the node's hardware.

Figure 5A:
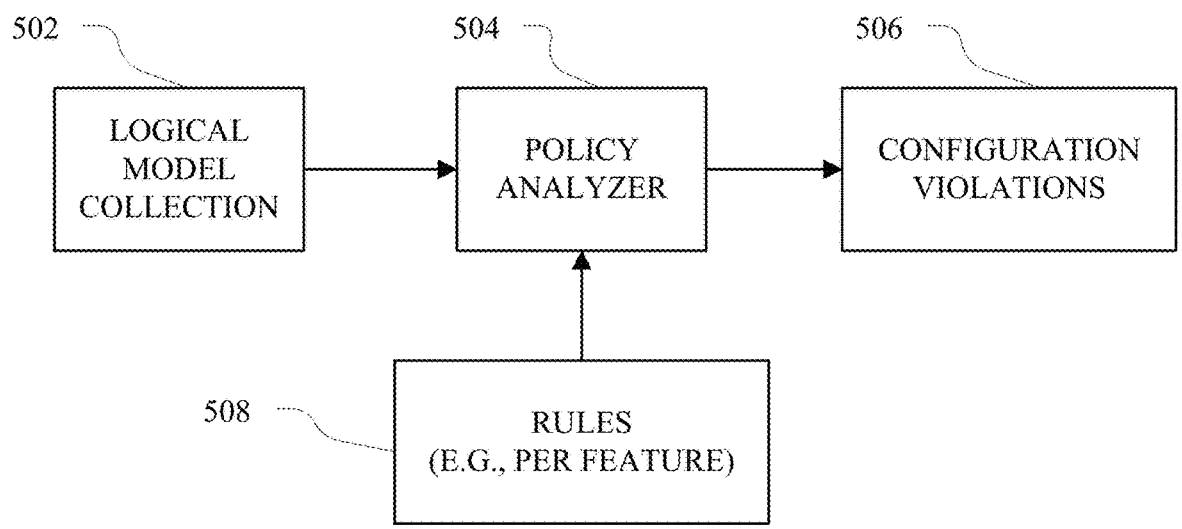

FIG. 5A illustrates a schematic diagram of an example system for policy analysis in a network (e.g., Network Environment 100). Policy Analyzer 504 can perform assurance checks to detect configuration violations, logical lint events, contradictory or conflicting policies, unused contracts, incomplete configurations, routing checks, rendering errors, incorrect rules, etc. Policy Analyzer 504 can check the specification of the user's intent or intents in L_Model 270A (or Logical Model 270 as shown in FIG. 4) to determine if any configurations in Controllers 116 are inconsistent with the specification of the user's intent or intents.

Policy Analyzer 504 can include one or more of the Operators 310 executed or hosted in Assurance Appliance System 300. However, in other configurations, Policy Analyzer 504 can run one or more operators or engines that are separate from Operators 310 and/or Assurance Appliance System 300. For example, Policy Analyzer 504 can be implemented via a VM, a software container, a cluster of VMs or software containers, an endpoint, a collection of endpoints, a service function chain, etc., any of which may be separate from Assurance Appliance System 300.

Policy Analyzer 504 can receive as input Logical Model Collection 502, which can include Logical Model 270 as shown in FIG. 4; and/or L_Model 270A, LR_Model 270B, and/or Li_Model 272 as shown in FIG. 2D. Policy Analyzer 504 can also receive as input Rules 508. Rules 508 can be defined, for example, per feature (e.g., per object, per object property, per contract, per rule, etc.) in one or more logical models from the Logical Model Collection 502. Rules 508 can be based on objects, relationships, definitions, configurations, and any other features in MIM 200. Rules 508 can specify conditions, relationships, parameters, and/or any other information for identifying configuration violations or issues.

Rules 508 can include information for identifying syntactic violations or issues. For example, Rules 508 can include one or more statements and/or conditions for performing syntactic checks. Syntactic checks can verify that the configuration of a logical model and/or the Logical Model Collection 502 is complete, and can help identify configurations or rules from the logical model and/or the Logical Model Collection 502 that are not being used. Syntactic checks can also verify that the configurations in the hierarchical MIM 200 have been properly or completely defined in the Logical Model Collection 502, and identify any configurations that are defined but not used. To illustrate, Rules 508 can specify that every tenant defined in the Logical Model Collection 502 should have a context configured; every contract in the Logical Model Collection 502 should specify a provider EPG and a consumer EPG; every contract in the Logical Model Collection 502 should specify a subject, filter, and/or port; etc.

Rules 508 can also include information for performing semantic checks and identifying semantic violations. Semantic checks can check conflicting rules or configurations. For example, Rule 1 and Rule 2 can overlap and create aliasing issues, Rule 1 can be more specific than Rule 2 and result in conflicts, Rule 1 can mask Rule 2 or inadvertently overrule Rule 2 based on respective priorities, etc. Thus, Rules 508 can define conditions which may result in aliased rules, conflicting rules, etc. To illustrate, Rules 508 can indicate that an allow policy for a specific communication between two objects may conflict with a deny policy for the same communication between two objects if the allow policy has a higher priority than the deny policy. Rules 508 can indicate that a rule for an object renders another rule unnecessary due to aliasing and/or priorities. As another example, Rules 508 can indicate that a QoS policy in a contract conflicts with a QoS rule stored on a node.

Policy Analyzer 504 can apply Rules 508 to the Logical Model Collection 502 to check configurations in the Logical Model Collection 502 and output Configuration Violation Events 506 (e.g., alerts, logs, notifications, etc.) based on any issues detected. Configuration Violation Events 506 can include configuration problems, routing problems, semantic problems, semantic problems, etc. For example, Events 506 can include incomplete configurations, conflicting configurations, aliased rules, unused configurations, errors, policy violations, misconfigured objects, incomplete configurations, incorrect contract scopes, improper object relationships, etc.

In some cases, Policy Analyzer 504 can iteratively traverse each node in a tree (or any other structure) generated based on the Logical Model Collection 502 and/or MIM 200, and apply Rules 508 at each node in the tree to determine if any nodes yield a violation (e.g., incomplete configuration, improper configuration, unused configuration, etc.). Policy Analyzer 504 can output Configuration Violation Events 506 when it detects any violations.

Figure 5B:
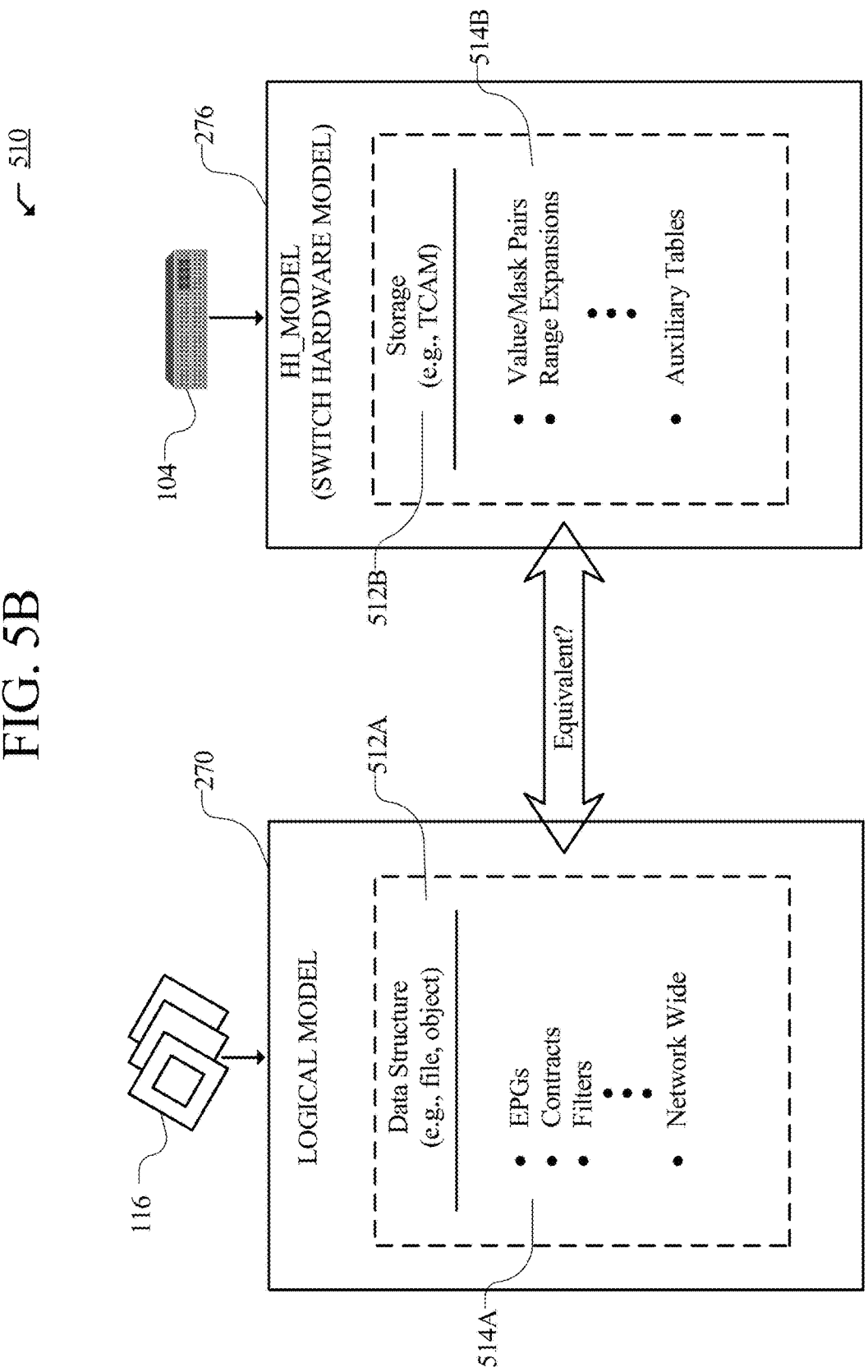

FIG. 5B illustrates an example equivalency diagram 510 of network models. In this example, the Logical Model 270 can be compared with the Hi_Model 276 obtained from one or more Leafs 104 in the Fabric 120. This comparison can provide an equivalency check in order to determine whether the logical configuration of the Network Environment 100 at the Controller(s) 116 is consistent with, or conflicts with, the rules rendered on the one or more Leafs 104 (e.g., rules and/or configurations in storage, such as TCAM). For explanation purposes, Logical Model 270 and Hi_Model 276 are illustrated as the models compared in the equivalency check example in FIG. 5B. However, it should be noted that, in other examples, other models can be checked to perform an equivalency check for those models. For example, an equivalency check can compare Logical Model 270 with Ci_Model 274 and/or Hi_Model 276, Li_Model 272 with Ci_Model 274 and/or Hi_Model 276, Ci_Model 274 with Hi_Model 276, etc.

Equivalency checks can identify whether the network operator's configured intent is consistent with the network's actual behavior, as well as whether information propagated between models and/or devices in the network is consistent, conflicts, contains errors, etc. For example, a network operator can define objects and configurations for Network Environment 100 from Controller(s) 116. Controller(s) 116 can store the definitions and configurations from the network operator and construct a logical model (e.g., L_Model 270A) of the Network Environment 100. The Controller(s) 116 can push the definitions and configurations provided by the network operator and reflected in the logical model to each of the nodes (e.g., Leafs 104) in the Fabric 120. In some cases, the Controller(s) 116 may push a node-specific version of the logical model (e.g., Li_Model 272) that reflects the information in the logical model of the network (e.g., L_Model 270A) pertaining to that node.

The nodes in the Fabric 120 can receive such information and render or compile rules on the node's software (e.g., Operating System). The rules/configurations rendered or compiled on the node's software can be constructed into a Construct Model (e.g., Ci_Model 274). The rules from the Construct Model can then be pushed from the node's software to the node's hardware (e.g., TCAM) and stored or rendered as rules on the node's hardware. The rules stored or rendered on the node's hardware can be constructed into a Hardware Model (e.g., Hi_Model 276) for the node.

The various models (e.g., Logical Model 270 and Hi_Model 276) can thus represent the rules and configurations at each stage (e.g., intent specification at Controller(s) 116, rendering or compiling on the node's software, rendering or storing on the node's hardware, etc.) as the definitions and configurations entered by the network operator are pushed through each stage. Accordingly, an equivalency check of various models, such as Logical Model 270 and Hi_Model 276, Li_Model 272 and Ci_Model 274 or Hi_Model 276, Ci_Model 274 and Hi_Model 276, etc., can be used to determine whether the definitions and configurations have been properly pushed, rendered, and/or stored at any stage associated with the various models.

If the models pass the equivalency check, then the definitions and configurations at checked stage (e.g., Controller(s) 116, software on the node, hardware on the node, etc.) can be verified as accurate and consistent. By contrast, if there is an error in the equivalency check, then a misconfiguration can be detected at one or more specific stages. The equivalency check between various models can also be used to determine where (e.g., at which stage) the problem or misconfiguration has occurred. For example, the stage where the problem or misconfiguration occurred can be ascertained based on which model(s) fail the equivalency check.

The Logical Model 270 and Hi_Model 276 can store or render the rules, configurations, properties, definitions, etc., in a respective structure 512A, 512B. For example, Logical Model 270 can store or render rules, configurations, objects, properties, etc., in a data structure 512A, such as a file or object (e.g., JSON, XML, etc.), and Hi_Model 276 can store or render rules, configurations, etc., in a storage 512B, such as TCAM memory. The structure 512A, 512B associated with Logical Model 270 and Hi_Model 276 can influence the format, organization, type, etc., of the data (e.g., rules, configurations, properties, definitions, etc.) stored or rendered.

For example, Logical Model 270 can store the data as objects and object properties 514A, such as EPGs, contracts, filters, tenants, contexts, BDs, network wide parameters, etc. The Hi_Model 276 can store the data as values and tables 514B, such as value/mask pairs, range expressions, auxiliary tables, etc.

As a result, the data in Logical Model 270 and Hi_Model 276 can be normalized, canonized, diagramed, modeled, re-formatted, flattened, etc., to perform an equivalency between Logical Model 270 and Hi_Model 276. For example, the data can be converted using bit vectors, Boolean functions, ROBDDs, etc., to perform a mathematical check of equivalency between Logical Model 270 and Hi_Model 276.

Figure 5C:
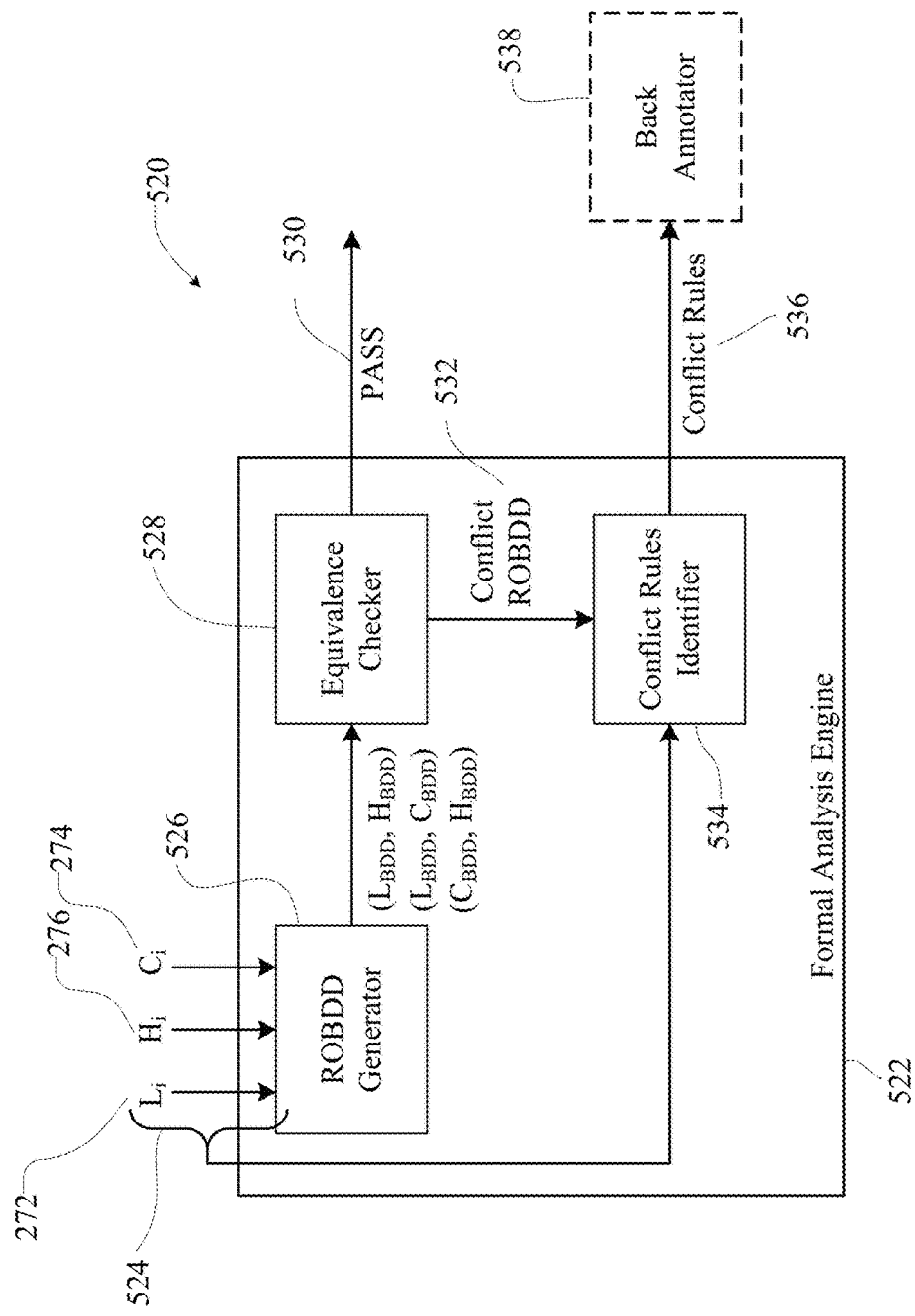

FIG. 5C illustrates example Architecture 520 for performing equivalence checks of input models. Rather than employing brute force to determine the equivalence of input models, the network models can instead be represented as specific data structures, such as Reduced Ordered Binary Decision Diagrams (ROBDDs) and/or bit vectors. In this example, input models are represented as ROBDDs, where each ROBDD is canonical (unique) to the input rules and their priority ordering.

Each network model is first converted to a flat list of priority ordered rules. In some examples, contracts can be specific to EPGs and thus define communications between EPGs, and rules can be the specific node-to-node implementation of such contracts. Architecture 520 includes a Formal Analysis Engine 522. In some cases, Formal Analysis Engine 522 can be part of Policy Analyzer 504 and/or Assurance Appliance System 300. For example, Formal Analysis Engine 522 can be hosted within, or executed by, Policy Analyzer 504 and/or Assurance Appliance System 300. To illustrate, Formal Analysis Engine 522 can be implemented via one or more operators, VMs, containers, servers, applications, service functions, etc., on Policy Analyzer 504 and/or Assurance Appliance System 300. In other cases, Formal Analysis Engine 522 can be separate from Policy Analyzer 504 and/or Assurance Appliance System 300. For example, Formal Analysis Engine 522 can be a standalone engine, a cluster of engines hosted on multiple systems or networks, a service function chain hosted on one or more systems or networks, a VM, a software container, a cluster of VMs or software containers, a cloud-based service, etc.

Formal Analysis Engine 522 includes an ROBDD Generator 526. ROBDD Generator 526 receives Input 524 including flat lists of priority ordered rules for Models 272, 274, 276 as shown in FIG. 2D. These rules can be represented as Boolean functions, where each rule consists of an action (e.g. Permit, Permit_Log, Deny, Deny_Log) and a set of conditions that will trigger that action (e.g. one or more configurations of traffic, such as a packet source, destination, port, source or provider EPG, destination or consumer EPG, QoS policy, priority marking, packet header parameter(s), etc.). For example, a rule might be designed as Permit all traffic on port 80. In some examples, each rule might be an n-bit string with m-fields of key-value pairs. For example, each rule might be a 147 bit string with 13 fields of key-value pairs.

As a simplified example, consider a flat list of the priority ordered rules L1, L2, L3, and L4 in Li_Model 272, where L1 is the highest priority rule and L4 is the lowest priority rule. A given packet is first checked against rule L1. If L1 is triggered, then the packet is handled according to the action contained in rule L1. Otherwise, the packet is then checked against rule L2. If L2 is triggered, then the packet is handled according to the action contained in rule L2. Otherwise, the packet is then checked against rule L3, and so on, until the packet either triggers a rule or reaches the end of the listing of rules.

The ROBDD Generator 526 can calculate one or more ROBDDs for the constituent rules L1-L4 of one or more models. An ROBDD can be generated for each action encoded by the rules L1-L4, or each action that may be encoded by the rules L1-L4, such that there is a one-to-one correspondence between the number of actions and the number of ROBDDs generated. For example, the rules L1-L4 might be used to generate $L\_Permit_{BDD}$, $L\_Permit\_Log_{BDD}$, $L\_Deny\text{-}BDD$, and $L\_Deny\_Log_{BDD}$.

Generally, ROBDD Generator 526 begins its calculation with the highest priority rule of Input 524 in the listing of rules received. Continuing the example of rules L1-L4 in Li_Model 272, ROBDD Generator 526 begins with rule L1. Based on the action specified by rule L1 (e.g. Permit, Permit_Log, Deny, Deny_Log), rule L1 is added to the corresponding ROBDD for that action. Next, rule L2 will be added to the corresponding ROBDD for the action that it specifies. In some examples, a reduced form of L2 can be used, given by L1'L2, with L1' denoting the inverse of L1. This process is then repeated for rules L3 and L4, which have reduced forms given by (L1+L2)'L3 and (L1+L2+L3)'L4, respectively.

Notably, $L\_Permit_{BDD}$ and each of the other action-specific ROBDDs encode the portion of each constituent rule L1, L2, L3, L4 that is not already captured by higher priority rules. That is, L1'L2 represents the portion of rule L2 that does not overlap with rule L1, (L1+L2)'L3 represents the portion of rule L3 that does not overlap with either rules L1 or L2, and (L1+L2+L3)'L4 represents the portion of rule L4 that does not overlap with either rules L1 or L2 or L3. This reduced form can be independent of the action specified by an overlapping or higher priority rule and can be calculated based on the conditions that will cause the higher priority rules to trigger.

ROBDD Generator 526 likewise can generate an ROBDD for each associated action of the remaining models associated with Input 524, such as Ci_Model 274 and Hi_Model 276 in this example, or any other models received by ROBDD Generator 526. From the ROBDDs generated, the formal equivalence of any two or more ROBDDs of models can be checked via Equivalence Checker 528, which builds a conflict ROBDD encoding the areas of conflict between input ROBDDs.

In some examples, the ROBDDs being compared will be associated with the same action. For example, Equivalence Checker 528 can check the formal equivalence of L_Permit$_{BDD}$ against H_Permit$_{BDD}$ by calculating the exclusive disjunction between L_Permit$_{BDD}$ and H_Permit$_{BDD}$. More particularly, L_Permit$_{BDD}$ $\oplus$ H_Permit$_{BDD}$ (i.e. L_Permit$_{BDD}$ XOR H_Permit$_{BDD}$) is calculated, although it is understood that the description below is also applicable to other network models (e.g., Logical Model 270, L_Model 270A, LR_Model 270B, Li_Model 272, Ci_Model 274, Hi_Model 276, etc.) and associated actions (Permit, Permit_Log, Deny, Deny_Log, etc.).

Figure 6A:
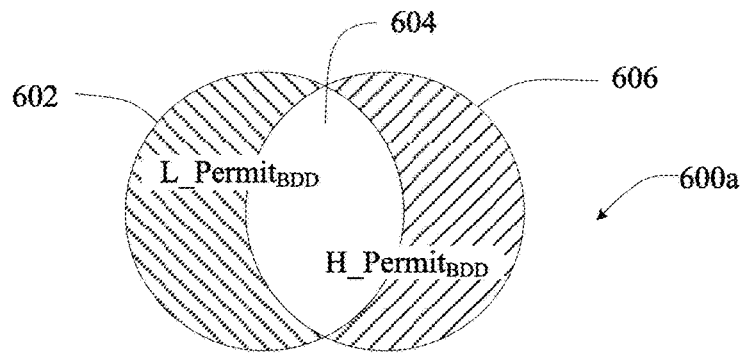

An example calculation is illustrated in FIG. 6A, which depicts a simplified representation of a Permit conflict ROBDD 600a calculated for L_Permit$_{BDD}$ and H_Permit$_{BDD}$. As illustrated, L_Permit$_{BDD}$ includes a unique portion 602 (shaded) and an overlap 604 (unshaded). Similarly, H_Permit$_{BDD}$ includes a unique portion 606 (shaded) and the same overlap 604.

The Permit conflict ROBDD 600a includes unique portion 602, which represents the set of packet configurations and network actions that are encompassed within L_Permit$_{BDD}$ but not H_Permit$_{BDD}$ (i.e. calculated as L_Permit$_{BDD}$* H_Permit$_{BDD}$'), and unique portion 606, which represents the set of packet configurations and network actions that are encompassed within H_Permit$_{BDD}$ but not L_Permit$_{BDD}$ (i.e. calculated as L_Permit$_{BDD}$'* H_Permit$_{BDD}$). Note that the unshaded overlap 604 is not part of Permit conflict ROBDD 600a.

Conceptually, the full circle illustrating L_Permit$_{BDD}$ (e.g. unique portion 602 and overlap 604) represents the fully enumerated set of packet configurations that are encompassed within, or trigger, the Permit rules encoded by input model Li_Model 272. For example, assume Li_Model 272 contains the rules:

L1: port=[1-3] Permit
L2: port=4 Permit
L3: port=[6-8] Permit
L4: port=9 Deny where 'port' represents the port number of a received packet, then the circle illustrating L_Permit$_{BDD}$ contains the set of all packets with port=[1-3], 4, [6-8] that are permitted. Everything outside of this full circle represents the space of packet conditions and/or actions that are different from those specified by the Permit rules contained in Li_Model 272. For example, rule L4 encodes port=9 Deny and would fall outside of the region carved out by L_Permit$_{BDD}$.

Similarly, the full circle illustrating H_Permit$_{BDD}$ (e.g., unique portion 606 and overlap 604) represents the fully enumerated set of packet configurations and network actions that are encompassed within, or trigger, the Permit rules encoded by the input model Hi_Model 276, which contains the rules and/or configurations rendered in hardware. Assume that Hi_Model 276 contains the rules:

H1: port=[1-3] Permit
H2: port=5 Permit
H3: port=[6-8] Deny
H4: port=10 Deny_Log In the comparison between L_Permit$_{BDD}$ and H_Permit$_{BDD}$, only rules L1 and H1 are equivalent, because they match on both packet condition and action. L2 and H2 are not equivalent because even though they specify the same action (Permit), this action is triggered on a different port number (4 vs. 5). L3 and H3 are not equivalent because even though they trigger on the same port number (6-8), they trigger different actions (Permit vs. Deny). L4 and H4 are not equivalent because they trigger on a different port number (9 vs. 10) and also trigger different actions (Deny vs. Deny_Log). As such, overlap 604 contains only the set of packets that are captured by Permit rules L1 and H1, i.e., the packets with port=[1-3] that are permitted. Unique portion 602 contains only the set of packets that are captured by the Permit rules L2 and L3, while unique portion 606 contains only the set of packets that are captured by Permit rule H2. These two unique portions encode conflicts between the packet conditions upon which Li_Model 272 will trigger a Permit, and the packet conditions upon which the hardware rendered Hi_Model 276 will trigger a Permit. Consequently, it is these two unique portions 602 and 606 that make up Permit conflict ROBDD 600a. The remaining rules L4, H3, and H4 are not Permit rules and consequently are not represented in L_Permit$_{BDD}$, H_Permit$_{BDD}$, or Permit conflict ROBDD 600a.

In general, the action-specific overlaps between any two models contain the set of packets that will trigger the same action no matter whether the rules of the first model or the rules of the second model are applied, while the action-specific conflict ROBDDs between these same two models contains the set of packets that result in conflicts by way of triggering on a different condition, triggering a different action, or both.

It should be noted that in the example described above with respect to FIG. 6A, Li_Model 272 and Hi_Model 276 are used as example input models for illustration purposes, but other models may be similarly used. For example, in some cases, a conflict ROBDD can be calculated based on Logical Model 270, as shown in FIG. 4, and/or any of the models 270A, 270B, 272, 274, 276, as shown in FIG. 2D.

Figure 6B:
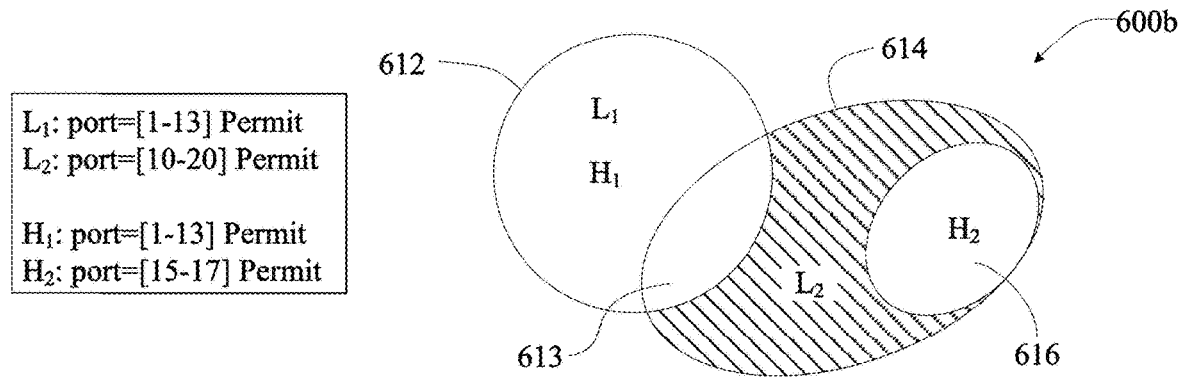
Figure 6C:
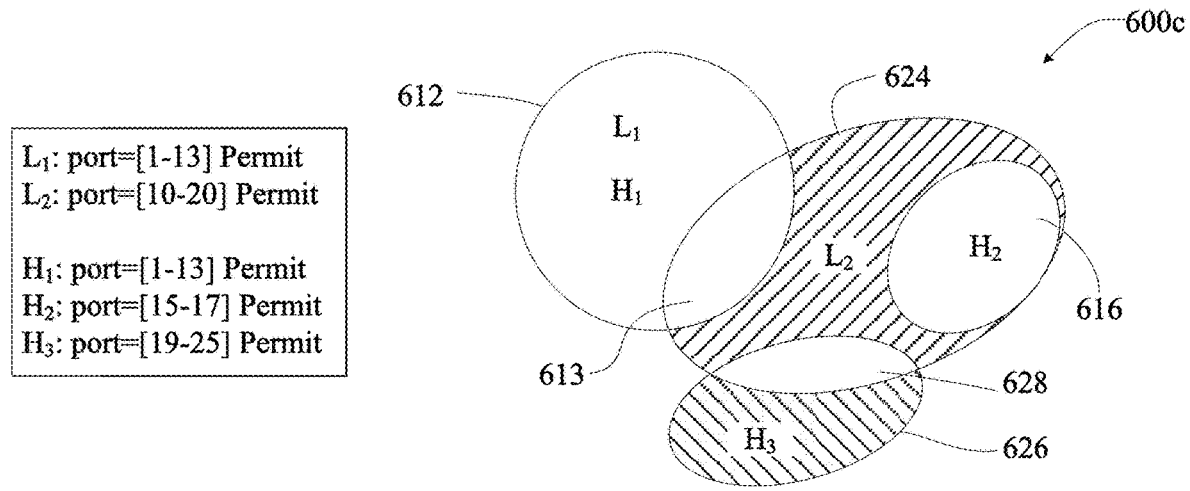

Moreover, for purposes of clarity in the discussion above, Permit conflict ROBDD 600a portrays L_Permit$_{BDD}$ and H_Permit$_{BDD}$ as singular entities rather than illustrating the effect of each individual rule. Accordingly, FIGS. 6B and 6C present Permit conflict ROBDDs with individual rules depicted. FIG. 6B presents a Permit conflict ROBDD 600b taken between the illustrated listing of rules L1, L2, H1, and H2. FIG. 6C presents a Permit conflict ROBDD 600c that adds rule H3 to Permit conflict ROBDD 600b. Both Figures maintain the same shading convention introduced in FIG. 6A, wherein a given conflict ROBDD comprises only the shaded regions that are shown.

Turning first to FIG. 6B, illustrated is a Permit conflict ROBDD 600b that is calculated across a second L_Permit$_{BDD}$ consisting of rules L1 and L2, and a second H_Permit$_{BDD}$ consisting of rules H1 and H2. As illustrated, rules L1 and H1 are identical, and entirely overlap with one another—both rules consists of the overlap 612 and overlap 613. Overlap 612 is common between rules L1 and H1, while overlap 613 is common between rules L1, H1, and L2. For purposes of subsequent explanation, assume that rules L1 and H1 are both defined by port=[1-13] Permit.

Rules L2 and H2 are not identical. Rule L2 consists of overlap 613, unique portion 614, and overlap 616. Rule H2 consists only of overlap 616, as it is contained entirely within the region encompassed by rule L2. For example, rule L2 might be port=[10-20] Permit, whereas rule H2 might be port=[15-17] Permit. Conceptually, this is an example of an error that might be encountered by a network assurance check, wherein an Li_Model 272 rule (e.g., L2) specified by a user intent was incorrectly rendered into a node's memory (e.g., switch TCAM) as an Hi_Model 276 rule (e.g., H2). In particular, the scope of the rendered Hi_Model 276 rule H2 is smaller than the intended scope specified by the user intent contained in L2. For example, such a scenario could arise if a switch TCAM runs out of space, and does not have enough free entries to accommodate a full representation of an Li_Model 272 rule.

Regardless of the cause, this error is detected by the construction of the Permit conflict ROBDD 600b as L_Permit$_{BDD}$ ⊕ H_Permit$_{BDD}$, where the results of this calculation are indicated by the shaded unique portion 614. This unique portion 614 represents the set of packet configurations and network actions that are contained within L_Permit$_{BDD}$ but not H_Permit$_{BDD}$. In particular, unique portion 614 is contained within the region encompassed by rule L2 but is not contained within either of the regions encompassed by rules H1 and H2, and specifically comprises the set defined by port=[14,18-20] Permit.

To understand how this is determined, recall that rule L2 is represented by port=[10-20] Permit. Rule H1 carves out the portion of L2 defined by port=[10-13] Permit, which is represented as overlap 613. Rule H2 carves out the portion of L2 defined by port=[15-17] Permit, which is represented as overlap 616. This leaves only port=[14,18-20] Permit as the non-overlap portion of the region encompassed by L2, or in other words, the unique portion 614 comprises Permit conflict ROBDD 600b.

FIG. 6C illustrates a Permit conflict ROBDD 600c which is identical to Permit conflict ROBDD 600b with the exception of a newly added third rule, H3: port=[19-25] Permit. Rule H3 includes an overlap portion 628, which represents the set of conditions and actions that are contained in both rules H3 and L2, and further consists of a unique portion 626, which represents the set of conditions and actions that are contained only in rule H3. Conceptually, this could represent an error wherein an Li_Model 272 rule (e.g., L2) specified by a user intent was incorrectly rendered into node memory as two Hi_Model 276 rules (e.g., H2 and H3). There is no inherent fault with a single Li_Model 272 rule being represented as multiple Hi_Model 276 rules. Rather, the fault herein lies in the fact that the two corresponding Hi_Model 276 rules do not adequately capture the full extent of the set of packet configurations encompassed by Permit rule L2. Rule H2 is too narrow in comparison to rule L2, as discussed above with respect to FIG. 6B, and rule H3 is both too narrow and improperly extended beyond the boundary of the region encompasses by rule L2.

As was the case before, this error is detected by the construction of the conflict ROBDD 600c, as L_Permit$_{BDD}$ ⊕ H_Permit$_{BDD}$, where the results of this calculation are indicated by the shaded unique portion 624, representing the set of packet configurations and network actions that are contained within L_Permit$_{BDD}$ but not H_Permit$_{BDD}$, and the shaded unique portion 626, representing the set of packet configurations and network actions that are contained within H_Permit$_{BDD}$ but not L_Permit$_{BDD}$. In particular, unique portion 624 is contained only within rule L2, and comprises the set defined by port=[14, 18] Permit, while unique portion 626 is contained only within rule H3, and comprises the set defined by port=[21-25] Permit. Thus, Permit conflict ROBDD 600c comprises the set defined by port=[14, 18, 21-25] Permit.

Reference is made above only to Permit conflict ROBDDs, although it is understood that conflict ROBDDs are generated for each action associated with a given model. For example, a complete analysis of the Li_Model 272 and Hi_Model 276 mentioned above might entail using ROBDD Generator 526 to generate the eight ROBDDs L_Permit$_{BDD}$, L_Permit_Log$_{BDD}$, L_Deny$_{BDD}$, and L_Deny_Log$_{BDD}$, H_Permit$_{BDD}$, H_Permit_Log$_{BDD}$, H_Deny$_{BDD}$, and H_Deny_Log$_{BDD}$, and then using Equivalence Checker 528 to generate a Permit conflict ROBDD, Permit_Log conflict ROBDD, Deny conflict ROBDD, and Deny_Log conflict ROBDD.

In general, Equivalence Checker 528 generates action-specific conflict ROBDDs based on input network models, or input ROBDDs from ROBDD Generator 526. As illustrated in FIG. 5C, Equivalence Checker 528 receives the input pairs (L$_{BDD}$, H$_{BDD}$), (L$_{BDD}$, C$_{BDD}$), (C$_{BDD}$, H$_{BDD}$), although it is understood that these representations are for clarity purposes, and may be replaced with any of the action-specific ROBDDs discussed above. From these action-specific conflict ROBDDs, Equivalence Checker 528 may determine that there is no conflict between the inputs—that is, a given action-specific conflict ROBDD is empty. In the context of the examples of FIGS. 6A-6C, an empty conflict ROBDD would correspond to no shaded portions being present. In the case where this determination is made for the given action-specific conflict ROBDD, Equivalence Checker 528 might generate a corresponding action-specific "PASS" indication 530 that can be transmitted externally from formal analysis engine 522.

However, if Equivalence Checker 528 determines that there is a conflict between the inputs, and that a given action-specific conflict ROBDD is not empty, then Equivalence Checker 528 will not generate PASS indication 530, and can instead transmit the given action-specific conflict ROBDD 532 to a Conflict Rules Identifier 534, which identifies the specific conflict rules that are present. In some examples, an action-specific "PASS" indication 530 can be generated for every action-specific conflict ROBDD that is determined to be empty. In some examples, the "PASS" indication 530 might only be generated and/or transmitted once every action-specific conflict ROBDD has been determined to be empty.

In instances where one or more action-specific conflict ROBDDs are received, Conflict Rules Identifier 534 may also receive as input the flat listing of priority ordered rules that are represented in each of the conflict ROBDDs 532. For example, if Conflict Rules Identifier 534 receives the Permit conflict ROBDD corresponding to L_Permit$_{BDD}$ ⊕ H_Permit$_{BDD}$, the underlying flat listings of priority ordered rules Li, Hi used to generate L_Permit$_{BDD}$ and H_Permit$_{BDD}$ are also received as input.

The Conflict Rules Identifier 534 then identifies specific conflict rules from each listing of priority ordered rules and builds a listing of conflict rules 536. In order to do so, Conflict Rules Identifier 534 iterates through the rules contained within a given listing and calculates the intersection between the set of packet configurations and network actions that is encompassed by each given rule, and the set that is encompassed by the action-specific conflict ROBDD. For example, assume that a list of j rules was used to generate $L\_Permit_{BDD}$. For each rule j, Conflict Rules Identifier 534 computes:

$$(L\_Permit_{BDD} \oplus H\_Permit_{BDD})*L_j$$

If this calculation equals zero, then the given rule $L_j$ is not part of the conflict ROBDD and therefore is not a conflict rule. If, however, this calculation does not equal zero, then the given rule $L_j$ is part of the Permit conflict ROBDD and therefore is a conflict rule that is added to the listing of conflict rules 536.

For example, in FIG. 6C, Permit conflict ROBDD 600c includes the shaded portions 624 and 626. Starting with the two rules L1, L2 used to generate $L\_Permit_{BDD}$, it can be calculated that:

$$(L\_Permit_{BDD} \oplus H\_Permit_{BDD})*L1=0$$

Thus, rule L1 does not overlap with Permit conflict ROBDD 600c and therefore is not a conflict rule. However, it can be calculated that:

$$(L\_Permit_{BDD} \oplus H\_Permit_{BDD})*L2 \neq 0$$

Meaning that rule L2 does overlap with Permit conflict ROBDD 600c at overlap portion 624 and therefore is a conflict rule and is added to the listing of conflict rules 536.

The same form of computation can also be applied to the list of rules H1, H2, H3, used to generate $H\_Permit_{BDD}$. It can be calculated that:

$$(L\_Permit_{BDD} \oplus H\_Permit_{BDD})*H1=0$$

Thus, rule H1 does not overlap with Permit conflict ROBDD 600c and therefore is not a conflict rule. It can also be calculated that:

$$(L\_Permit_{BDD} \oplus H\_Permit_{BDD})*H2=0$$

Thus, rule H2 does not overlap with Permit conflict ROBDD 600c and therefore is not a conflict rule. Finally, it can be calculated that:

$$(L\_Permit_{BDD} \oplus H\_Permit_{BDD})*H3 \neq 0$$

Meaning that rule H2 does overlap with Permit conflict ROBDD 600c at overlap portion 626 and therefore is a conflict rule and can be added to the listing of conflict rules 552. In the context of the present example, the complete listing of conflict rules 536 derived from Permit conflict ROBDD 600c is {L2, H3}, as one or both of these rules have been configured or rendered incorrectly.

In some examples, one of the models associated with the Input 524 may be treated as a reference or standard, meaning that the rules contained within that model are assumed to be correct. As such, Conflict Rules Identifier 536 only needs to compute the intersection of a given action-specific conflict ROBDD and the set of associated action-specific rules from the non-reference model. For example, the Li_Model 272 can be treated as a reference or standard, because it is directly derived from user inputs used to define L_Model 270A, 270B. The Hi_Model 276, on the other hand, passes through several transformations before being rendered into a node's hardware, and is therefore more likely to be subject to error. Accordingly, the Conflict Rules Identifier 534 would only compute $$(L\_Permit_{BDD} \oplus H\_Permit_{BDD})*H_j$$

for each of the rules (or each of the Permit rules) j in the Hi_Model 276, which can cut the required computation time significantly.

Additionally, Conflict Rules Identifier 534 need not calculate the intersection of the action-specific conflict ROBDD and the entirety of each rule, but instead, can use a priority-reduced form of each rule. In other words, this is the form in which the rule is represented within the ROBDD. For example, the priority reduced form of rule H2 is H1'H2, or the contribution of rule H2 minus the portion that is already captured by rule H1. The priority reduced form of rule H3 is (H1+H2)'H3, or the contribution of rule H3 minus the portion that is already captured by rules H1 or H2. The priority reduced form of rule H4 is (H1+H2+H3)'H4, or the contribution of rule H4 minus the portion that is already captured by rules H1 and H2 and H3.

As such, the calculation instead reduces to:

$$(L\_Permit_{BDD} \oplus H\_Permit_{BDD})*(H1+ \ldots +H_{j-1})'H_j$$

for each rule (or each Permit rule) j that is contained in the Hi_Model 276. While there are additional terms introduced in the equation above as compared to simply calculating $$(L\_Permit_{BDD} \oplus H\_Permit_{BDD})*H_j,$$

the priority-reduced form is in fact computationally more efficient. For each rule j, the priority-reduced form $(H1+ \ldots +H_{j-1})'H_j$ encompasses a smaller set of packet configurations and network actions, or encompasses an equally sized set, as compared to the non-reduced form $H_j$. The smaller the set for which the intersection calculation is performed against the conflict ROBDD, the more efficient the computation.

In some cases, the Conflict Rules Identifier 534 can output a listing of conflict rules 536 (whether generated from both input models, or generated only a single, non-reference input model) to a destination external to Formal Analysis Engine 522. For example, the conflict rules 536 can be output to a user or network operator in order to better understand the specific reason that a conflict occurred between models.

In some examples, a Back Annotator 538 can be disposed between Conflict Rules Identifier 534 and the external output. Back Annotator 538 can associate each given rule from the conflict rules listing 536 with the specific parent contract or other high-level intent that led to the given rule being generated. In this manner, not only is a formal equivalence failure explained to a user in terms of the specific rules that are in conflict, the equivalence failure is also explained to the user in terms of the high-level user action, configuration, or intent that was entered into the network and ultimately created the conflict rule. In this manner, a user can more effectively address conflict rules, by adjusting or otherwise targeting them at their source or parent.

In some examples, the listing of conflict rules 536 may be maintained and/or transmitted internally to Formal Analysis Engine 522, in order to enable further network assurance analyses and operations such as, without limitation, event generation, counter-example generation, QoS assurance, etc.

Figure 7A:
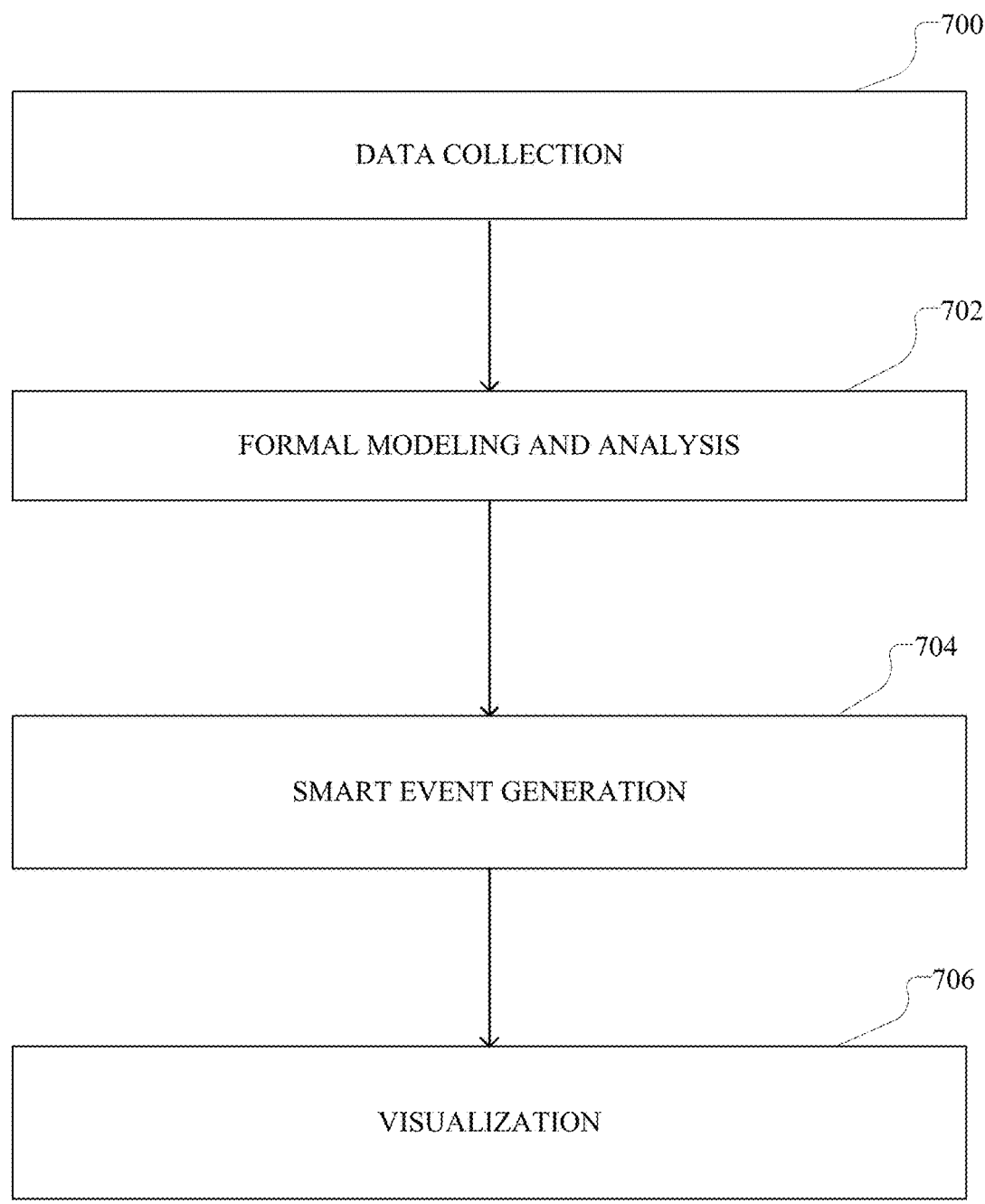
Figure 7B:
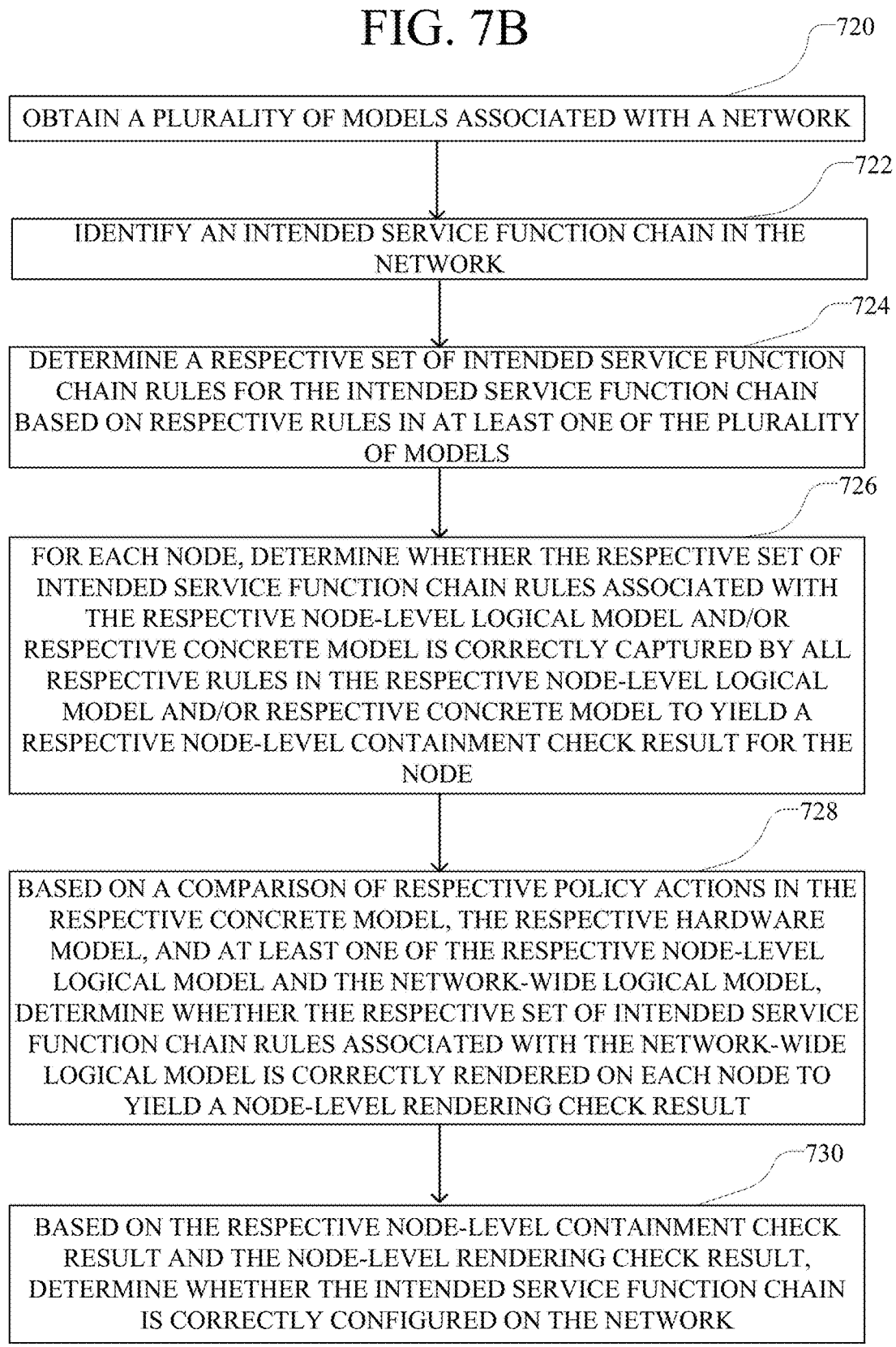

The disclosure now turns to FIGS. 7A-7C, which illustrate example methods. FIG. 7A illustrates an example method for general network assurance, and FIGS. 7B and 7C illustrate example methods for assurance of service function chain configurations. The methods are provided by way of example, as there are a variety of ways to carry out the methods. Additionally, while the example methods are illustrated with a particular order of blocks or steps, those of ordinary skill in the art will appreciate that FIGS. 7A-C, and the blocks shown therein, can be executed in any order and can include fewer or more blocks than illustrated.

Each block shown in FIGS. 7A-C represents one or more steps, processes, methods or routines in the methods. For the sake of clarity and explanation purposes, the blocks in FIGS. 7A-C are described with reference to Network Environment 100, Service Function Chain 140, Assurance Appliance System 300, and Network Models 270, 270A-B, 272, 274, 276, Policy Analyzer 504, and Formal Equivalence Engine 522, as shown in FIGS. 1A-C, 2D, 3A, 5A, and 5C.

With reference to FIG. 7A, at step 700, Assurance Appliance System 300 can collect data and obtain models associated with Network Environment 100. The models can include Logical Model 270, as shown in FIG. 4, and/or any of Models 270A-B, 272, 274, 276, as shown in FIG. 2D. The data can include fabric data (e.g., topology, switch, interface policies, application policies, etc.), network configurations (e.g., BDs, VRFs, L2 Outs, L3 Outs, protocol configurations, etc.), QoS policies (e.g., DSCP, priorities, bandwidth, queuing, transfer rates, SLA rules, performance settings, etc.), security configurations (e.g., contracts, filters, etc.), application policies (e.g., EPG contracts, application profile settings, application priority, etc.), service chaining configurations, routing configurations, etc. Other non-limiting examples of information collected or obtained can include network data (e.g., RIB/FIB, VLAN, MAC, ISIS, DB, BGP, OSPF, ARP, VPC, LLDP, MTU, network or flow state, logs, node information, routes, etc.), rules and tables (e.g., TCAM rules, ECMP tables, routing tables, etc.), endpoint dynamics (e.g., EPM, COOP EP DB, etc.), statistics (e.g., TCAM rule hits, interface counters, bandwidth, packets, application usage, resource usage patterns, error rates, latency, dropped packets, etc.).

At step 702, Assurance Appliance System 300 can analyze and model the received data and models. For example, Assurance Appliance System 300 can perform formal modeling and analysis, which can involve determining equivalency between models, including configurations, policies, etc. Assurance Appliance System 300 can analyze and/or model some or all portions of the received data and models. For example, in some cases, Assurance Appliance System 300 may analyze and model contracts, policies, rules, and state data, but exclude other portions of information collected or available.

At step 704, Assurance Appliance System 300 can generate one or more smart events. Assurance Appliance System 300 can generate smart events using deep object hierarchy for detailed analysis, such as Tenants, switches, VRFs, rules, filters, routes, prefixes, ports, contracts, subjects, etc.

At step 706, Assurance Appliance System 300 can visualize the smart events, analysis and/or models. Assurance Appliance System 300 can display problems and alerts for analysis and debugging, in a user-friendly GUI.

FIGS. 7B and 7C illustrate example methods for assurance of service function chain configurations. In some cases, the methods in FIGS. 7B and 7C can be performed separate from, or in addition to, the method in FIG. 7A. However, in other cases, the methods in FIG. 7B or 7C can be part of the assurance method in FIG. 7A. For example, the method in FIG. 7B can represent one or more steps within the method in FIG. 7A or a specific application of the method in FIG. 7A. To illustrate, the method in FIG. 7A can represent an example of a general assurance method which may analyze different types of configurations or aspects of the network, and the method in FIG. 7B can represent an example of a method implemented specifically for assurance of service function chain configurations.

At step 720, Assurance Appliance System 300 obtains a plurality of models (e.g., Models 270-276) associated with a network (e.g., Network Environment 100). The plurality of models can include a network-wide logical model (e.g., Logical Model 270) representing rules defined for the network, a respective node-level logical model (e.g., Li_Model 272) for each node (e.g., Spines 102 and/or Leafs 104) in the network, a respective concrete model (e.g., Ci_Model 274) for each node in the network, and a respective hardware model (e.g., Hi_Model 276) for each node in the network.

Based on at least one of the plurality of models, at step 722, Assurance Appliance System 300 identifies an intended service function chain (e.g., Service Function Chain 140) in the network. For example, Assurance Appliance System 300 can identify the intended service function chain based on the network-wide logical model (e.g., Logical Model 270). The service functions in the intended service function chains can reside in one or more networks and/or hosts, such as VMs, software containers, servers, runtime environments, etc. The intended service function chain can be configured via rules, contracts, objects, etc., in the network logical model. In some cases, the intended service function chain can be configured based on contracts and/or rules between EPGs in the logical model. Thus, the logical model can specify the EPGs, policies, rules, objects, contracts, etc., defined for the intended service function chain.

In some cases, the Assurance Appliance System 300 can identify the intended service function chain based on a logical network service graph (e.g., Representation 280), a specification of vertices (e.g., EPGs) and edges (e.g., network services), and/or explicit rules corresponding to the service function chain. When identifying the intended service function chain, Assurance Appliance System 300 can identify various aspects associated with the service function chain, such as each service function, each host (e.g., VMs, software containers, networks, etc.), each service requirement, each configuration, each EPG, each policy, each contract, each action, each end host, etc.

At step 724, Assurance Appliance System 300 can determine one or more respective sets of intended service function chain rules for the intended service function chain based on respective rules in one or more of the plurality of models. For example, Assurance Appliance System 300 can determine a respective set of intended service function chain rules in the network-wide logical model (e.g., Logical Model 270, L_Model 270A, or LR_Model 270B). Assurance Appliance System 300 can then determine for each node, which rules from the respective set of intended service function chain rules associated with the network-wide logical model should be included in that node's respective node-level logical model (e.g., Li_Model 272). Based on the rules in the respective set of intended service function chain rules that should be included in the node's respective node-level logical model, Assurance Appliance System 300 can construct a respective set of intended service function chain rules for that node.

The respective set of intended service function chain rules can correspond to one or more EPGs associated with one or more elements in the intended service function chain. For example, the respective set of intended service function chain rules can include rules which syntactically match EPGs in the elements (e.g., endpoints, nodes, contracts, policies, applications, rules, objects, configurations, etc.) of the intended service function chain.

In some cases, Assurance Appliance System 300 can identify a respective set of network-level intended service function chain rules derived from the network logical model (e.g., logical model from one or more controllers, such as Logical Model 270, L_Model 270A, or LR_Model 270B) and a respective set of node-level intended service function chain rules derived from the respective node-level logical model of one or more nodes. Thus, Assurance Appliance System 300 can construct or obtain multiple, respective sets of intended service function chain rules, including a set derived from the logical model of the network and one or more sets respectively derived from the logical model of one or more nodes. For example, Assurance Appliance System 300 can identify a respective set of intended service function chain rules derived from the network logical model (e.g., Logical Model 270, L_Model 270A, or LR_Model 270B). Assurance Appliance System 300 can also identify rules in the respective set of intended service function chain rules derived from the network logical model, such as contracts between EPGs associated with the intended service function chain, to determine a respective set of intended service function chain rules for each node based on the respective set of intended service function chain rules derived from the network logical model. The respective set of intended service function chain rules for a node can include those rules in the respective set of intended function chain rules associated with the network logical model which should be projected or propagated to the respective node-level logical model of that node.

The set of intended service function chain rules can include rules defining, for example, EPGs pertaining to the intended service function chain, traffic parameters (e.g., packet header, markings, etc.) pertaining to the intended service function chain and EPGs, forwarding rules for associated traffic, ordered functions in the chain, function parameters corresponding to the functions in the chain, traffic flow through the network and/or chain, L4-L7 parameters, contracts, policy actions, VRF information, BD information, network connectivity information (e.g., VLAN, VNID tag, etc.), rules managing network fabric and service appliances, etc.

For each node, at step 726, Assurance Appliance System 300 can determine whether the respective set of intended service function chain rules associated with the respective node-level logical model is correctly captured (e.g., contained) by the rules in the respective node-level logical model, to yield a respective node-level containment check result for the node. For example, Assurance Appliance System 300 can compare the respective set of intended service function chain rules constructed or derived for each node based on the node's respective node-level logical model, with the rules in that node's respective node-level logical model as further explained below.

Based on a comparison of respective policy actions in the respective concrete model, the respective hardware model, and at least one of the respective node-level logical model or the network-wide logical model, at step 728, Assurance Appliance System 300 can determine whether the respective set of intended service function chain rules associated with the network-wide logical model (e.g., Logical Model 270, L_Model 270A, or LR_Model 270B) are correctly rendered on each node, to yield a node-level rendering check result. Based on the respective node-level containment check result and the node-level rendering check result, at step 730, Assurance Appliance System 300 can determine whether the intended service function chain is correctly configured on the network.

For example, if the respective node-level containment check result and node-level rendering check result pass for every node, Assurance Appliance System 300 can determine that the intended service function chain is correctly configured in the network. By contrast, if the respective node-level containment check result and node-level rendering check result do not pass for every node, Assurance Appliance System 300 can determine that the intended service function chain is not correctly configured in the network.

In some cases, Assurance Appliance System 300 can aggregate the respective node-level containment check result for each node to yield a network-wide containment check result for the intended service function chain, and aggregate the node-level rendering check result for each node to yield a network-wide rendering check result for the intended service function chain. Assurance Appliance System 300 can thus determine whether the intended service function chain is correctly configured on the network based on the network-wide containment check result and the network-wide rendering check result.

Assurance Appliance System 300 can also analyze a respective routing information base (RIB) of each node and, based on the RIB of each node, determine whether routing configurations associated with packets corresponding to the intended service function chain ensure the packets will be routed to the intended service function chain without bypassing one or more service functions in the intended service function chain. In other words, Assurance Appliance System 300 can check the RIBs of each node and verify that the intended service function chain is not bypassed.

In some cases, Assurance Appliance System 300 can determine that the intended service function chain is correctly configured on the network when the network-wide containment check result indicates that, for every node, the respective set of intended service function chain rules is correctly captured by all respective rules in the respective node-level logical model and/or respective concrete model, the network-wide rendering check result indicates that the respective set of intended service function chain rules associated with the network-wide logical model are correctly rendered on each node, and the routing configurations associated with packets corresponding to the intended service function chain are correctly configured to ensure packets associated with the service function chain are routed to the service function chain without bypassing one or more service functions or the service function chain.

Assurance Appliance System 300 can thus detect network policy and routing configuration errors that allow packets to flow directly between end points and bypass the service function chain, detect network policy and routing configuration errors that prevent packet forwarding between elements of the service function chain, detect errors in translating the service function chain specified in the logical model to hardware configuration on the nodes, etc.

In some examples, Assurance Appliance System 300 determines whether the respective set of intended service function chain rules associated with at least one of the respective node-level logical model and/or the respective concrete model is correctly captured by all respective rules in the respective node-level logical model and/or respective concrete model based on equivalence checks performed using data structures representing the rules and/or models.

For example, Assurance Appliance System 300 can construct respective data structures, such as ROBDDs, representing one or more of the respective set of intended service function chain rules associated with the network-wide logical model, the respective set of intended service function chain rules associated with the node-level logical model, the respective rules in the respective node-level logical model and/or respective concrete model, and compare the respective data structures (e.g., ROBDDs) to determine an equivalence result between the respective data structures. To illustrate, assume the respective data structures are ROBDDs. Assurance Appliance System 300 can determine that the respective set of intended service function chain rules associated with the network-wide logical model and/or the respective set of intended service function chain rules associated with the node-level logical model are correctly captured when the equivalence result indicates that respective ROBDDs match. On the other hand, Assurance Appliance System 300 can determine that the respective set of intended service function chain rules are not correctly captured when the equivalence result indicates that the respective ROBDDs do not match.

The ROBDDs can be constructed based on respective Boolean functions generated from each of the respective set of intended service function chain rules and each respective rule in the respective node-level logical model and/or respective concrete model. For example, each Boolean function from the respective Boolean functions can represent a respective rule in the respective set of intended service function chain rules and the respective node-level logical model and/or respective concrete model.

ROBDDs can also be used to perform an equivalence check as part of comparing respective policy actions and/or rules in the various models. For example, Assurance Appliance System 300 can perform a comparison of respective policy actions in the respective concrete model, the respective hardware model, and the respective node-level logical model and/or the network-wide logical model. The comparison can be an equivalence check between respective ROBDDs constructed for the respective policy actions.

ROBDDs can also be used to determine whether rules are correctly rendered on each node based on equivalence checks between the models for the node (e.g., node-level logical model, concrete model, hardware model). For example, Assurance Appliance System 300 can generate ROBDDs for each node, and the ROBDDs for each node can be constructed for each policy action based on all the rules in the respective node-level logical model, respective concrete model, and respective hardware model. Assurance Appliance System 300 can then determine that the respective set of intended service function chain rules are correctly rendered on each node when an equivalence check indicates a match between the respective ROBDDs constructed for the respective policy actions. The equivalence check can thus confirm that the policy actions in the models of a node are consistent and do not conflict. This indicates that the rules and/or policy actions have been rendered properly by the software and hardware of the node.

When determining whether the intended service function chain is correctly configured on the network at steps 720-730, Assurance Appliance System 300 can perform containment checks, rendering checks, and/or routing checks as previously explained. Containment checks, rendering and routing configuration checks can be performed for each node in the network to determine whether the intended service function chain is correctly configured. In a correctly configured service function chain, the rules of the intended service function chain should be logically contained in the respective logical model associated with the rules of the intended service function chain (e.g., Li_Model 272). This can be checked through a containment check, which can include comparing the set of intended service function chain rules with the logical model(s) (e.g., the respective node-level logical model and/or the network-wide logical model). Such containment check can verify that the set of intended service function chain rules configured on a node are contained in the node's and/or network's logical model as expected.

Moreover, configurations in the node-level logical models, the respective concrete models, and the respective hardware models can be verified for each node in the network. These checks can be performed separately for each node. The respective logical models, concrete models, and hardware models of each node can be compared as part of a rendering check to verify whether rules associated with the intended service function chain are included in the logical model of the node and properly rendered by the software and hardware of the node.

The containment and routing checks can include comparing the respective sets of intended service function chain rules in the node-level logical models and rules in the respective node-level logical models and/or concrete models, comparing the node-level logical models with the respective concrete and/or hardware models, and/or comparing the logical model of the network (e.g., Logical Model 270) and/or the respective set of service function chain rules associated with the logical model of the network with the respective set of service function chain rules associated with the node-level logical models. The comparisons can be performed through equivalence checks, as previously described, which can be performed using Boolean functions and/or other data structures, such as ROBDDs. Such data structures can represent the models, rules and/or values being compared.

For example, a set of Boolean functions can be constructed for the set of intended service function chain rules associated with the respective node-level logical model and all the rules in the respective node-level logical model. Each Boolean function can correspond to an action in the logical model and returns "true" for a packet header if the corresponding ruleset perform that action for that packet. As previously explained, Boolean functions can be represented by a specific structure. For clarity and explanation purposes, in the examples below, the Boolean functions are represented as ROBDDs. However, other representations are also possible and contemplated herein.

Rendering checks can be performed for each node by comparing rules in the logical model (e.g., Logical Model 270 and/or Li_Model 272) with the rules in the concrete model (e.g., Ci_Model 274) and/or hardware model (e.g., Hi_Model 276). The rendering checks can involve equivalence checks between rules in the models compared. As previously described, rules can be represented as Boolean functions and/or ROBBDDs (or any other structure) for performing such equivalence checks. The equivalence checks can check if the logical model has been correctly rendered onto each node.

If the node-level containment or rendering checks fail, data structures, such as ROBDDs, can be used to identify the EPG pairs contracts that caused the failure. The results can be aggregated along various dimensions. For example, the node-level containment check results can be aggregated to a single network-wide service function chain containment result. If the node-level containment check result for each node is positive (e.g., a pass), then the aggregated node-level results will yield a positive network-wide service function containment result. On the hand, if the node-level containment check result for one or more nodes is negative (e.g., fail), then the aggregated node-level results will yield a negative network-wide service function containment result (e.g., a failure).

The EPG pair-wise containment check results can also be aggregated across nodes to a network-wide EPG pair containment result. The network-wide EPG pair containment result will indicate if, based on the aggregated EPG pair-wise containment check results, each node has passed the EPG pair containment check or any nodes have failed the EPG pair containment check. The results of all the checks performed along with the aggregate results can be time-stamped and written to a database or storage, or otherwise reported.

Example verification checks are further described below.

Policy Containment Checks

Policy containment checks can be performed to verify that rules in the logical model (e.g., Li_Model 272) of a node do not override the intended service function chain rules, and/or that the respective set of service function chain rules constructed for a node-level logical model are contained in the node-level logical model. This can be done using ROBDDs as previously explained. For example, a pair of ROBDDs can be constructed for a policy action (e.g., accept). One ROBDD is constructed using the set of service function chain rules and a second using the rules in the respective logical model. The two ROBDDs can be logically AND'ed. If the resulting ROBDD of the respective logical model is identical to the ROBDD of the intended service chain rules, then the intended service chain rules do not conflict with the rules in the respective logical model and the containment check will pass. This indicates that the network operator configured the logical model according to the intended service function chain, without creating conflicts between them.

To illustrate, consider a node-level logical model with the five rules shown in the table below in the order of priority.

| Priority | Scope ID | Source EPG | Destination EPG | Action |
|---|---|---|---|---|
| 1 | 100 | 11 | 14 | ALLOW |
| 2 | 100 | 10 | 11 | ALLOW |
| 3 | 100 | * | 12 | DENY |
| 4 | 100 | 13 | 12 | ALLOW |
| 5 | * | * | * | DENY |

Assume that the intended service function chain has EPGs 10 and 11. The ALLOW ROBDD for the intended service function chain rules will be constructed using only rule 2. The ALLOW ROBDD in the node-level logical model will be constructed with all five rules. When this ROBDD is logically AND'ed with the first ROBDD, the result will be an ROBDD which matches the first ROBDD. Accordingly, the containment check passes. This is expected because the rule 2 is contained in the node-level logical model and the rules in the node-level logical model do not conflict with or override rule 2 which is part of the intended service function chain.

Conversely, if the intended service function chain contains a service chain rule with an ALLOW action for EPG 12 and EPG 13 and a priority of 4 or below (e.g., rule 4), the containment check would fail as the ROBDD associated with the service chain rule would be different from the ROBDD in the node-level logical model constructed with all five rules in the node-level logical model. This is expected because rule 3 contained in the node-level logical model would override the service chain rule for EPGs 12 and 13. As another example, if the intended service function chain contains a service chain rule with an ALLOW action for EPG 14 and EPG 15, the containment check would fail as the ROBDD associated with the service chain rule for EPGs 14 and 15 would not match the ROBDD for the node-level logical model. This would be expected as the service function chain rule for EPGs 14 and 15 is not contained in the node-level logical model.

Policy Rendering Checks

ROBDDs can also be used to verify that the intended service function chain rules in the network controller (e.g., Controllers 116) have been correctly rendered onto each node. For this, three ROBDDs can be constructed for each node (e.g., switch) and each policy action using the rules in the node's logical model, concrete model and hardware model respectively. If the three ROBDDs for a node are identical for all policy actions, the service function chain has been correctly rendered onto the node.

Routing Configuration Checks

Various aspects of routing configuration can be verified. First, the RIBs on every node (e.g., switch) should not lead to a direct path between end hosts on either side of the service (e.g., the service associated with the service function chain). Second, if L2 forwarding behavior is required between hosts of each side of the service, then their BDs should be configured to allow that. In the case of an ACI network, their BDs should flood unknown unicast MAC addresses so that hosts on either side of the service can learn each other's MAC addresses.

For SDN (including ACI), the locations of end hosts can be determined to allow more efficient packet forwarding. The identified interfaces can be cross-verified with the real end point locations to verify that packets are forwarded to the service appliance en route to their final destination.

As illustrated above, this assurance mechanism can be used to verify that the configuration on individual network devices or nodes is consistent with the intended service chain configuration. In the previous example, ROBDDs were implemented to verify policies and checks performed on the RIB verify that the service appliance is not bypassed. The verification mechanism can thus detect network policy and routing configuration errors that allow packets to flow directly between end points and bypass the service function chain, detect network policy and routing configuration errors that prevent packet forwarding between elements of the service function chain, and detect errors in translating the service function chain specified in the logical model (e.g., Logical Model 270 and/or Li_Model 272) to the software and hardware configuration on the node.

Since there may be multiple nodes controlled by the Controllers 116, in order to analyze the rendering of contracts across all the nodes, aggregation logic can be used to aggregate the result for different nodes. The aggregated results can be published to a database and displayed to the network operator using a GUI, or otherwise reported to the network operator.

FIG. 7C illustrates another example method for assurance of service function chain configurations. In this example, at step 740, Assurance Appliance System 300 can obtain one or more logical models (e.g., Logical Model 270, L_Model 270A, L_Model 270B, etc.) of a network, such as Network Environment 100. In some cases, Assurance Appliance System 300 can obtain a single logical model, or a collection of logical models, such as Logical Model Collection 502 as shown in FIG. 5A. Assurance Appliance System 300 can obtain the one or more logical models from one or more systems or nodes, such as one or more Controllers 116 or Leafs 104. In some cases, Assurance Appliance System 300 may generate a logical model or modify a collected logical model. The logical models can include one or more network-wide logical models, such as Logical Model 270.

At step 742, Assurance Appliance System 300 can identify an intended service function chain (e.g., Service Function Chain 140) based on the one or more logical models. The intended service function chain can include multiple service functions which together perform the functionality for a given application associated with the service function chain.

Based on the one or more logical models, at step 744, Assurance Appliance System 300 can generate, for each node (e.g., Spine 102 and/or Leaf 104) in the network, a respective node-specific logical model (e.g., Li_Model 272). The respective node-specific logical model can be a node-level (e.g., switch level) version of the logical model for the network, such as Logical Model 270. The respective node-specific logical model can project the logical model onto the node. For example, the respective node-specific logical model can include the data and/or configurations in the Logical Model 270 that pertain to that specific node, such as the data and/or configurations in the Logical Model 270 that should be propagated to, or rendered at, the specific node. To illustrate, the respective node-specific logical model for Leaf1 in Network Environment 100 can include the data and/or configurations (e.g., policies, rules, objects, object properties, routing configurations, requirements, logical settings, etc.) that should be stored or rendered at the node from the Logical Model 270.

At step 746, Assurance Appliance System 300 can obtain, for each node in the network, a respective concrete model (e.g., Ci_Model 274) and a respective hardware model (e.g., Hi_Model 276). The respective concrete model can include rules rendered on the node's software or environment, such as the node's network operating system. The rules can be based on the data in the respective node-specific logical model. The respective hardware model can include the rules rendered on, or stored at, the node's hardware (e.g., TCAM memory).

At step 748, Assurance Appliance System 300 can identify a set of intended service function chain rules for the intended service function chain based on the one or more logical models and/or the respective node-specific logical model. For example, Assurance Appliance System 300 can identify a set of intended service function chain rules for the intended service function chain that are contained in the respective node-specific logical model for each node.

As previously explained, the set of intended service function chain rules can include a set of the rules in the logical model (e.g., the respective node-specific logical model) pertaining to specific EPGs in the intended service function chain. For example, the set of intended service function chain rules can include rules in the logical model that match one or more EPGs associated with the intended service function chain. Thus, the set of intended service function chain rules can include rules that syntactically match the EPGs in the elements of the intended service function chain.

At step 750, Assurance Appliance System 300 can determine whether the intended service function chain is correctly configured on the network based on a comparison of a network-wide logical model (e.g., Logical Model 270), the set of intended service function chain rules in the respective node-specific logical model, the respective concrete model, and/or the respective hardware model. This comparison can involve one or more policy containment checks, policy rendering checks, and/or routing checks, as previously explained.

The disclosure now turns to FIGS. 8 and 9, which illustrate example network and computing devices, such as switches, routers, load balancers, servers, client computers, and so forth.

FIG. 8 illustrates an example network device 800 suitable for performing switching, routing, assurance, and other networking operations. Network device 800 includes a central processing unit (CPU) 804, interfaces 802, and a connection 810 (e.g., a PCI bus). When acting under the control of appropriate software or firmware, the CPU 804 is responsible for executing packet management, error detection, and/or routing functions. The CPU 804 preferably accomplishes all these functions under the control of software including an operating system and any appropriate applications software. CPU 804 may include one or more processors 808, such as a processor from the INTEL X86 family of microprocessors. In some cases, processor 808 can be specially designed hardware for controlling the operations of network device 800. In some cases, a memory 806 (e.g., non-volatile RAM, ROM, TCAM, etc.) also forms part of CPU 804. However, there are many different ways in which memory could be coupled to the system. In some cases, the network device 800 can include a memory and/or storage hardware, such as TCAM, separate from CPU 804. Such memory and/or storage hardware can be coupled with the network device 800 and its components via, for example, connection 810.

The interfaces 802 are typically provided as modular interface cards (sometimes referred to as "line cards"). Generally, they control the sending and receiving of data packets over the network and sometimes support other peripherals used with the network device 800. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces, WIFI interfaces, 3G/4G/5G cellular interfaces, CAN BUS, LoRA, and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communications intensive tasks, these interfaces allow the master microprocessor 804 to efficiently perform routing computations, network diagnostics, security functions, etc.

Although the system shown in FIG. 8 is one specific network device of the present disclosure, it is by no means the only network device architecture on which the concepts herein can be implemented. For example, an architecture having a single processor that handles communications as well as routing computations, etc., can be used. Further, other types of interfaces and media could also be used with the network device 800.

Regardless of the network device's configuration, it may employ one or more memories or memory modules (including memory 806) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. Memory 806 could also hold various software containers and virtualized execution environments and data.

The network device 800 can also include an application-specific integrated circuit (ASIC), which can be configured to perform routing, switching, and/or other operations. The ASIC can communicate with other components in the network device 800 via the connection 810, to exchange data and signals and coordinate various types of operations by the network device 800, such as routing, switching, and/or data storage operations, for example.

FIG. 9 illustrates a computing system architecture 900 including components in electrical communication with each other using a connection 905, such as a bus. System 900 includes a processing unit (CPU or processor) 910 and a system connection 905 that couples various system components including the system memory 915, such as read only memory (ROM) 920 and random access memory (RAM) 925, to the processor 910. The system 900 can include a cache of high-speed memory connected directly with, in close proximity to, or integrated as part of the processor 910. The system 900 can copy data from the memory 915 and/or the storage device 930 to the cache 912 for quick access by the processor 910. In this way, the cache can provide a performance boost that avoids processor 910 delays while waiting for data. These and other modules can control or be configured to control the processor 910 to perform various actions.

Other system memory 915 may be available for use as well. The memory 915 can include multiple different types of memory with different performance characteristics. The processor 910 can include any general purpose processor and a hardware or software service, such as service 1 932, service 2 934, and service 3 936 stored in storage device 930, configured to control the processor 910 as well as a special-purpose processor where software instructions are incorporated into the actual processor design. The processor 910 may be a completely self-contained computing system, containing multiple cores or processors, a bus, memory controller, cache, etc. A multi-core processor may be symmetric or asymmetric.

To enable user interaction with the computing device 900, an input device 945 can represent any number of input mechanisms, such as a microphone for speech, a touch-sensitive screen for gesture or graphical input, keyboard, mouse, motion input, speech and so forth. An output device 935 can also be one or more of a number of output mechanisms known to those of skill in the art. In some instances, multimodal systems can enable a user to provide multiple types of input to communicate with the computing device 900. The communications interface 940 can generally govern and manage the user input and system output. There is no restriction on operating on any particular hardware arrangement and therefore the basic features here may easily be substituted for improved hardware or firmware arrangements as they are developed.

Storage device 930 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 925, read only memory (ROM) 920, and hybrids thereof.

The storage device 930 can include services 932, 934, 936 for controlling the processor 910. Other hardware or software modules are contemplated. The storage device 930 can be connected to the system connection 905. In one aspect, a hardware module that performs a particular function can include the software component stored in a computer-readable medium in connection with the necessary hardware components, such as the processor 910, connection 905, output device 935, and so forth, to carry out the function.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" refers to at least one of a set and indicates that one member of the set or multiple members of the set satisfy the claim. For example, claim language reciting "at least one of A and B" means A, B, or A and B.

What is claimed is:

1. A method comprising:
obtaining a plurality of models associated with a network, the plurality of models comprising:
a network-wide logical model representing rules defined for the network;
a respective node-level logical model for each node in the network, the respective node-level logical model comprising at least a portion of the rules defined for the network-wide logical model, the portion of the rules comprising those of the rules defined for the network-wide logical model which correspond to the node;
a respective concrete model for each node in the network, wherein the respective concrete model comprises software rendered rules on a software environment of the node; and
a respective hardware model for each node in the network, wherein the respective hardware model comprises hardware rendered rules on a hardware of the node;
based on the plurality of models, identifying an intended service function chain in the network;
determining a set of intended service function chain rules for the intended service function chain based on respective rules in at least one of the plurality of models, wherein the at least one of the plurality of models comprises the network-wide logical model, and wherein the respective rules correspond to one or more endpoint groups associated with one or more elements in the intended service function chain;
for each node, determining whether a subset of the set of intended service function chain rules associated with the node is correctly captured by all respective rules in at least one of the respective node-level logical model and the respective concrete model to yield a respective node-level containment check result for the node;
based on a comparison of respective policy actions in the respective concrete model, the respective hardware model, and at least one of the respective node-level logical model and the network-wide logical model, determining, for each node, whether the subset of the set of intended service function chain rules associated with the node is correctly rendered on the node to yield a respective node-level rendering check result for the node; and
based on the respective node-level containment check result and the node-level rendering check result, determining whether the intended service function chain is correctly configured on the network.

2. The method of claim 1, further comprising:
aggregating the respective node-level containment check result for each node to yield a network-wide containment check result for the intended service function chain;
aggregating the respective node-level rendering check result for each node to yield a network-wide rendering check result for the intended service function chain; and
wherein determining whether the intended service function chain is correctly configured on the network is based on the network-wide containment check result and the network-wide rendering check result.

3. The method of claim 2, further comprising:
analyzing a respective routing information base (RIB) of each node; and
based on the respective RIB of each node, determining whether routing configurations associated with packets corresponding to the intended service function chain ensure the packets are routed to the intended service function chain without bypassing one or more service functions in the intended service function chain.

4. The method of claim 3, further comprising:
determining that the intended service function chain is correctly configured on the network when:
the network-wide containment check result indicates that, for every node, the subset of the set of intended service function chain rules associated with the node is correctly captured by all respective rules in the at least one of the respective node-level logical model and the respective concrete model;
the network-wide rendering check result indicates that, for every node, the subset of the set of intended service function chain rules associated with the node is correctly rendered on the node; and
the routing configurations associated with packets corresponding to the intended service function chain are determined to ensure the packets are routed to the intended service function chain without bypassing one or more service functions in the intended service function chain.

5. The method of claim 1, wherein determining whether the subset of the set of intended service function chain rules associated with the node is correctly captured by all respective rules in the at least one of the respective node-level logical model and the respective concrete model comprises:
generating respective data structures representing the subset of the set of intended service function chain rules associated with the node and all respective rules in the at least one of the respective node-level logical model and the respective concrete model; and
comparing the respective data structures to determine an equivalence result between the respective data structures.

6. The method of claim 5, wherein the respective data structures comprise respective reduced ordered binary decision diagrams, and wherein determining whether the subset of the set of intended service function chain rules associated with the node is correctly captured by all respective rules in the at least one of the respective node-level logical model and the respective concrete model comprises:
determining that the subset of the set of intended service function chain rules associated with the node are correctly captured when the equivalence result indicates that the respective reduced ordered binary decision diagrams match; and
determining that the subset of the set of intended service function chain rules associated with the node are not correctly captured when the equivalence result indicates that the respective reduced ordered binary decision diagrams do not match.

7. The method of claim 6, wherein the respective reduced ordered binary decision diagrams are constructed based on respective Boolean functions generated from each respective rule in the subset of the set of intended service function chain rules associated with the node and each respective rule in the at least one of the respective node-level logical model and the respective concrete model.

8. The method of claim 7, wherein each Boolean function from the respective Boolean functions represents a respective rule in one of the subset of the set of intended service function chain rules associated with the node and the at least one of the respective node-level logical model and the respective concrete model.

9. The method of claim 1, wherein the comparison of respective policy actions in the respective concrete model, the respective hardware model, and at least one of the respective node-level logical model and the network-wide logical model comprises an equivalence check between respective data structures constructed for the respective policy actions.

10. The method of claim 9, wherein determining whether the subset of the set of intended service function chain rules associated with the node is correctly rendered on the node comprises:
   determining that the subset of the set of intended service function chain rules associated with the node is correctly rendered on the node when the equivalence check indicates a match between the respective data structures constructed for the respective policy actions.

11. A system comprising:
   one or more processors; and
   at least one computer-readable storage medium having stored therein instructions which, when executed by the one or more processors, cause the system to:
   obtain a plurality of models associated with a network, the plurality of models comprising:
      a network-wide logical model representing rules defined for the network;
      a respective node-level logical model for each node in the network, the respective node-level logical model comprising at least a portion of the rules defined for the network-wide logical model, the portion of the rules comprising those of the rules defined for the network-wide logical model which correspond to the node;
      a respective concrete model for each node in the network, wherein the respective concrete model comprises software rendered rules on a software environment of the node; and
      a respective hardware model for each node in the network, wherein the respective hardware model comprises hardware rendered rules on a hardware of the node;
   based on the plurality of models, identify an intended service function chain in the network;
   determine a set of intended service function chain rules for the intended service function chain based on respective rules in at least one of the plurality of models, wherein the at least one of the plurality of models comprises the network-wide logical model, and wherein the respective rules correspond to one or more endpoint groups associated with one or more elements in the intended service function chain;
   for each node, determine whether a subset of the set of intended service function chain rules associated with the node is correctly captured by all respective rules in at least one of the respective node-level logical model and the respective concrete model to yield a respective node-level containment check result for the node;
   based on a comparison of respective policy actions in the respective concrete model, the respective hardware model, and at least one of the respective node-level logical model and the network-wide logical model, determine, for each node, whether the subset of the set of intended service function chain rules associated with the node is correctly rendered on the node to yield a respective node-level rendering check result for the node; and
   based on the respective node-level containment check result and the node-level rendering check result, determine whether the intended service function chain is correctly configured on the network.

12. The system of claim 11, the at least one computer-readable storage medium storing additional instructions which, when executed by the one or more processors, cause the system to:
   aggregate the respective node-level containment check result for each node to yield a network-wide containment check result for the intended service function chain;
   aggregate the respective node-level rendering check result for each node to yield a network-wide rendering check result for the intended service function chain; and
   wherein determining whether the intended service function chain is correctly configured on the network is based on the network-wide containment check result and the network-wide rendering check result.

13. The system of claim 12, the at least one computer-readable storage medium storing additional instructions which, when executed by the one or more processors, cause the system to:
   analyze a respective routing information base (RIB) of each node;
   based on the respective RIB of each node, determine whether routing configurations associated with packets corresponding to the intended service function chain ensure the packets are routed to the intended service function chain without bypassing one or more service functions in the intended service function chain; and
   determine that the intended service function chain is correctly configured on the network when:
      the network-wide containment check result indicates that, for every node, the subset of the set of intended service function chain rules associated with the node is correctly captured by all respective rules in the at least one of the respective node-level logical model and the respective concrete model;
      the network-wide rendering check result indicates that, for every node, the subset of the set of intended service function chain rules associated with the node is correctly rendered on the node; and
      the routing configurations associated with packets corresponding to the intended service function chain are determined to ensure the packets are routed to the intended service function chain without bypassing one or more service functions in the intended service function chain.

14. The system of claim 11, wherein determining whether the subset of the set of intended service function chain rules associated with the node is correctly captured by all respective rules in the at least one of the respective node-level logical model and the respective concrete model comprises:
   generating respective data structures representing the subset of the set of intended service function chain rules associated with the node and all respective rules in the at least one of the respective node-level logical model and the respective concrete model; and
   comparing the respective data structures to determine an equivalence result between the respective data structures.

15. The system of claim 14, wherein the respective data structures comprise respective reduced ordered binary decision diagrams, and wherein determining whether the subset of the set of intended service function chain rules associated with the node is correctly captured by all respective rules in the at least one of the respective node-level logical model and the respective concrete model comprises:
determining that the subset of the set of intended service function chain rules associated with the node are correctly captured when the equivalence result indicates that the respective reduced ordered binary decision diagrams match; and
determining that the subset of the set of intended service function chain rules associated with the node are not correctly captured when the equivalence result indicates that the respective reduced ordered binary decision diagrams do not match.

16. The system of claim 15, wherein the respective reduced ordered binary decision diagrams are constructed based on respective Boolean functions generated from each respective rule in the subset of the set of intended service function chain rules associated with the node and each respective rule in the at least one of the respective node-level logical model and the respective concrete model,
wherein each Boolean function represents a respective rule in one of the subset of the set of intended service function chain rules associated with the node and the at least one of the respective node-level logical model and the respective concrete model.

17. The system of claim 11, wherein the comparison of respective policy actions in the respective concrete model, the respective hardware model, and at least one of the respective node-level logical model and the network-wide logical model comprises an equivalence check between respective data structures constructed for the respective policy actions, and wherein determining whether the subset of the set of intended service function chain rules associated with the node is correctly rendered on the node comprises:
determining that the subset of the set of intended service function chain rules associated with the node is correctly rendered on the node when the equivalence check indicates a match between the respective data structures constructed for the respective policy actions.

18. A non-transitory computer-readable storage medium comprising:
instructions stored therein instructions which, when executed by one or more processors, cause the one or more processors to:
obtain a plurality of models associated with a network, the plurality of models comprising:
a network-wide logical model representing rules defined for the network;
a respective node-level logical model for each node in the network, the respective node-level logical model comprising at least a portion of the rules defined for the network-wide logical model, the portion of the rules comprising those of the rules defined for the network-wide logical model which correspond to the node;
a respective concrete model for each node in the network, wherein the respective concrete model comprises software rendered rules on a software environment of the node; and
a respective hardware model for each node in the network, wherein the respective hardware model comprises hardware rendered rules on a hardware of the node;
based on the plurality of models, identify an intended service function chain in the network;
determine a set of intended service function chain rules for the intended service function chain based on respective rules in at least one of the plurality of models, wherein the at least one of the plurality of models comprises the network-wide logical model, and wherein the respective rules correspond to one or more endpoint groups associated with one or more elements in the intended service function chain;
for each node, determine whether a subset of the set of intended service function chain rules associated with the node is correctly captured by all respective rules in at least one of the respective node-level logical model and the respective concrete model to yield a respective node-level containment check result for the node;
based on a comparison of respective policy actions in the respective concrete model, the respective hardware model, and at least one of the respective node-level logical model and the network-wide logical model, determine, for each node, whether the subset of the set of intended service function chain rules associated with the node is correctly rendered on the node to yield a respective node-level rendering check result for the node; and
based on the respective node-level containment check result and the node-level rendering check result, determine whether the intended service function chain is correctly configured on the network.

19. The non-transitory computer-readable storage medium of claim 18, wherein the comparison of respective policy actions in the respective concrete model, the respective hardware model, and at least one of the respective node-level logical model and the network-wide logical model comprises an equivalence check between respective data structures constructed for the respective policy actions, and wherein determining whether the subset of the set of intended service function chain rules associated with the node is correctly rendered on the node comprises:
determining that the subset of the set of intended service function chain rules associated with the node is correctly rendered on the node when the equivalence check indicates a match between the respective data structures constructed for the respective policy actions.

20. The non-transitory computer-readable storage medium of claim 19, wherein determining whether the subset of the set of intended service function chain rules associated with the node is correctly captured by all respective rules in the at least one of the respective node-level logical model and the respective concrete model comprises:
generating respective reduced ordered binary decision diagrams representing the subset of the set of intended service function chain rules associated with the node and all respective rules in the at least one of the respective node-level logical model and the respective concrete model, wherein the respective reduced ordered binary decision diagrams are constructed based on respective Boolean functions, wherein each Boolean function of the respective Boolean functions represents a rule in one of the subset of the set of intended service function chain rules associated with the node, the respective node-level logical model and the respective concrete model; and
comparing the respective reduced ordered binary decision diagrams to determine whether the respective reduced ordered binary decision diagrams match.

* * * * *